United States Patent
Kim et al.

(10) Patent No.: US 9,313,576 B2
(45) Date of Patent: Apr. 12, 2016

(54) DATA TRANSMITTING APPARATUS, DATA RECEIVING APPARATUS, DATA TRANSCEIVING SYSTEM, DATA TRANSMITTING METHOD, AND DATA RECEIVING METHOD

(71) Applicant: SAMSUNG ELECTRONICS CO., LTD., Suwon-si (KR)

(72) Inventors: Jong-hwa Kim, Suwon-si (KR); Soo-young Kim, Suwon-si (KR); Il-ju Na, Seongnam-si (KR); Kyeong-jae Lee, Seoul (KR); Suk-jin Yun, Seoul (KR); Jae-min Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 303 days.

(21) Appl. No.: 13/768,530

(22) Filed: Feb. 15, 2013

(65) Prior Publication Data

US 2013/0223632 A1 Aug. 29, 2013

Related U.S. Application Data

(60) Provisional application No. 61/641,580, filed on May 2, 2012, provisional application No. 61/647,628, filed on May 16, 2012, provisional application No. 61/602,975, filed on Feb. 24, 2012, provisional (Continued)

(30) Foreign Application Priority Data

Jan. 2, 2013 (KR) .......................... 10-2013-000373

(51) Int. Cl.
*H04R 5/00* (2006.01)
*H04N 21/4363* (2011.01)

(Continued)

(52) U.S. Cl.
CPC ............... *H04R 5/00* (2013.01); *H04N 21/439* (2013.01); *H04N 21/43635* (2013.01); *G09G 5/006* (2013.01); *G09G 2370/04* (2013.01); *G09G 2370/12* (2013.01)

(58) Field of Classification Search
None
See application file for complete search history.

(56) References Cited

U.S. PATENT DOCUMENTS 6,757,659 B1 6/2004 Tanaka et al.
7,286,602 B2 10/2007 Ichimura (Continued)

FOREIGN PATENT DOCUMENTS

| CN | 1462522 A | 12/2003 |
|----|-----------|---------|
| CN | 1678055 A | 10/2005 |

(Continued)

OTHER PUBLICATIONS

Communication, Issued by the United States Patent and Trademark Office, Dated Aug. 1, 2014, in counterpart U.S. Appl. No. 13/768,412.

(Continued)

*Primary Examiner* — Brenda Bernardi
(74) *Attorney, Agent, or Firm* — Sughrue Mion, PLLC

(57) ABSTRACT

A data transmitting apparatus is disclosed. The data transmitting apparatus includes a block generator which generates an Extended Display Identification Data (EDID) block regarding multi-channel audio data; and a transmitter which transmits the EDID block to a data receiving apparatus, wherein the EDID block includes at least one of a first sub block representing 3D audio characteristics of the multi-channel audio data, a second sub block representing 3D speaker placement information of the multi-channel audio data, and a third sub block representing multi-stream audio characteristics of the multi-channel audio data.

34 Claims, 17 Drawing Sheets

Related U.S. Application Data application No. 61/602,978, filed on Feb. 24, 2012, provisional application No. 61/604,892, filed on Feb. 29, 2012, provisional application No. 61/604,844, filed on Feb. 29, 2012, provisional application No. 61/611,822, filed on Mar. 16, 2012, provisional application No. 61/613,629, filed on Mar. 21, 2012, provisional application No. 61/636,879, filed on Apr. 23, 2012, provisional application No. 61/636,901, filed on Apr. 23, 2012, provisional application No. 61/599,154, filed on Feb. 15, 2012.

(51) Int. Cl.
*H04N 21/439* (2011.01)
*G09G 5/00* (2006.01)

(56) References Cited

U.S. PATENT DOCUMENTS

| | | | |
|---|---|---|---|
| 7,551,972 | B2 | 6/2009 | Tanaka et al. |
| 7,840,412 | B2 | 11/2010 | Aprea et al. |
| 7,860,720 | B2 | 12/2010 | Thumpudi et al. |
| 8,072,549 | B2 | 12/2011 | Inoue et al. |
| 8,170,239 | B2 | 5/2012 | Bailey et al. |
| 8,199,161 | B2 | 6/2012 | Kaga |
| 8,366,552 | B2 | 2/2013 | Perlman et al. |
| 8,488,796 | B2 | 7/2013 | Jot et al. |
| 8,625,589 | B2 | 1/2014 | Chen et al. |
| 9,100,671 | B2 | 8/2015 | Hwang et al. |
| 9,154,585 | B2 | 10/2015 | Kim et al. |
| 2003/0169782 | A1 | 9/2003 | Ichimura |
| 2003/0208771 | A1 | 11/2003 | Hensgen et al. |
| 2004/0249490 | A1 | 12/2004 | Sakai |
| 2005/0220193 | A1 | 10/2005 | Ichimura |
| 2006/0013405 | A1 | 1/2006 | Oh et al. |
| 2006/0265227 | A1 | 11/2006 | Sadamura et al. |
| 2006/0285012 | A1 | 12/2006 | Ejima et al. |
| 2007/0186015 | A1* | 8/2007 | Taft et al. .................. 710/16 |
| 2007/0189411 | A1 | 8/2007 | Goss |
| 2007/0198551 | A1 | 8/2007 | Barnes et al. |
| 2008/0080596 | A1 | 4/2008 | Inoue et al. |
| 2008/0101458 | A1 | 5/2008 | Kwon et al. |
| 2009/0027405 | A1 | 1/2009 | Kaga |
| 2009/0118017 | A1 | 5/2009 | Perlman et al. |
| 2009/0290600 | A1 | 11/2009 | Tatsuta et al. |
| 2010/0027819 | A1 | 2/2010 | Van Den Berghe et al. |
| 2010/0033627 | A1 | 2/2010 | Hayashi et al. |
| 2010/0182402 | A1* | 7/2010 | Nakajima et al. .............. 348/42 |
| 2010/0215044 | A1 | 8/2010 | Lee et al. |
| 2010/0303246 | A1 | 12/2010 | Walsh et al. |
| 2011/0142245 | A1* | 6/2011 | Toba et al. .................. 381/22 |
| 2011/0153043 | A1 | 6/2011 | Ojala |
| 2011/0157308 | A1* | 6/2011 | Mansho .................. 348/43 |
| 2011/0170614 | A1 | 7/2011 | Moriyama et al. |
| 2011/0194701 | A1 | 8/2011 | Zhan et al. |
| 2011/0196681 | A1 | 8/2011 | Ibaraki et al. |
| 2011/0234760 | A1 | 9/2011 | Yang et al. |
| 2012/0014396 | A1 | 1/2012 | Bae |
| 2012/0026157 | A1* | 2/2012 | Unkel et al. .................. 345/419 |
| 2012/0140035 | A1 | 6/2012 | Oh et al. |
| 2012/0140753 | A1 | 6/2012 | Lee et al. |
| 2012/0218981 | A1 | 8/2012 | Lee et al. |
| 2013/0222690 | A1 | 8/2013 | Kim et al. |
| 2013/0223448 | A1 | 8/2013 | Kim et al. |
| 2013/0223632 | A1 | 8/2013 | Kim et al. |

FOREIGN PATENT DOCUMENTS

| | | |
|---|---|---|
| CN | 1756086 A | 4/2006 |
| CN | 1960498 A | 5/2007 |
| CN | 101129069 A | 2/2008 |
| CN | 101355672 A | 1/2009 |
| CN | 101491002 A | 7/2009 |
| CN | 101563921 A | 10/2009 |
| EP | 1 617 413 A2 | 1/2006 |
| EP | 2 023 632 A1 | 2/2009 |
| EP | 2148326 A1 | 1/2010 |
| EP | 2 276 192 A2 | 1/2011 |
| EP | 2 388 688 A1 | 11/2011 |
| EP | 2 453 659 A2 | 5/2012 |
| JP | 2006-294120 A | 10/2006 |
| JP | 2011-124925 A | 6/2011 |
| JP | 2011-155640 A | 8/2011 |
| KR | 10-2008-0065820 A | 7/2008 |
| KR | 10-2009-0066582 A | 6/2009 |
| KR | 10-1099345 B1 | 12/2011 |
| WO | 2009/134085 A2 | 11/2009 |
| WO | 2011/005056 A2 | 1/2011 |

OTHER PUBLICATIONS

Search Report dated May 31, 2013 issued by the International Searching Authority in counterpart International Application No. PCT/KR2013/001130 (PCT/ISA/210).

Written Opinion dated May 31, 2013 issued by the International Searching Authority in counterpart International Application No. PCT/KR2013/001130 (PCT/ISA/237).

Search Report dated May 31, 2013 issued by the International Searching Authority in counterpart International Application No. PCT/KR2013/001128 (PCT/ISA/210).

Written Opinion dated May 31, 2013 issued by the International Searching Authority in counterpart International Application No. PCT/KR2013/001128 (PCT/ISA/237).

Search Report dated Jun. 14, 2013 issued by the International Searching Authority in counterpart International Application No. PCT/KR2013/001131 (PCT/ISA/210).

Written Opinion dated Jun. 14, 2013 issued by the International Searching Authority in counterpart International Application No. PCT/KR2013/001131 (PCT/ISA/237).

Search Report dated Jun. 20, 2013 issued by the International Searching Authority in counterpart International Application No. PCT/KR2013/001129 (PCT/ISA/210).

Written Opinion dated Jun. 20, 2013 issued by the International Searching Authority in counterpart International Application No. PCT/KR2013/001129 (PCT/ISA/237).

Communication, dated Apr. 15, 2014, issued by the European Patent Office in counterpart European Patent Application No. 13155194.7.

Communication, dated Apr. 17, 2014, issued by the European Patent Office in counterpart European Patent Application No. 13155154.1.

"A DTV Profile for Uncompressed High Speed Digital Interfaces CEA-861-E," Consumer Electronics Association, Mar. 31, 2008, 160 pages total, http://blogimg.chinaunix.net/blog/upfile2/090903185624.pdf.

"Information technology—MPEG audio technologies—Part 1: MPEG Surround," ISO/IEC JTC1/SC29/WG11, ISO/IEC FDIS 23003-1:2006(E), No. N8324, Jul. 21, 2006, 289 pages total.

Stockfisch, Mark W., "Prospective Standards for In-Home 3D Entertainment Products," 2010 Digest of Technical Papers, International Conference on Consumer Electronics (ICCE), IEEE, Jan. 9, 2010, pp. 133-134.

Communication dated Nov. 17, 2014, issued by the United States Patent and Trademark Office in counterpart U.S. Appl. No. 13/768,412.

Communication dated Apr. 22, 2015 issued by European Patent Office in counterpart European Application No. 13155273.9.

Communication dated Mar. 20, 2015 issued by United States Patent and Trademark Office in counterpart U.S. Appl. No. 13/768,330.

Communication dated May 21, 2015 issued by Untied States Patent and Trademark Office in counterpart U.S. Appl. No. 13/768,412.

Communication dated Apr. 22, 2015 issued by European Patent Office in counterpart European Application No. 13155294.5.

Communication dated Aug. 20, 2015 issued by the European Patent Office in counterpart European Patent Application No. 13 155 154.1.

Communication dated Sep. 24, 2015 issued by the United States Patent and Trademark Office in counterpart U.S. Appl. No. 13/768,330.

(56) References Cited

OTHER PUBLICATIONS

Communication dated Nov. 13, 2015 issued by the United States Patent and Trademark Office in counterpart U.S. Appl. No. 14/662,971.
Communication issued Dec. 31, 2015, issued by the State Intellectual Property Office of the People's Republic of China in counterpart Chinese Patent Application No. 201310053145.3.
Communication issued Jan. 25, 2016, issued by the Chinese Patent Office for Chinese Patent Application No. 201380020188.X.
Communication issued Jan. 26, 2016, issued by the Chinese Patent Office for Chinese Patent Application No. 201380020186.0.
Communication issued Jan. 29, 2016, issued by the Chinese Patent Office for Chinese Patent Application No. 201310052879.X.

* cited by examiner

FIG. 8
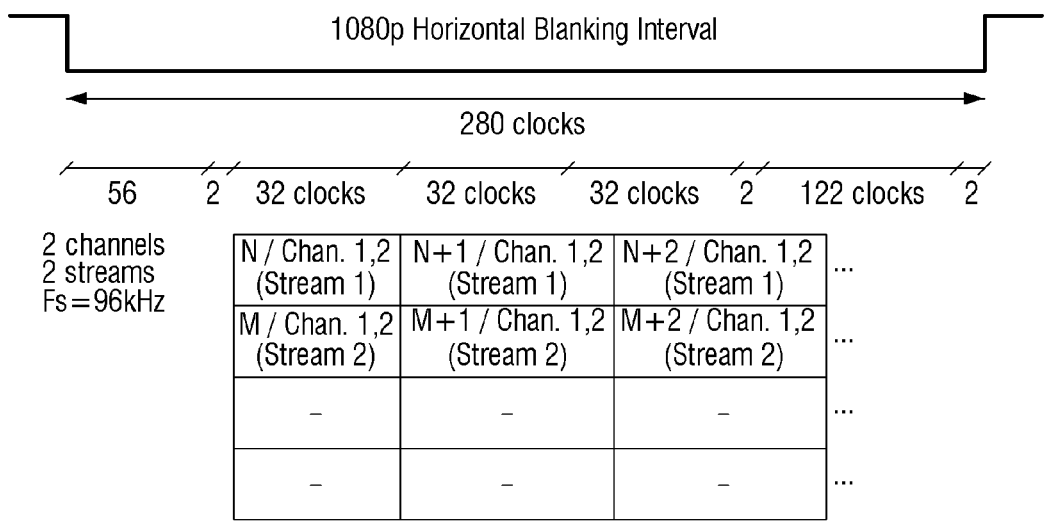
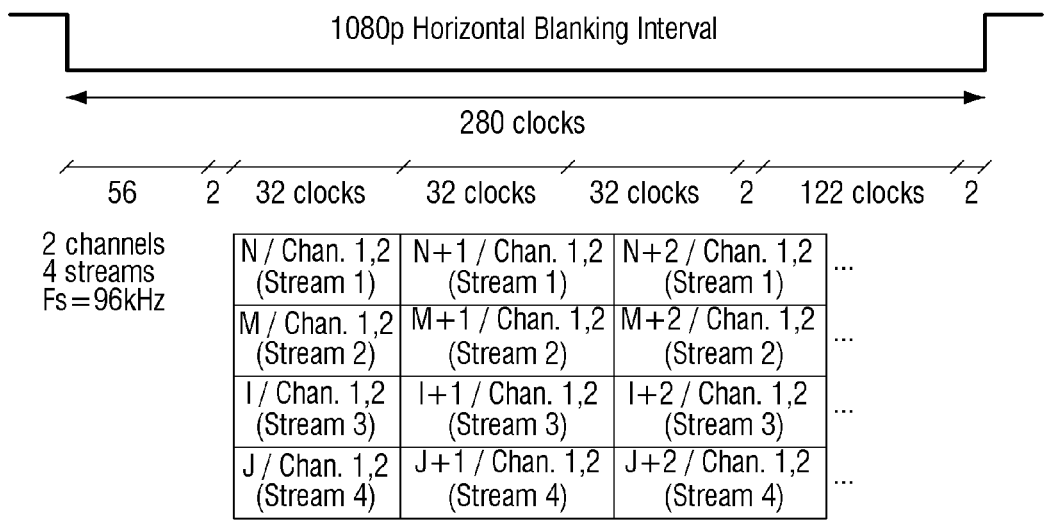

FIG. 11
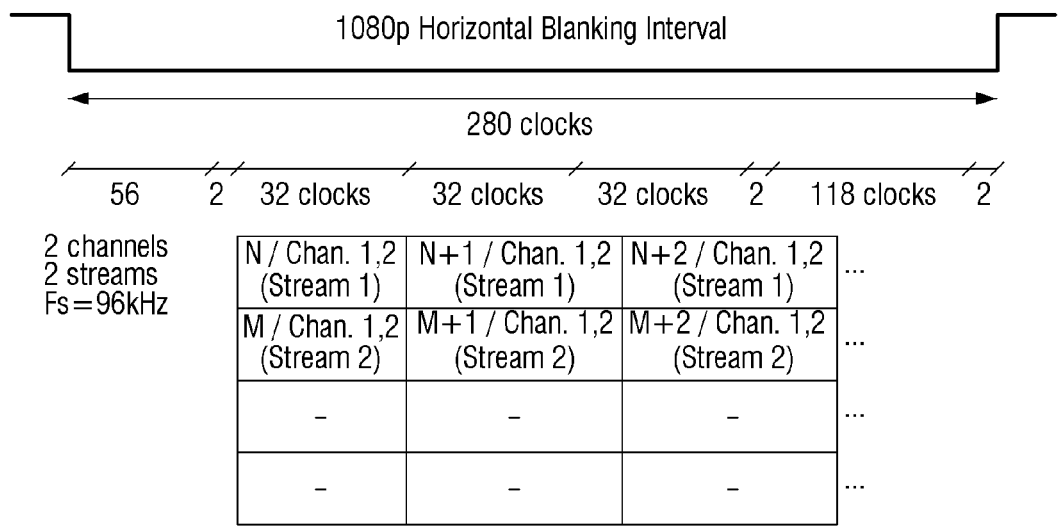
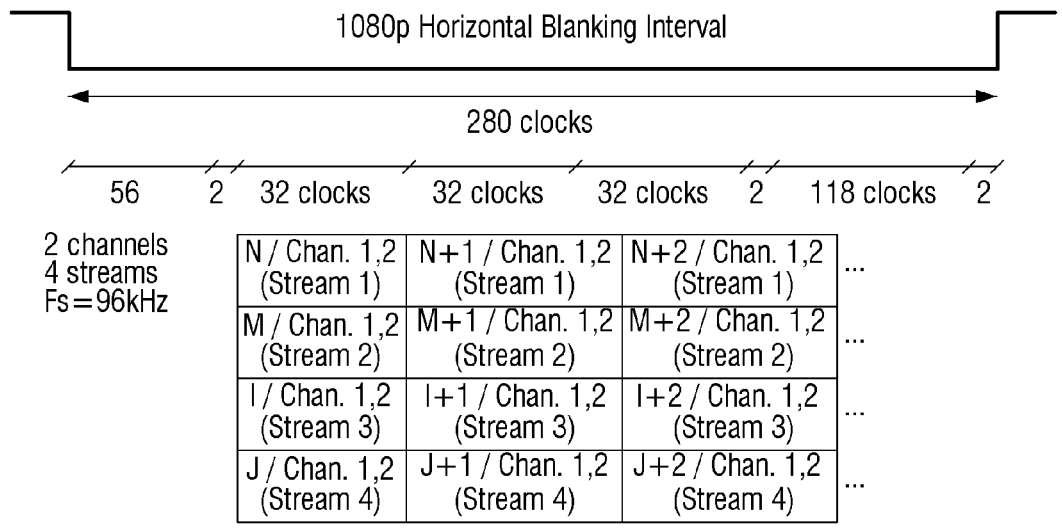

FIG. 12

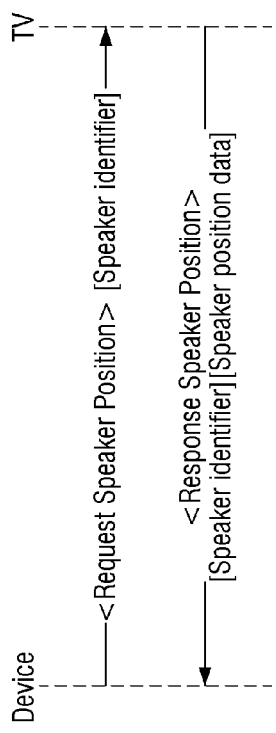

Device ----<Request Speaker Position> [Speaker identifier]----→ TV

Device ←----<Response Speaker Position>
          [Speaker identifier][Speaker position data]----

CEC Figure 38 Typical operation to get the position of a speaker

CEC Table 29 Operand Descriptions

| Name | | Range Description | Length | Purpose |
|---|---|---|---|---|
| [Speaker position data] | | "x_offset" | 1 Byte | Used by a source to get the gap away from the default X of a speaker |
| | | "y_offset" | 1 Byte | Used by a source to get the gap away from the default Y of a speaker |
| | | "z_offset" | 1 Byte | Used by a source to get the gap away from the default Z of a speaker |
| | | "Angle_offset" | 2 Bytes | Used by a source to get the gap away from the default angle of a speaker |
| [Speaker identifier] | "front left" | 0x00 | 5 bits | Specifies the type of speaker placement |
| | "front right" | 0x01 | | |
| | ... | 0x01 | | |
| | "LFE2" | 0x1F | | |

DATA TRANSMITTING APPARATUS, DATA RECEIVING APPARATUS, DATA TRANSCEIVING SYSTEM, DATA TRANSMITTING METHOD, AND DATA RECEIVING METHOD

CROSS-REFERENCE TO RELATED APPLICATIONS

This application claims priority from U.S. Provisional Application Nos. 61/636,901, filed on Apr. 23, 2012, in the U.S. Patent and Trademark Office, 61/602,975, filed on Feb. 24, 2012, in the U.S. Patent and Trademark Office, 61/599,154, filed on Feb. 15, 2012, in the U.S. Patent and Trademark Office, 61/602,978, filed on Feb. 24, 2012, in the U.S. Patent and Trademark Office, 61/611,822, filed on Mar. 16, 2012, in the U.S. Patent and Trademark Office, 61/604,892, filed on Feb. 29, 2012, in the U.S. Patent and Trademark Office, 61/613,629, filed on Mar. 21, 2012, in the U.S. Patent and Trademark Office, 61/636,879, filed on Apr. 23, 2012, in the U.S. Patent and Trademark Office, 61/641,580, filed on May 2, 2012, in the U.S. Patent and Trademark Office, 61/647,628, filed on May 16, 2012, in the U.S. Patent and Trademark Office, 61/604,844, filed on Feb. 29, 2012, in the U.S. Patent and Trademark Office, and Korean Patent Application No. 10-2013-0000373, filed on Jan. 2, 2013, in the Korean Intellectual Property Office, the disclosures of which are incorporated herein by reference in their entirety.

BACKGROUND

1. Field

Apparatuses and methods consistent with the exemplary embodiments relate to transmitting and receiving data, and more particularly, to a data transmitting apparatus, a data receiving apparatus, a data transceiving system, a data transmitting method, and a data receiving method, for transmitting a multi-channel audio signal and/or a multi-stream audio signal in a wired interface environment.

2. Description of the Related Art

Lately, with the establishment of multimedia environments, high-speed wired interface environments for transmission of various data are proposed. For example, High Definition Multimedia Interface (HDMI) and Mobile High-definition Link (MHL) have specified various transmission formats of image data, audio signals, and control signals.

First, with the development of multimedia environments, studies into transmission formats for multi-channel audio signals for the purpose of transmitting and receiving high-quality sound are actively conducted. Up to now, formats for audio channels from 2 channels to 8 channels have been proposed. However, in a future multimedia environment, a transmission format for audio signals having 9 channels or more will be newly proposed.

Also, a transmission format for multi-stream audio signals for a multi-view environment that allows different viewers to watch different contents through a single display will be proposed.

In this situation, there is a need for a format which informs a source device of information about audio channels of 9 channels or more, supported by a display, and information about a multi-stream audio specification.

SUMMARY

Exemplary embodiments of the application overcome the above disadvantages and other disadvantages not described above. Also, the exemplary embodiments are not required to overcome the disadvantages described above, and an exemplary embodiment may not overcome any of the problems described above.

The exemplary embodiments provide a data transmitting apparatus, a data receiving apparatus, a data transceiving system, a data transmitting method, and a data receiving method, for providing a source device with information about audio channels of 9 channels or more, supported by a display, and/or information about a multi-stream audio specification, According one exemplary embodiment, a data transmitting apparatus includes a block generator which generates an Extended Display Identification Data (EDID) block regarding multi-channel audio data, and a transmitter which transmits the EDID block to a data receiving apparatus, the EDID block includes at least one of a first sub block representing 3D audio characteristics of the multi-channel audio data, a second sub block representing 3D speaker placement information of the multi-channel audio data, and a third sub block representing multi-stream audio characteristics of the multi-channel audio data.

The first sub block may include at least one of a field representing information about the number of 3D audio descriptors, and a 3D audio descriptor field representing information about 3D audio data supported by the data transmitting apparatus.

The 3D audio descriptor field may include at least one of a first sub field representing format information of the multi-channel audio data, a second sub field representing the number of channels of the multi-channel audio data, and a third sub field representing sampling frequency information of the multi-channel audio data.

The second sub block may include a 3D speaker placement description field representing speaker placement information of the multi-channel audio data.

The 3D speaker placement descriptor field may include at least one of a fourth sub field representing information about a channel allocation standard type of the multi-channel audio data, and a fifth sub field representing information about speaker placement and arrangement of the multi-channel audio data.

The channel allocation standard type may be a channel allocation standard type regarding at least one of 10.2 channels, 22.2 channels, 30.2 channels, multiple channels more than 30.2 channels, and multiple channels less than 10.2 channels.

The third sub block may include at least one of a field representing the number of streams of multi-stream audio supported by the data transmitting apparatus, and a shortened audio descriptor field representing the characteristics of audio corresponding to the individual streams.

A data receiving apparatus includes a receiver which receives an Extended Display Identification Data (EDID) block regarding multi-channel audio data from a data transmitting apparatus, and an analyzer which analyzes the EDID block, the EDID block includes at least one of a first sub block representing 3D audio characteristics of the multi-channel audio data, a second sub block representing 3D speaker placement information of the multi-channel audio data, and a third sub block representing multi-stream audio characteristics of the multi-channel audio data.

The first sub block may include at least one of a field representing information about the number of 3D audio descriptors, and a 3D audio descriptor field representing information about 3D audio data supported by the data transmitting apparatus.

The 3D audio descriptor field may include at least one of a first sub field representing format information of the multi-channel audio data, a second sub field representing the number of channels of the multi-channel audio data, and a third sub field representing sampling frequency information of the multi-channel audio data.

The second sub block may include a 3D speaker placement description field representing speaker placement information of the multi-channel audio data.

The 3D speaker placement descriptor field may include at least one of a fourth sub field representing information about a channel allocation standard type of the multi-channel audio data, and a fifth sub field representing information about speaker placement and arrangement of the multi-channel audio data.

The channel allocation standard type may be a channel allocation standard type regarding at least one of 10.2 channels, 22.2 channels, 30.2 channels, multiple channels more than 30.2 channels, and multiple channels less than 10.2 channels.

The third sub block may include at least one of a field representing the number of streams of multi-stream audio supported by the data transmitting apparatus, and a shortened audio descriptor field representing the characteristics of audio corresponding to the individual streams.

A data transceiving system includes a data transmitting apparatus which generates an Extended Display Identification Data (EDID) block regarding multi-channel audio data, and to transmit the EDID block to a data receiving apparatus, and a data receiving apparatus which receives and analyze the EDID block, the EDID block includes at least one of a first sub block representing 3D audio characteristics of the multi-channel audio data, a second sub block representing 3D speaker placement information of the multi-channel audio data, and a third sub block representing multi-stream audio characteristics of the multi-channel audio data.

A data transmitting method includes generating an Extended Display Identification Data (EDID) block regarding multi-channel audio data; and transmitting the EDID block to a data receiving apparatus. The EDID block includes at least one of a first sub block representing 3D audio characteristics of the multi-channel audio data, a second sub block representing 3D speaker placement information of the multi-channel audio data, and a third sub block representing multi-stream audio characteristics of the multi-channel audio data.

The first sub block may include at least one of a field representing information about the number of 3D audio descriptors, and a 3D audio descriptor field representing information about supportable 3D audio data.

The 3D audio descriptor field may include at least one of a first sub field representing format information of the multi-channel audio data, a second sub field representing the number of channels of the multi-channel audio data, and a third sub field representing (sampling) frequency information of the multi-channel audio data.

A data receiving method includes receiving an Extended Display Identification Data (EDID) block regarding multi-channel audio data from a data transmitting apparatus, and analyzing the EDID block, the EDID block includes at least one of a first sub block representing 3D audio characteristics of the multi-channel audio data, a second sub block representing 3D speaker placement information of the multi-channel audio data, and a third sub block representing multi-stream audio characteristics.

The first sub block may include at least one of a field representing information about the number of 3D audio descriptors, and a 3D audio descriptor field representing information about 3D audio data supported by the data transmitting apparatus.

According to the exemplary embodiments, as described above, by generating an Extended Display Identification Data (EDID) block including at least one of 3D audio characteristics, 3D speaker placement information, and multi-stream audio characteristics of multi-channel audio data and transmitting the EDID block, it is possible to provide a format which comprising a source of audio channels of 9 audio channels or more, supported by a display, and a multi-stream audio specification.

Additional and/or other aspects of the exemplary embodiments will be set forth in part in the description which follows and, in part, will be obvious from the description, or may be learned by practice of the application.

BRIEF DESCRIPTION OF THE DRAWINGS

The above and/or other aspects will be more apparent by describing certain exemplary embodiments with reference to the accompanying drawings, in which:

FIG. 8 is a view illustrating a transport packet stream of audio samples according to an exemplary embodiment.

FIG. 11 is a view illustrating a transmission stream of a multi-streams audio sample packet according to an exemplary embodiment.

FIG. 12 is a mimetic diagram showing the transmission of the speaker position information using CEC.

DETAILED DESCRIPTION OF THE EXEMPLARY EMBODIMENTS

Figure 1:
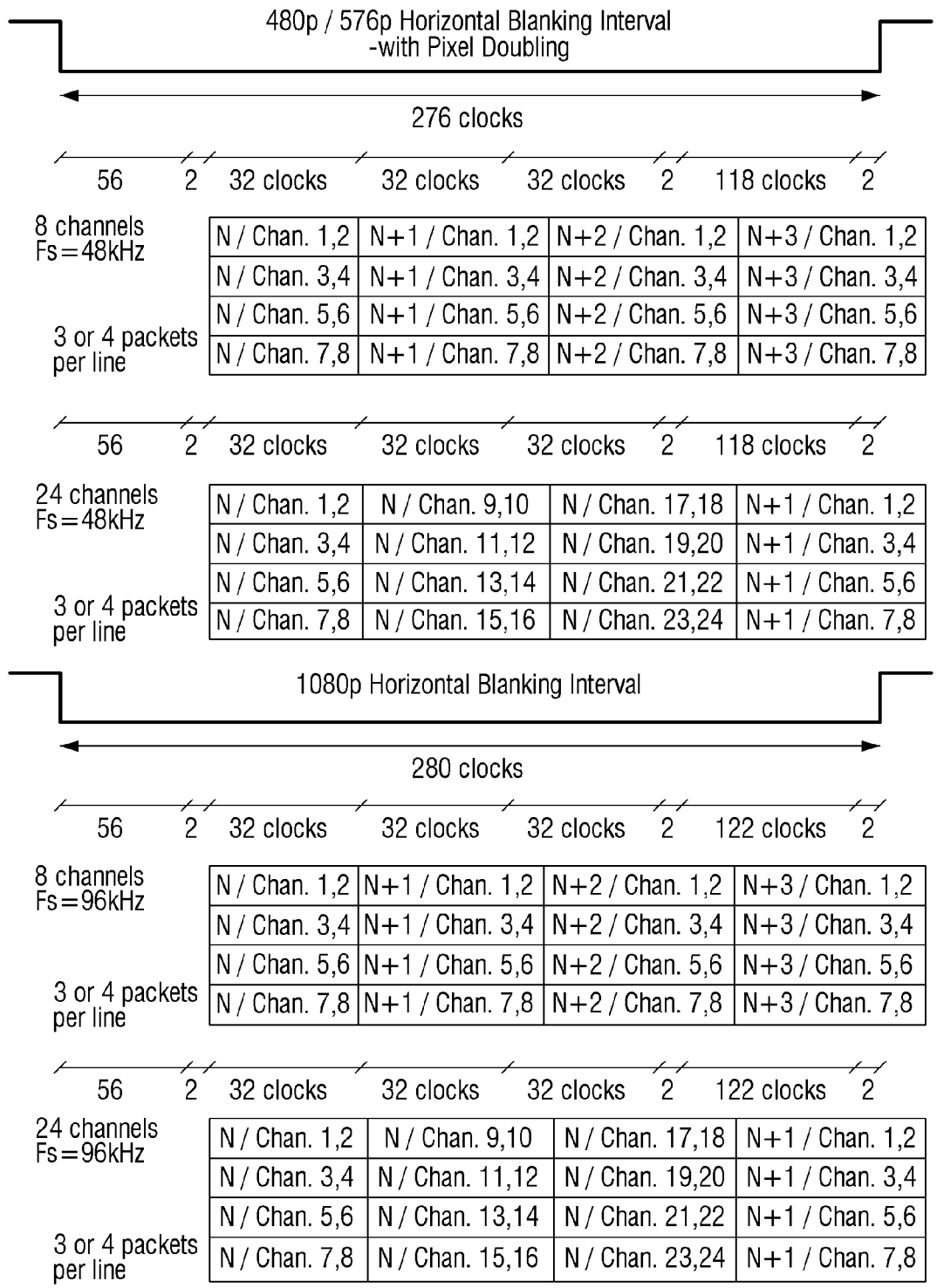
FIG. 1 is a view illustrating a transmission timing of a 3D audio signal.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the application. Thus, it is apparent that the exemplary embodiments may be carried out without those specifically defined matters. Also, well-known functions or constructions are not described in detail since they would obscure the exemplary embodiments with unnecessary detail.

Multi-channel audio means the audio signal with multiple audio channels. The multi-channel audio is generally classified into two-dimensional (2D) audio channels and three-dimensional (3D) audio channels. 2D audio channels hold between 2 audio channels to 8 audio channels, and these audio channels refer to the audio channel where the speakers corresponding to each channel are placed on the plane. On the other hand, 3D audio channels hold more than 9 audio channels, and speakers corresponding to each channel are arranged in three-dimensional space including the plane. 3D audio, for example, uses a layout of the channels that are defined in TTA (10.2ch), SMPTE2036-2 (22.2ch) or IEC62574 (30.2ch). 3D audio includes a down-mixed audio stream as defined herein.

Multiple audio streams is an audio signal including the audio signal identifying and corresponding to each view in a multi-view environment where over two identical contents may be watched. Audio signals for each view may be a multi-channel audio. For example, the Multi-Stream Audio may be a set of audio streams related in the video stream which is transmitted by using a 3D video format when supporting multi-view video such as a dual view or quad view game.

An audio for a high-speed wired interface on the basis of the 3D Audio of 32 channels (or more) and multi-stream audio (Multi-Stream Audio) for multi-view displays will be discussed later. In particular, the changes which will be described below are included to support the new audio features.

However, the exemplary embodiments may be applied to various high-speed wired interface transmission standards which include HDMI and MHL standard in the equivalent range of the technical concept of the exemplary embodiments, so the extent of a right of the exemplary embodiments may also pertain to similar high-speed wired transmission interface standards.

The definition of a new high-speed wired interface packet (3D Audio Sample Packet, 3D One Bit Audio Sample Packet, Audio Metadata Packet, Multi-Stream Audio Sample Packet and Multi-Stream One Bit Audio Sample Packet) transmitted through the data island period, the packetization process for the packet, and the definition of high-speed wired interface audio data block within E-EDID to support the discovery of the ability in accordance with the new features, will be discussed later. The present specification will be described using HDMI as an example, so the specifications that are not newly defined in the specification basically conform to the HDMI1.4b and have not been changed from HDMI1.4b.

The content that is disposed with HDMI 1.4b herein, will be replaced by newly disclosed contents, however, the contents which have been disposed are compatible with the content described in HDMI 1.4b. Also the newly disclosed contents may be applied in other high-speed wired interface environments including MHL.

The present disclosure refers to the following.

HDMI, HDMI Licensing, LLC, "High-Definition Multimedia Interface Specification Version 1.4b", Oct. 11, 2011

The True Audio (TTA), TTAK.KO-07.0098, "Audio Signal Formats for Ultra High Definition (UHD) Digital TV", Dec. 21, 2011

SMPTE, SMPTE 2036-2:2008, "UHDTV Audio characteristics and audio channel mapping for program production", 2008

IEC, IEC 62574 ed 1.0, "Audio, video and multimedia systems General channel allocation of multi-channel audio, Apr. 7, 2011

MHL, LLC, "Mobile High-definition Link version 2.0", February, 2012

TTA: Telecommunications Technology Association

Overview

Basic audio function includes L-PCM audio stream of IEC 60958 having a sample rate of 32 kHz, 44.1 kHz, or 48 kHz. It may accommodate a normal stereo stream. It may be assumed that there is a high-speed wired interface environment which may optionally transmit the audio with audio channels 3-32 in sample rate of 192 kHz. In addition, it is available to transmit the audio stream of IEC 61937 compressed format with a bit rate of up to 49.152 Mbps. (For example, surround sound) It is available to transmit one bit audio in compressed form which is called as audio channels 32 and DST in one bit audio 2 under the high-speed wired interface environment. Also, the speaker may transmit a 3D audio stream which may be anywhere to 3D space. The 3D audio stream may include up to 32 audio channels, and is transmitted in a data island period through continuous packets. In addition, when supporting the multi-view video streaming, a plurality of audio streams may be transmitted. (eg., in case of a dual-view/quad view game with a plurality of audio per a view). In such case, 4 stereo audio streams may be supported.

Definition of Packet in Data Island Period

Table 5-8 is replaced with Table 1 below in section 5.3.1 Packet Header of specification HDMI 1.4b.

TABLE 1

Packet Types

| Packet Type Value | Packet Type | Described in Section |
|---|---|---|
| 0x00 | Null | 5.3.2 |
| 0x01 | Audio Clock Regeneration (N/CTS) | 5.3.3 |
| 0x02 | Audio Sample(L-PCM and IEC 61937 compressed formats) | 5.3.4 |
| 0x03 | General Control | 5.3.6 |
| 0x04 | ACP Packet | 5.3.7 |
| 0x05 | ISRC1 Packet | 5.3.8 |
| 0x06 | ISRC2 Packet | " |
| 0x07 | One Bit Audio Sample Packet | 5.3.9 |
| 0x08 | DST Audio Packet | 5.3.10 |
| 0x09 | High Bitrate(HBR) Audio Stream Packet (IEC 61937) | 5.3.11 |
| 0x0A | Gamut Metadata Packet | 5.3.12 |
| 0x0B | 3D Audio Sample Packet | 5.3.13 |
| 0x0C | 3D One Bit Audio Sample Packet | 5.3.14 |
| 0x0D | Audio Metadata Packet | 5.3.15 |
| 0x0E | Multi-Stream Audio Sample Packet | 5.3.16 |
| 0x0F | Multi-Stream One Bit Audio Sample Packet | 5.3.17 |
| 0x80 + InfoFrame Type | InfoFrame Packet | 5.3.5 |
| 0x81 | Vendor-Specific InfoFrame | 8.2.3 |
| 0x82 | AVI InfoFrame | 8.2.1 |
| 0x83 | Source Product Descriptor InfoFrame | — |
| 0x84 | Audio InfoFrame | 8.2.2 |
| 0x85 | MPEG Source InfoFrame | — |

\* The layout of packets for the InfoFrames refers to the Section 8.2 of the specification HDMI 1.4b.

As illustrated in Table 1, the new packet is defined in the sections from 0x0B to 0x0F. At 0x0B, a 3D Audio Sample Packet is defined, and a 3D One bit Audio Sample Packet is defined at 0x0C. Also, an Audio Meta Data Packet is defined at 0x0D, a Multi-Stream Audio Sample Packet is at 0x0E, and a Multi-Stream One bit Audio Sample Packet is defined at 0x0F. The present disclosure will describe the newly defined packet in detail.

In addition, other various exemplary embodiments that do not newly define the packet as above will also be described in the present disclosure. The packet proposal of Table 1 is named as the first exemplary embodiment. Various exemplary embodiments will be named as the second exemplary embodiment, the third exemplary embodiment . . . and so on. Various exemplary embodiments will be described mainly with regard to their differences with the first exemplary embodiment.

1.1. 3D Audio Sample Packet

The First Exemplary Embodiment

In the first exemplary embodiment, 3D audio in Linear Pulse Code Modulation (L-PCM) audio format is transmitted using 3D audio sample packets that are newly defined. As described above, the 3D audio is defined as audio where speakers may be disposed at a position each determined by the 3D audio standards (eg 10.2ch, 22.2ch, such 30.2ch) in 3D space.

A 3D audio stream includes up to 32 audio channels (or more) and is transmitted via continuous packets in the data island period. Each packet contains up to 8 audio channels. To indicate the position of the packet within the 3D audio sample, the packet header contains a sample start and a sample_present bit. This will be explained later. The following table shows the 3D audio sample packet header.

TABLE 2

| | | | | 3D Audio Sample Packet Header | | | | |
|---|---|---|---|---|---|---|---|---|
| Byte/ Bit # | 7 | 6 | 5 | 4 | 3 | 2 | 1 | 0 |
| HB0 | 0 | 0 | 0 | 0 | 1 | 0 | 1 | 1 |
| HB1 | Rsvd (0) | Rsvd (0) | Rsvd (0) | sample_start | sample_present sp3 | Sample_present sp2 | Sample_present sp1 | Sample_present sp0 |
| HB2 | B3 | B2 | B1 | B0 | sample_flat sp3 | sample_flat sp2 | sample_flat sp1 | sample_flat sp0 |

Each field contains the following information.

In Table 2, sample_start:[1 bit] indicates if sample start is 1, current packet indicates that it is the first packet of 3D audio samples. In other words, sample_start indicates the start of the 3D audio stream. Sink identifies the beginning part of the sample using a sample_start sink.

Besides that, the current 3D audio sample packet is the first packet of the 3D audio sample. Sample_start=1 also indicates that it has been completely packetized as the 8 audio channels. However, when transmitting the down mixed 3D audio below the 8 audio channels, it may be packetized only below 8 audio channels.

Also, sample_start=0 indicates that the current 3D audio sample packet is the middle or the last packet of the 3D audio sample and that it contains 8 or less audio channels. Only setting of 5 valid sample_present bits for 3D audio sample packet exists.

In addition, sample_present.spX: [4 fields, 1 bit each] indicates whether sub-packet X contains the audio sample or not. One 3D audio sample data is included in more than two of 3D audio sample packets, and each 3D audio sample packet includes four sub-packets. Therefore, each 3D audio sample packet header includes a total of four sample_present bits corresponding to each sub-packet. Each sample_present bit indicates whether a corresponding sub-packet contains a part of the 3D audio or not.

Further, sample_flat.spX: [4 fields, 1 bit each] sub-packet X indicates whether it represents a sample of a flatline. It is only valid, if sample_present.spX is set. If there is no useful audio data that is available in sources, four sample_flat.spX bits are set. This happens while there are changes in sampler rate or temporary stream interruptions. When sample_flat. spX is set, the sub-packet X still represents a sample period, yet does not contain useful audio data. Sample_flat.spX bit is only valid if the corresponding sample_present.spX bit is set.

Adjacent 3D audio samples packets may be used to transmit single 3D audio samples including 32 channels of the L-PCM audio 9. (Ie, frames of 5~16 IEC 60958).

Table 3 shows the valid values of Sample_Present Bit.

TABLE 3

| Valid Sample_Present Bit Configurations for 3D Audio transmission | | | | |
|---|---|---|---|---|
| SP0 | SP1 | SP1 | SP3 | Description |
| 0 | 0 | 0 | 0 | No Subpackets contain parts of the audio sample |
| 1 | 0 | 0 | 0 | Only Subpacket 0 contains one part of the audio sample |
| 1 | 1 | 0 | 0 | Subpackets 0 and 1 contain two contiguous parts of the audio sample |
| 1 | 1 | 1 | 0 | Subpackets 0, 1 and 2 contain three contiguous parts of the audio sample |

TABLE 3-continued

| Valid Sample_Present Bit Configurations for 3D Audio transmission | | | | |
|---|---|---|---|---|
| SP0 | SP1 | SP1 | SP3 | Description |
| 1 | 1 | 1 | 1 | Subpackets 0, 1 and 3 contain four contiguous parts of the audio sample |

In Table 3, B.X: [4 fields, 1 bit each] indicates that when sub-packet X includes the first frame among 192 frames that are composing IEC 60958 block, it becomes B.X=1. Otherwise B.X=0.

The 3D audio sample packet includes audio samples packet header shown in Table 2 and four sub-packets. Each sub-packet of the 3D audio sample packet includes a 3D audio sample data that is defined as IEC 60958.

If the source needs 3D down mix audio stream, down-mixed audio stream may be transmitted using the 3D audio sample packet. If Sink does not support the 3D audio, the source may not transmit the 3D audio sample packets. Converting the 3D audio into legacy audio format is beyond the range of the disclosure. A number of different sub-packet layouts exist based on the number of the channel. Tables 4~6 below each show an example of the 3D audio packet layout for channel 12, 24, and 32.

TABLE 4

Example of 3D Audio Sample Packet Layout for 12 channels

| Packet # | sample_start Value | Num Channels | Samples | Subpkt 0 | Subpkt 1 | Subpkt 2 | Subpkt3 |
|---|---|---|---|---|---|---|---|
| 0 | 1 | 12 | 1 | Chnl 1, 2 (sample 0) | Chnl 3, 4 (sample 0) | Chnl 5, 6 (sample 0) | Chnl 7, 8 (sample 0) |
| 1 | 0 | | | Chnl 9, 10 (sample 0) | Chnl 11, 12 (sample 0) | empty | empty |

TABLE 5

Example of 3D Audio Sample Packet Layout for 24 channels

| Packet # | Sample_start Value | Num Channels | samples | Subpkt 0 | Subpkt 1 | Subpkt 2 | Subpkt 3 |
|---|---|---|---|---|---|---|---|
| 0 | 1 | 24 | 1 | Chnl 1, 2 (sample 0) | Chnl 3, 4 (sample 0) | Chnl 5, 6 (sample 0) | Chnl 7, 8 (sample 0) |
| 1 | 0 | | | — | — | — | — |
| 2 | 0 | | | Chnl 17, 18 (sample 0) | Chnl 19, 20 (sample 0) | Chnl 21, 22 (sample 0) | Chnl 23, 24 (sample 0) |

TABLE 6

Example of 3D Audio Sample Packet Layout for 32 channels (Max)

| Packet # | Sample_start Value | Num Channels | samples | Subpkt 0 | Subpkt 1 | Subpkt 2 | Subpkt 3 |
|---|---|---|---|---|---|---|---|
| 0 | 1 | 32 (Max) | 1 | Chnl 1, 2 (sample 0) | Chnl 3, 4 (sample 0) | Chnl 5, 6 (sample 0) | Chnl 7, 8 (sample 0) |
| 1 | 0 | | | — | — | — | — |
| 2 | 0 | | | — | — | — | — |
| 3 | 0 | | | Chnl 25, 26 (sample 0) | Chnl 27, 28 (sample 0) | Chnl 29, 30 (sample 0) | Chnl 31, 32 (sample 0) |

FIG. 1 is a diagram illustrating a transmission timing of a 3D audio signal.

FIG. 1 shows that a horizontal blanking interval transmits three channel 8 2D audio signal samples. In a 3D audio signal of the channel 24, one sample is transmitted for the same period of time.

Video Dependency

Table 7 shows sample rates that are available for transmission of 3D audio in the timing of the various video formats that are specified in CEA-861-F the (D or E is available). Here, it is assumed that 58 TMDS clock period of horizontal blanking interval is necessary for content protection re-synchronization. 3D audio transmission may be supported by the 3D audio sample packets.

Table 7 represents maximum sampling frequencies of 3D Audio for 24 bits video format timing (informative).

TABLE 7

Maximum Sampling Frequency of 3D Audio for Video Format Timing

| Description | Format Timing | Pixel Repetition | Vertical Freq (Hz) | Max fs 10.2 ch (kHz) | Max fs 22.2 ch (kHz) | Max fs 30.2 ch (kHz) | Max frame rate 2 ch, comp* |
|---|---|---|---|---|---|---|---|
| VGA | 640 × 480 p | none | 59.94/60 | 32 | X | X | 256 |
| 480 i | 1440 × 480 i | 2 | 59.94/60 | 44.1 | X | X | 256 |
| 480 i | 2880 × 480 i | 4 | 59.94/60 | 96 | 48 | 48 | 768 |
| 240 p | 1440 × 240 p | 2 | 59.94/60 | 44.1 | X | X | 256 |
| 240 p | 2880 × 240 p | 4 | 59.94/60 | 96 | 48 | 48 | 768 |
| 480 p | 720 × 480 p | none | 59.94/60 | X | X | X | 192 |
| 480 p | 1440 × 480 p | 2 | 59.94/60 | 88.2 | 48 | 44.1 | 705.6 |
| 480 p | 2880 × 480 p | 4 | 59.94/60 | 192 | 96 | 96 | 1536 |

TABLE 7-continued

Maximum Sampling Frequency of 3D Audio for Video Format Timing

| Description | Format Timing | Pixel Repetition | Vertical Freq (Hz) | Max fs 10.2 ch (kHz) | Max fs 22.2 ch (kHz) | Max fs 30.2 ch (kHz) | Max frame rate 2 ch, comp* |
|---|---|---|---|---|---|---|---|
| 720 p | 1280 × 720 p | none | 59.94/60 | 192 | 96 | 96 | 1536 |
| 1080 i | 1920 × 1080 i | none | 59.94/60 | 96 | 48 | 48 | 768 |
| 1080 p | 1920 × 1080 p | none | 59.94/60 | 192 | 96 | 96 | 1536 |
| 2160 p | 3840 × 2160 p | none | 59.94/60 | 192 | 192 | 192 | 1536 |
| 2160 p (SMPTE) p | 4096 × 2160 | none | 59.94/60 | 192 | 192 | 192 | 1536 |
| 480 i/120 | 1440 × 480 i | 2 | 119.88/120 | 88.2 | 48 | 44.1 | 705.6 |
| 480 p/120 | 720 × 480 p | nunc | 119.88/120 | 48 | 32 | X | 384 |
| 720 p/120 | 1280 × 720 p | none | 119.88/120 | 192 | 192 | 192 | 1536 |
| 1080 i/120 | 1920 × 1080 i | none | 119.88/120 | 192 | 96 | 96 | 1536 |
| 1080 p/120 | 1920 × 1080 p | none | 119.88/120 | 192 | 192 | 192 | 1536 |
| 480 i/240 | 1440 × 480 i | 2 | 239.76/240 | 176.4 | 96 | 88.2 | 1411.2 |
| 480 p/240 | 720 × 480 p | none | 239.76/240 | 96 | 48 | 48 | 768 |
| 50 Hz Formats | | | | | | | |
| 576 i | 1440 × 576 i | 2 | 50 | 44.1 | X | X | 256 |
| 576 i | 2880 × 576 i | 4 | 50 | 96 | 48 | 48 | 768 |
| 288 p | 1440 × 288 p | 2 | 50 | 44.1 | X | X | 256 |
| 288 p | 2880 × 288 p | 4 | 50 | 96 | 48 | 48 | 768 |
| 576 p | 720 × 576 p | none | 50 | X | X | X | 192 |
| 576 p | 1440 × 576 p | 2 | 50 | 88.2 | 48 | 44.1 | 705.6 |
| 576 p | 2880 × 576 p | 4 | 50 | 192 | 96 | 96 | 1536 |
| 720 p/50 | 1280 × 720 p | none | 50 | 192 | 192 | 96 | 1536 |
| 1080 i/50 | 1920 × 1080 i | none | 50 | 192 | 176.4 | 96 | 1536 |
| 1080 p/50 | 1920 × 1080 p | none | 50 | 192 | 192 | 192 | 1536 |
| 2160 p | 3840 × 2160 p | none | 50 | 192 | 192 | 192 | 1536 |
| 2160 (SMPTE) | 4096 × 2160 p | none | 50 | 192 | 192 | 192 | 1536 |
| 1080 i, 1250 10 cal | 1920 × 1080 i | none | 50 | 96 | 88.2 | 48 | 1024 |
| 576 i/100 | 1440 × 576 i | 2 | 100 | 88.2 | 48 | 44.1 | 705.6 |
| 576 p/100 | 720 × 576 p | none | 100 | 48 | 32 | X | 384 |
| 720 p/100 | 1280 × 720 p | none | 100 | 192 | 192 | 192 | 1536 |
| 1080 i/100 | 1920 × 1080 i | none | 100 | 192 | 192 | 192 | 1536 |
| 1080 p/100 | 1920 × 1080 p | none | 100 | 192 | 192 | 192 | 1536 |
| 576 i/200 | 1440 × 576 i | 2 | 200 | 176.4 | 96 | 88.2 | 1411.2 |
| 576 p/200 | 720 × 576 p | none | 200 | 96 | 48 | 48 | 768 |
| 24-30 Hz Formats | | | | | | | |
| 720 p | 1280 × 720 p | none | 24 | 192 | 192 | 192 | 1536 |
| 720 p | 1280 × 720 p | none | 25 | 192 | 192 | 192 | 1536 |
| 720 p | 1280 × 720 p | none | 29.97/30 | 192 | 192 | 192 | 1536 |
| 1080 p | 1920 × 1080 p | none | 24 | 192 | 192 | 96 | 1536 |
| 1080 p | 1920 × 1080 p | none | 25 | 192 | 176.4 | 96 | 1536 |
| 1080 p | 1920 × 1080 p | none | 29.97/30 | 96 | 48 | 48 | 768 |
| 2160 p | 3840 × 2160 p | none | 24 | 192 | 192 | 192 | 1536 |
| 2160 p | 3840 × 2160 p | none | 25 | 192 | 192 | 192 | 1536 |
| 2160 p | 3840 × 2160 p | none | 29.97/30 | 192 | 192 | 192 | 1536 |
| 2160 (SMPTE) | 4096 × 2160 p | none | 24 | 192 | 192 | 192 | 1536 |
| 2160 (SMPTE) | 4096 × 2160 p | none | 25 | 192 | 192 | 192 | 1536 |
| 2160 (SMPTE) | 4096 × 2160 p | none | 29.97/30 | 192 | 96 | 96 | 1536 |

Second Exemplary Embodiment

Unlike the first exemplary embodiment, it is also available to consider the use of the related art audio sample packet format by modifying it.

As shown below in Table 8, the reserved area of related art audio sample packet may be used as a segment_indicator. In one exemplary embodiment, the segment_indicator may be expressed as two bits. If segment_indicator=00, it represents the start packet, if segment_indicator=01, it represents odd packet among middle packets, if segment_indicator=10, it represents even packet among middle packets, and if segment_indicator=11, it represents the last packet. Of course, these examples are in one exemplary embodiment, and packets matching bits may vary.

This structure makes it is available to figure out whether the segment is lost or not. If there is a loss in the segment, there is a plan of dropping the entire "sample Nth" which contains the corresponding segment or just discarding the lost Audio Sample Packet. Here, a segment is a term referring to an individual Audio Sample Packet which includes the group when more than one Audio Sample Packet is grouped.

The layout in HDMI 1.4b displays the information on the number of channels and samples. For example, one audio sample packet includes four audio samples of 2 channels or one audio sample of 8 channels. The exemplary embodiments may extend it and leave layout_ext field in the related art reserved area and display the information about whether to provide 3D audio along with the layout or not.

For example, if layout_ext=0 & layout=0, 1, it still represents the number of channels and 2D audio samples, but if layout_ext=1 & layout=0, it represents the 3D audio samples. If layout_ext=1 & layout=1, it is also available to display the multi-stream audio samples.

Fields other than the fields which are described specifically with regard to the second exemplary embodiment, may be the same as the first exemplary embodiment.

TABLE 8

Modified Audio Sample Packet

| Bit 7 | Bit 6 | Bit 5 | Bit 4 | Bit 3 | Bit 2 | Bit 1 | Bit 0 |
|---|---|---|---|---|---|---|---|
| Packet type-0x02 (Audio Sample Packet) | | | | | | | |
| Segment_indictaor | Layout_ext | layout | Sample_present.sp3 | Sample_present.sp2 | Sample_present.sp1 | Sample_present.sp0 | |
| B.3 | B.2 | B.1 | B.0 | Sample_flat.sp3 | Sample_flat.sp2 | Sample_flat.sp1 | Sample_flat.sp0 |
| Audio Sample Subpacktet 0 (7 Bytes) | | | | | | | |
| Audio Sample Subpacktet 1 (7 Bytes) | | | | | | | |
| Audio Sample Subpacktet 2 (7 Bytes) | | | | | | | |
| Audio Sample Subpacktet 3 (7 Bytes) | | | | | | | |

TABLE 8-1 segment_indicator field

| Segment_indicator | Description |
|---|---|
| 00 | Start_segment |
| 01 | mid_segment(odd) |
| 10 | mid_segment(even) |
| 11 | End_segment |

TABLE 8-2 relation between layout and layout_exit:refer to table 7-6 HDMI 1.4b

| Layout_exit | layout | Description |
|---|---|---|
| 0 | 0 | 2 ch/4 samples |
| 0 | 1 | 8 ch/1 samples |
| 1 | 0 | 3D Audio |
| 1 | 1 | Reserved |

Figure 5:
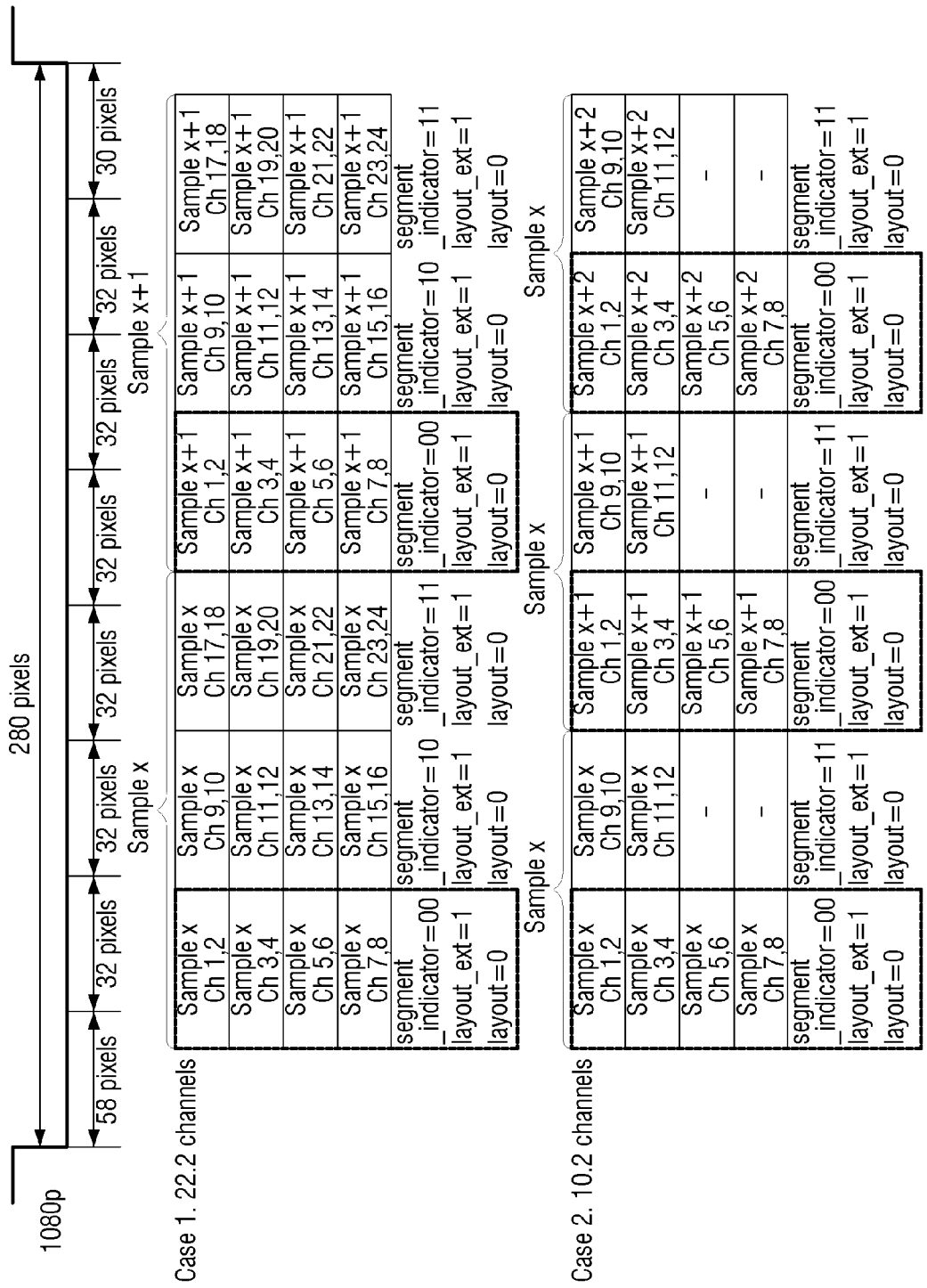
FIG. 5 is a view illustrating a transport stream packet of audio samples in accordance with an exemplary embodiment.

FIG. 5 illustrates a transport stream of an audio sample packet according to the second exemplary embodiment.

FIG. 5 shows settings of values for each field when transmitting two sample packets in the horizontal blanking interval in the case of 3D audio of 22.2 channels. The first packet is segment_indicator=00, the second packet is segment_indicator=10, and the last packet is segment_indicator=11. Since all are 3D audio signals layout_ext=1, and layout=0. Similar value of a field is shown in 3D audio of 10.2 channels.

Third Exemplary Embodiment

The third exemplary embodiment also modifies and uses the related art audio sample packet format, but displays brief information compared to the second exemplary embodiment.

As shown below in Table 9, a reserved area of the related art audio sample packet may be used as a multi-channel_indicator. The multi-channel_indicator displays only the information on 3D audio of an audio sample packet, unlike the segment_indicator of the second exemplary embodiment. The information that the layout field shows, is different depending on the bit information of the multi-channel_indicator.

Therefore, the multi-channel_indicator may be expressed with one bit. If the multi-channel_indicator=0, layout field refers to the channel/sample layout that has been defined in the existing HDMI 1.4b. If the multi-channel_indicator=1, layout field refers to the layout that transmits a multi-channel audio sample data of more than 8 channels. The layout field is used to refer to the start of a sample at this time. If layout=1, current audio sample packet means that it comprises the beginning part of a sample. If layout (start)=0, current audio sample packet means that it does not comprise the beginning part of a sample. Of course, this example is one exemplary embodiment, and packets matching the bits may vary. Fields other than the fields described with special reference to the third exemplary embodiment are the same as the first exemplary embodiment.

TABLE 9

Modified Audio Sample Packet Header

| Bit 7 | Bit 6 | Bit 5 | Bit 4 | Bit 3 | Bit 2 | Bit 1 | Bit 0 |
|---|---|---|---|---|---|---|---|
| Packet type = 0x02 (Audio Sample Packet) | | | | | | | |
| reserved | | Multichannel_indicator | Layout/start | Sample_present.sp3 | Sample_present.sp2 | Sample_present.sp1 | Sample_present.sp0 |
| B.3 | B.2 | B.1 | B.0 | Sample_flat.sp3 | Sample_flat.sp2 | Sample_flat.sp1 | Sample_flat.sp0 |
| Audio sample subpacket 0 (7 Bytes) | | | | | | | |
| Audio sample subpacket 1 (7 Bytes) | | | | | | | |
| Audio sample subpacket 2 (7 Bytes) | | | | | | | |
| Audio sample subpacket 3 (7 Bytes) | | | | | | | |

TABLE 9-1

Multichannel_indicator and Layout/start

| Multichannel_indicator | Layout/start | Description |
|---|---|---|
| 0 | 0 | 2 ch/4 samples |
| 0 | 1 | 8 ch/1 sample |
| 1 | 0 | Multi-channel/1 sample (Non-start of sample) |
| 1 | 1 | Multi-channel/1 sample (start of sample) |

This structure has the advantage of having a simple packet structure compared to the second exemplary embodiment, since it minimizes the changes of the reserved area in existing audio sample packets, and may indicate at the same time whether it comprises 3D audio or not, with only the audio sample packet.

Figure 6:
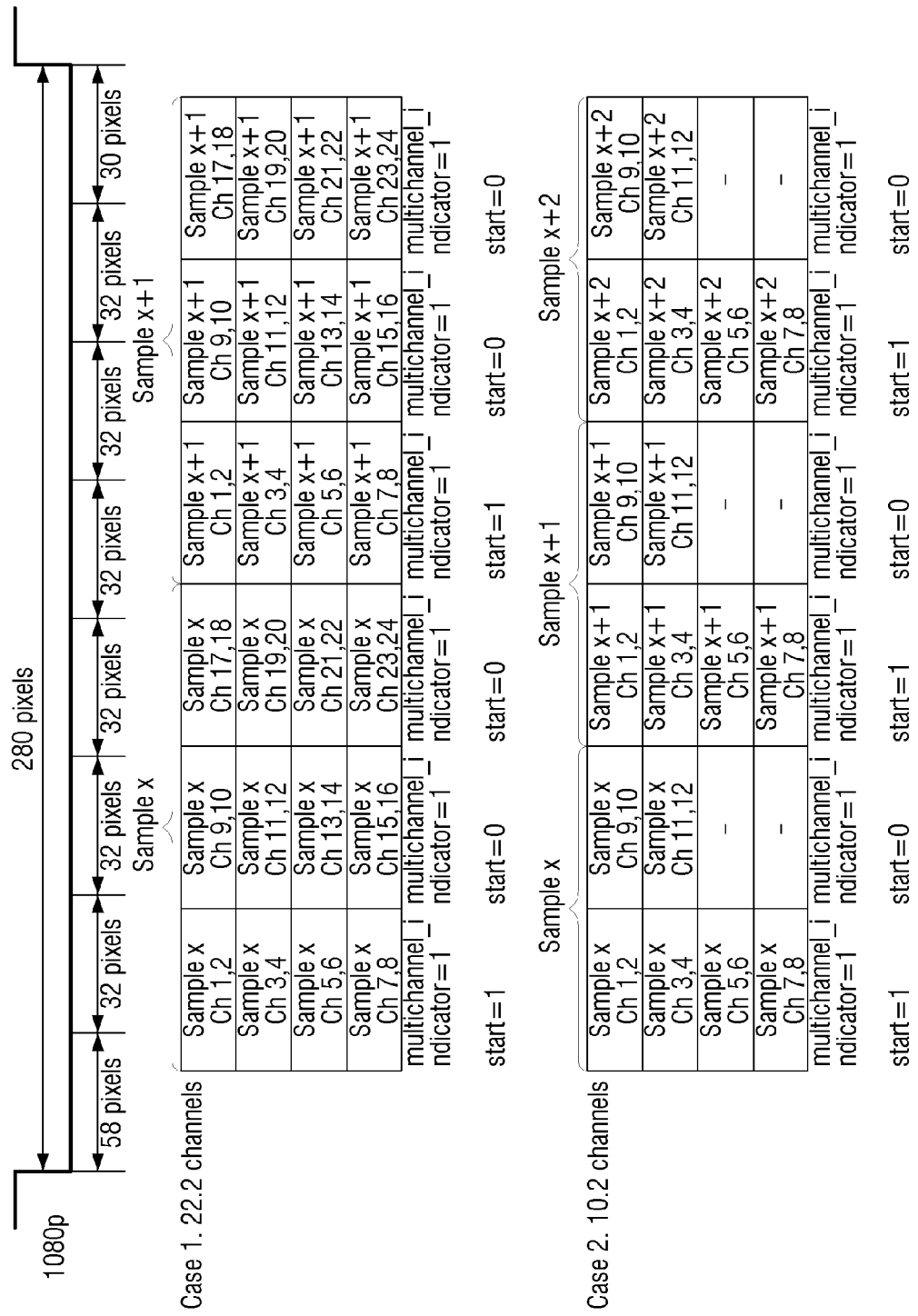
FIG. 6 is a view illustrating a transport stream packet of audio samples of another exemplary embodiment.

FIG. 6 is a diagram representing a transmission stream of an audio sample packet of the third exemplary embodiment.

FIG. 6 shows settings of values for each field when transmitting two sample packets in the horizontal blanking interval in the case of 3D audio of 22.2 channels. The first packet is layout=1, the second and third packets are layout=0. Since all packets are 3D audio signals, so multi-channel_indicator=1. Similar values of a field are shown in 3D audio of 10.2 channels.

Fourth Exemplary Embodiment

Similarly, the fourth exemplary embodiment modifies and uses the related art audio sample packet format, and provides more information whether it provides multi-stream audio or not, compared to the second exemplary embodiment.

As shown below in Table 10, a reserved area of the related art audio sample packets may be used as a Stream_ID, and a multiASP_layout. The multiASP_layout has the same function as the multi-channel_indicator in the third exemplary embodiment. That is, it shows whether it provides 3D audio or not. Information that the layout field shows is different depending on the bit information of the multiASP_layout.

Stream_ID indicates the stream number when multi-stream audio is provided. In an exemplary embodiment, one bit may be used in Stream_ID, and the first stream is displayed when it is 0. Of course, this example is only exemplary, and packets matching bits may vary.

When assuming that one view of multi-stream audio holds an audio signal under 8 channels, Stream_ID and multiASP_layout may not be 1 at the same time with regard to a single audio sample packet.

In terms of being able to display all the information about the 3D multi-stream audio and 3D audio using a single data sample packet, this structure has the advantage of compatibility. Additionally, since each identification becomes available when transmitting a plurality of streams when placing Stream_ID field and stream identifier, multi-stream audio sample data exceeding the size of one packet may be transmitted. Fields, other than the fields described with special reference to the fourth exemplary embodiment, are the same as the fields of the first exemplary embodiment.

An audio data transmission stream in accordance with a combination of the value of the Stream_ID field, multiASP_layout field, and layout/start field may be considered. If multiASP_layout=1, it represents the transmission stream of 3D audio, and this time layout/start displays the starting position information of the packet. If Stream_ID=1, it displays the multi-stream, and the number of samples and the channel is set based on the layout/start. For example, Sink which received the packet of Stream_ID=1 recognizes that multi-stream audio data is transmitted, and at the same time recognizes the currently received packet as the second stream of audio data out of two multi-stream audio data.

Fifth Exemplary Embodiment

Likewise, the fifth exemplary embodiment modifies and uses the related art audio sample packet format.

As shown below in Table 11, a reserved area of the related art audio sample packets may be used as a Supports_Multistream, and a multiASP_layout. The multiASP_layout has the same function as the multiASP_layout discussed in the fourth exemplary embodiment. That is, it shows whether it provides 3D audio or not. Information that the layout field shows may differ depending on the bit information of the multiASP_layout.

The Supports_Multistream shows information about whether the multi-stream audio is provided or not. In an exemplary embodiment, one bit may be used in Supports_Multistream, and the multi-stream audio is provided when it is 0. Of course, this example is only one exemplary embodiment, and packets matching bits may vary.

An audio sample packet in accordance with the fifth exemplary embodiment may comprise at most four 2 channels multi-stream audio samples in one audio sample packet, and audio samples for each view may be transmitted corresponding to each four sub-packets.

If one view of the multi-stream audio holds audio signals less than 8 channels, Supports_Multistream and multiASP_layout would not be 1 at the same time in terms of one audio sample packet.

TABLE 10

| | Modified Audio Sample Packet Header | | | | | | | |
|---|---|---|---|---|---|---|---|---|
| | Bit7 | Bit6 | Bit5 | Bit4 | Bit3 | Bit2 | Bit1 | Bit0 |
| HB0 | Packet type = 0x02 (Audio Sample Packet) | | | | | | | |
| HB1 | Stream_ID | multiASP_layout | re-served | Layout/start | Sample_present.sp3 | Sample_present.sp2 | Sample_present.sp1 | Sample_present.sp0 |
| HB2 | B.3 | B.2 | B.1 | B.0 | Sample_flat.sp3 | Sample_flat.sp2 | Sample_flat.sp 1 | Sampleflat.sp0 |
| SP0 | Audio Sample Subpacktet 0 (7 Bytes) | | | | | | | |
| SP1 | Audio Sample Subpacktet 1 (7 Bytes) | | | | | | | |
| SP2 | Audio Sample Subpacktet 2 (7 Bytes) | | | | | | | |
| SP3 | Audio Sample Subpacktet 3 (7 Bytes) | | | | | | | |

TABLE 10-1

| Description of Stream_ID | |
|---|---|
| Stream_ID | description |
| 0 | 1$^{st}$ stream |
| 1 | 2$^{nd}$ stream |

TABLE 11

Modified Audio Sample Packet Header

| | Bit7 | Bit6 | Bit5 | Bit4 | Bit3 | Bit2 | Bit1 | Bit0 |
|---|---|---|---|---|---|---|---|---|
| HB0 | | | | | Packet type = 0x02 | | | |
| HB1 | Supports_Multistream | multiASP_layout | reserved | Layout/ start | Sample_ present.sp3 | Sample_ present.sp2 | Sample_present.sp1 | Sample_present.sp0 |
| HB2 | B.3 | B.2 | B.1 | B.0 | Sample_flat. sp3 | Sample_flat. sp2 | Sample_flat. sp1 | Sampleflat.sp0 |
| SP0 | Audio Sample Subpacktet 0 (7 Bytes): Reserved for $1^{st}$ stream | | | | | | | |
| SP1 | Audio Sample Subpacktet 1 (7 Bytes): Reserved for $2^{nd}$ stream | | | | | | | |
| SP2 | Audio Sample Subpacktet 2 (7 Bytes): Reserved for $3^{rd}$ stream | | | | | | | |
| SP3 | Audio Sample Subpacktet 3 (7 Bytes): Reserved for $4^{th}$ stream | | | | | | | |

In terms of being able to display all the information about the multi-stream audio and 3D audio using a single data sample packet, this structure has the advantage of compatibility. In addition, there is an advantage that it is available to describe all the features that are supported in one audio sample packet. Fields other than the fields described with special reference to the fifth exemplary embodiment is the same as fields of the first exemplary embodiment.

A feature of an audio data transmission stream in accordance with a combination of the value of the Supports_Multistream field, multiASP_layout field, and layout/start field may be considered. If Supports_Multistream=0 and multiASP_layout=1, it represents the transmission stream of 3D audio, and this time layout/start displays the starting position information of the packet. If Supports_Multistream=1, it displays the multi-stream, and the number of samples and the channel is set based on the layout/start.

Sixth Exemplary Embodiment

The sixth exemplary embodiment provides a plan that has modified the related art audio sample packet format which is similar to the fourth exemplary embodiment.

Therefore, as shown below in Table 12, a reserved area of the related art audio sample packets may be used as a Stream_ID, and a multiASP_layout. The Stream_ID and the multiASP_layout each have the same functions as the Stream_ID and the multiASP_layout in the fourth exemplary embodiment. Information that the layout field shows, differs depending on the bit information of the multiASP_layout.

However, four stream numbers may be shown when multi-stream audio is provided since Stream_ID is expressed as 2 bits. Each combination of different bits corresponds to the view of the different contents.

If one view of the multi-stream audio holds audio signals less than 8 channels, Stream_ID may not be more than 1 and at the same time multiASP_layout may be 1 in terms of one audio sample packet.

TABLE 12

Modified Audio Sample Packet Header

| | Bit7 | Bit6 | Bit5 | Bit4 | Bit3 | Bit2 | Bit1 | Bit0 |
|---|---|---|---|---|---|---|---|---|
| HB0 | | | | Packet type = 0x02 (Audio Sample Packet) | | | | |
| HB1 | Stream_ID | | multiA SP_lay out | Layout / start | Sample_ present.sp3 | Sample_ present.sp2 | Sample_ present.sp1 | Sample_ present.sp0 |
| HB2 | B.3 | B.2 | B.1 | B.0 | Sample_ flat.sp3 | Sample_ flat.sp2 | Sample_ flat.sp1 | Sampleflat. sp0 |
| SP0 | Audio Sample Subpacktet 0 (7 Bytes) | | | | | | | |
| SP1 | Audio Sample Subpacktet 1 (7 Bytes) | | | | | | | |
| SP2 | Audio Sample Subpacktet 2 (7 Bytes) | | | | | | | |
| SP3 | Audio Sample Subpacktet 3 (7 Bytes) | | | | | | | |

TABLE 12-1

Description of Stream_ID

| Stream_ID | description |
|---|---|
| 00 | $1^{st}$ stream |
| 01 | $2^{nd}$ stream |
| 10 | $3^{rd}$ stream |
| 11 | $4^{th}$ stream |

In terms of being able to display all the information about the multi-stream audio and 3D audio using a single data sample packet, this structure has the advantage of compatibility. In particular, more multi-streams may be identified compared to the fourth exemplary embodiment. Fields other than the fields described with special reference to the sixth exemplary embodiment are the same as the first exemplary embodiment.

Table 13 displays a feature of an audio data transmission stream in accordance with a combination of the value of the Stream_ID field, multiASP_layout field, and layout/start field. If multiASP_layout=1, it represents the transmission stream of 3D audio, and this time layout/start displays the starting position information of the packet. If Stream_ID=01~11, the number of samples and the channel is set based on the layout/start.

TABLE 13

Capability to deal with proposed features according to exemplary embodiments

| | ASP header fields | | |
|---|---|---|---|
| Stream_ID | multiASP_layout | Layout/start | Description |
| 00b | 0 | Layout = 0 | 24bits-sample + default (2ch/4sample) |
| 00b | 0 | Layout = 1 | 24bits-sample + default (8ch/1sample) |
| 00b | 1 | Start = 0 | 24bits-sample + 3D audio-channel non-start ('N'ch/1 sample) |
| 00b | 1 | Start = 1 | 24bits-sample + 3D audio-channel start ('N'ch/1 sample) |
| 00b~11b | 0 | Layout = 0 | 24bits-sample + Multi-stream (2ch/4 sample) |
| 00b~11b | 0 | Layout = 1 | 24bits-sample + Multi-stream (8ch/1 sample) |
| 1 | 1 | 0 | Not supported (refer to the '2 Analysis of propoesed features (½) slide, page 8) |
| 1 | 1 | 1 | |

Seventh Exemplary Embodiment

The seventh exemplary embodiment uses 3D audio sample packets which are newly defined in the first exemplary embodiment to transmit the 3D audio sample packets and multi-stream audio samples packets.

The seventh exemplary embodiment is similar to the first exemplary embodiment, but it has more ext_layout fields indicating whether the multi-stream is transmitted or not. That is, if the ext_layout=0, it means transmission of the multi-stream audio, and if ext_layout=1, it means transmission of the 3D audio.

Sample_start field, sample_present.spX field, and sample_flat.spX field are the same as the first exemplary embodiment, so an overlapping description is omitted. Table 16 shows the structure of the audio sample packet based on the seventh exemplary embodiment.

TABLE 14

Extended Audio Sample Packet (24 Channels Fs = 96 kHz)

| |
|---|
| N/Chan 1, 2 |
| N/Chan 3, 4 |
| N/Chan 5, 6 |
| N/Chan 7, 8 |
| N/Chan 9, 10 |
| N/Chan 11, 12 |
| N/Chan 13, 14 |
| N/Chan 15, 16 |
| N/Chan 17, 18 |
| N/Chan 19, 20 |
| N/Chan 21, 22 |
| N/Chan 23, 24 |
| N + 1/Chan 1, 2 |
| N + 1/Chan 3, 4 |
| N + 1/Chan 5, 6 |
| N + 1/Chan 7, 8 |

TABLE 14-1

Example of Extended Audio Sample Packet

| Byte/Bit # | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | Sample_start = 1 | Ext_layout = 1 | Sample_present.sp3 | Sample_present.sp2 | Sample_present.sp1 | Sample_present.sp0 |
| HB2 | B.3 | B.2 | B.1 | B.0 | Sample_flat.sp3 | Sample_flat.sp2 | Sample_flat.sp1 | Sampleflat.sp0 |
| PB0~PB6 | | | | | Channel 1, 2 audio data/sample N | | | |
| PB7~PB 13 | | | | | Channel 3, 4 audio data/sample N | | | |
| PB14~PB20 | | | | | Channel 5, 6 audio data/sample N | | | |
| PB21~PB27 | | | | | Channel 7, 8 audio data/sample N | | | |

Table 15 shows the body structure of a packet which follows the field value of the ext_layout field. As illustrated, in the case of multi-stream, an audio signal corresponding to one view may consist of 2 channels, and therefore a single packet may comprise audio signals for four views. For 3D audio signals, the audio signal for a plurality of channels may be displayed. Though 32 channels are shown in various exemplary embodiments described above, the exemplary embodiments are not limited thereto and may comprise audio signals of more than 32 channels.

TABLE 15

EASP packetization

| Ext_layout Value | Sample_start Value | Max Num Channels | samples | Subpkt 0 | Subpkt 1 | Subpkt 2 | Subpkt 3 |
|---|---|---|---|---|---|---|---|
| 0 | X | 2 | 4 | Chnl 1, 2 Stream 0 (Sample M) | Chnl 1, 2 Stream 1 (Sample M) | Chnl 1, 2 Stream 2 (Sample M) | Chnl 1, 2 Stream 2 (Sample M) |

TABLE 15-continued

EASP packetization

| Ext_layout Value | Sample_start Value | Max Num Channels | samples | Subpkt 0 | Subpkt 1 | Subpkt 2 | Subpkt 3 |
|---|---|---|---|---|---|---|---|
| 1 | 1 | N | 1 | Chnl 1, 2 Stream 0 (Sample M) | Chnl 3, 4 Stream 0 (Sample M) | Chnl 5, 6 Stream 0 (Sample M) | Chnl 7, 8 Stream 0 (Sample M) |
| 1 | 0 | | | — | — | — | — |
| 1 | 0 | | | Chnl N – 7, N – 6 Stream 0 (Sample M) | Chnl N – 5, N – 4 Stream 0 (Sample M) | Chnl N – 3, N – 2 Stream 0 (Sample M) | Chnl N – 1, N Stream 0 (Sample M) |

Figure 7:
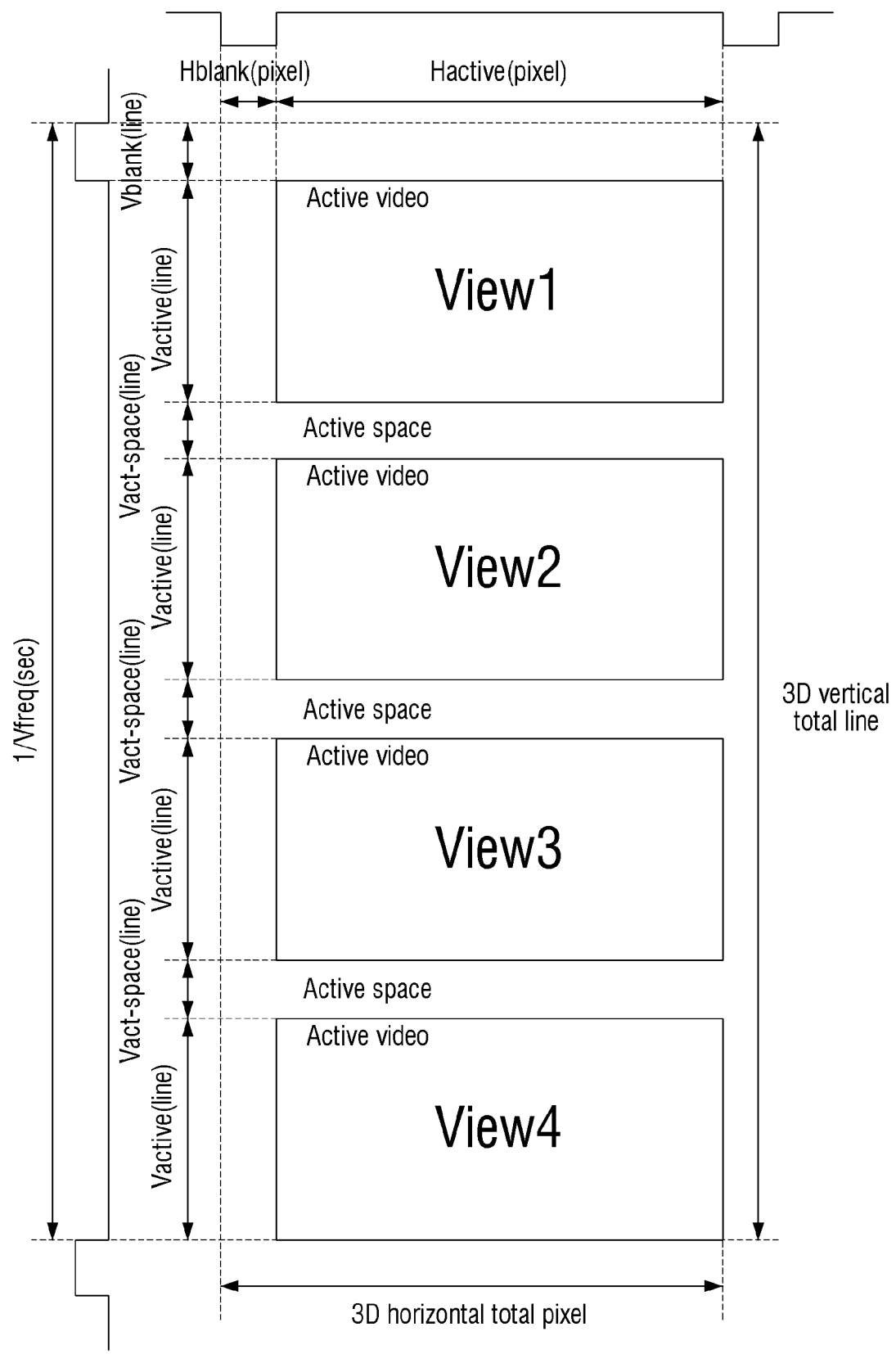
FIG. 7 is a view showing a transmission stream format of tan exemplary embodiment.

Meanwhile, in the exemplary embodiments described above, multi-stream audio signals may be transmitted by being included in the area corresponding to the area where video data of each view are located in the vertical synchronization blanking period. FIG. 7 is a diagram illustrating a transmission stream format of such a case. The audio signal corresponding to left area of the video signal of each view may be shown in FIG. 7.

1-2. 3D One Bit Audio Sample Packet

First Exemplary Embodiment

In the first exemplary embodiment, 3D audio of one bit audio format is transmitted by using the 3D one bit audio sample packets that are newly defined. As described above, 3D audio is defined as audio in which speakers may be located anywhere on 3D space.

The 3D one bit audio stream comprises 32 audio channels (or more), and is transmitted via continuous packets to a data island period. To indicate the position of the packet within the one bit audio sample as shown below in Table 16, a packet header comprises a sample_start and a sample_present bit.

Sample frequency information in 3D one bit audio are transmitted by being included in Audio InfoFrame. (Refer to the HDMI 1.4b Section 8.2.2)

A 3D one bit audio sample packet includes a one bit audio sample packet header and four sub-packets that are listed in Table 16. Each sub-packet may comprise one bit audio bit for up to four audio channels.

Adjacent 3D one bit audio sample packets may be utilized to be transmitted between 9 audio channels to 32 audio channels of 3D one bit audio sample. A useful combination of samples_present bits for 3D one bit audio sample packets is determined by allowed channel share. The reason why the 3D one bit audio sample packet does not hold B0~B3 fields unlike the 3D audio sample packet is that 3D one bit audio sample packet does not follow IEC 60958 block format.

Various Alternatives

Meanwhile, 3D one bit audio sample packets corresponding to each exemplary embodiment of the 3D audio sample packets described above may be defined. That is, besides the samples_invalid.spX, 3D one bit audio sample packets may be defined in the same manner as 3D audio sample packets, and only B0~B3 fields may be excluded in 3D audio sample

TABLE 16

One Bit 3D Sample Packet Header

| Byte/Bit# | 7 | 6 | 5 | 4 | 3 | 2 | 1 | 0 |
|---|---|---|---|---|---|---|---|---|
| HB0 | 0 | 0 | 0 | 0 | 1 | 1 | 0 | 0 |
| HB1 | Rsvd (0) | Rsvd (0) | Rsvd (0) | sample_start | samples_present sp3 | Samples_present sp2 | Samples_present sp1 | Samples_present sp0 |
| HB2 | Rsvd (0) | Rsvd (0) | Rsvd (0) | Rsvd (0) | Samples_invalid.sp3 | Samples_invalid.sp2 | Samples_invalid.sp1 | Samples_invalid.sp0 |

In "sample_start:[1 bit]", if sample_start=1, the current packet is the first packet of 3D one bit audio samples. The sample_start is the same as what was described in the first exemplary embodiment of the 3D audio packets, so the overlapping description is omitted.

In "samples_present.spX: [4 fields, 1 bit each]", Sub packet X indicates whether it comprises invalid audio sample or not. If samples_invalid=1, samples of sub-packet are not valid. If samples_invalid=0, samples are valid. These bits are valid only when samples_present.spX is set. If there is no useful audio data that is available in the source, four samples_invalid.spX bits are set. When samples_invalid.spX is set, sub-packet X continues to show the sample period, but do not comprise any useful data.

packets. A detailed description thereof will be omitted since the contents of the other exemplary embodiments overlap.

1-3. Multi Stream Audio Sample Packet

The following describes the structure of a multi-stream audio sample packet that has been newly proposed. First, the first exemplary embodiment will be described, and various alternatives focusing on differences from the first exemplary embodiment will be described.

First Exemplary Embodiment

In the first exemplary embodiment, a plurality of audio streams of L-PCM and IEC 61937 audio compression formats are transmitted by using a multi-stream audio sample packet. Each audio stream that is included in the multi-stream audio sample comprises 2 audio channels (or more). The setting of the sub-packet is determined by stream_present bit of a packet header. Table 17 shows the structure of the packet header of the multi-stream audio sample packet.

TABLE 17

Multi-Stream Audio Sample Packet Header

| Byte/Bit# | 7 | 6 | 5 | 4 | 3 | 2 | 1 | 0 |
|---|---|---|---|---|---|---|---|---|
| HB0 | 0 | 0 | 0 | 0 | 1 | 1 | 1 | 0 |
| HB1 | Rsvd (0) | Rsvd (0) | Rsvd (0) | Rsvd (0) | stream_present sp3 | stream_present sp2 | stream_present sp1 | stream_present sp0 |
| HB2 | B.3 | B.2 | B.1 | B.0 | Stream_flat.sp3 | Stream_flat.sp2 | Stream_flat.sp1 | Stream_flat.sp0 |

In "stream_present.spX: [4 fields, 1 bit each]", sub packet X indicates whether it comprises an audio sample of stream X or not. Four stream_present bits exist in the multi-stream audio sample packet header, and each bit is for sub-packets. Stream_present bit indicates whether the corresponding sub-packet comprises an audio stream or not.

Since stream_present.spX has substantially the same function as the sample_present.spX of 3D audio sample packets described above, a detailed description thereof will be omitted in the overlapping ranges.

In "stream_present.spX: [4 fields, 1 bit each]", sub packet X indicates whether it shows a flatline sample of stream X. It is valid only when stream_present.spX is present. That is, four stream_flat.spX bits are set when useful audio data that is available in the source is not available. It happens when sample rate changes or while there is a temporary stream interruption. Once stream_flat.spX is set, sub-packet X continues to show the sample period, but does not comprise the useful audio data. Since stream_flat.spX is substantially the same as sample_flat.spX of the 3D audio sample packet described above, a detailed description thereof will be omitted.

When sub-packet X comprises the first frame among 192 frames that includes IEC 60958 block, B.X=1. Otherwise B.X=0.

The multi-stream audio sample packet uses a packet header and four sub-packets that are shown in Table 17. All sub-packets have the same structure.

The high-speed wired interface environment allows the source to transmit four audio streams at the same time if it supports multi-view video streaming. (For example, dual view/Quad view game with different audio for each view). Each audio stream that is included in the multi-channel audio sample is related to one single view, and comprises 2 audio channels. Sub-packet of each multi-stream audio sample packet may comprise IEC 61937 block frame or IEC 60958 block frame that is defined with zero or one IEC 60958. Three sub-packet layouts are defined. Table below shows an example of the multi-stream audio packet layout for two, three and four audio streams.

TABLE 18

Example of Multi-Stream Audio Sample Packet Layout for 2 Audio Streams

| Num Streams | Packet # | Max Num Channels | samples | Subpkt 0 | Subpkt 1 | Subpkt 2 | Subpkt 3 |
|---|---|---|---|---|---|---|---|
| 2 | 0 | 2 ch/stream | 1 sample/stream | Chnl 1, 2 Stream 0 (Sample a) | Chnl 1, 2 Stream 1 (Sample b) | Empty | empty |
|  | 1 | 2 ch/stream | 1 sample/stream | Chnl 1, 2 Stream 0 (Sample a + 1) | Chnl 3, 4 Stream 1 (Sample b + 1) | empty | empty |
|  | — | | | — | — | | |
|  | N | 2 ch/stream | 1 sample/stream | Chnl 1, 2 Stream 0 (Sample a + N) | Chnl 1, 2 Stream 1 (Sample b + N) | empty | empty |

TABLE 19

Example of Multi-Stream Audio Sample Packet Layout for 3 Audio Streams

| Num Streams | Packet # | Max Num Channels | samples | Subpkt 0 | Subpkt 1 | Subpkt 2 | Subpkt 3 |
|---|---|---|---|---|---|---|---|
| 3 | 0 | 2 ch/stream | 1 sample/stream | Chnl 1, 2 Stream 0 (Sample a) | Chnl 1, 2 Stream 1 (Sample b) | Chnl 1, 2 Stream 2 (Sample c) | empty |

TABLE 19-continued

Example of Multi-Stream Audio Sample Packet Layout for 3 Audio Streams

| Num Streams | Packet # | Max Num Channels | samples | Subpkt 0 | Subpkt 1 | Subpkt 2 | Subpkt 3 |
|---|---|---|---|---|---|---|---|
| | 1 | 2 ch/ stream | 1 sample/ stream | Chnl 1, 2 Stream 0 (Sample a + 1) | Chnl 1, 2 Stream 1 (Sample b + 1) | Chnl 1, 2 Stream 2 (Sample c + 1) | empty |
| | — | | | — | — | — | |
| | N | 2 ch/ stream | 1 sample/ stream | Chnl 1, 2 Stream 0 (Sample a + N) | Chnl 1, 2 Stream 1 (Sample b + N) | Chnl 1, 2 Stream 2 (Sample c + N) | empty |

TABLE 20

Example of Multi-Stream Audio Sample Packet Layout for 4 Audio Streams

| Num Streams | Packet # | Max Num Channels | samples | Subpkt 0 | Subpkt 1 | Subpkt 2 | Subpkt 3 |
|---|---|---|---|---|---|---|---|
| 4 | 0 | 2 ch/ stream | 1 sample/ stream | Chnl 1, 2 Stream 0 (Sample a) | Chnl 1, 2 Stream 1 (Sample b) | Chnl 1, 2 Stream 2 (Sample c) | Chnl 1, 2 Stream 2 (Sample d) |
| | 1 | 2 ch/ stream | 1 sample/ stream | Chnl 1, 2 Stream 0 (Sample a + 1) | Chnl 1, 2 Stream 1 (Sample b + 1) | Chnl 1, 2 Stream 2 (Sample c + 1) | Chnl 1, 2 Stream 3 (Sample d + 1) |
| | — | | | — | — | — | |
| | N | 2 ch/ stream | 1 sample/ stream | Chnl 1, 2 Stream 0 (Sample a + N) | Chnl 1, 2 Stream 1 (Sample b + N) | Chnl 1, 2 Stream 2 (Sample c + N) | Chnl 1, 2 Stream 3 (Sample d + N) |

FIG. 8 is a diagram representing a transmission stream of an audio sample packet of the first exemplary embodiment.

FIG. 8 illustrates that one sample packet comprises two samples, and may be transmitted in a horizontal blanking interval in the case of a 2 audio channels sample packet for dual-view. In case of a 2 audio channels sample packet for quad-view, one sample packet comprises four samples, and may be transmitted in a horizontal blanking interval. In FIG. 8, a maximum of 2 channels of multi-stream audio sample transmission is described as an example, but multi-stream audio samples with multi-channels of more than 2 channels may be transmitted through one multi-stream audio sample packet.

In short, the audio for each view is transmitted through a corresponding sub-packet. Also, multi-stream audio sample data with one multi-channel (more than 2 channels) may be transmitted via more than one sequential multi-stream audio sample packets.

Multi-stream audio sample packets transmit four stereo audio samples. Each sample corresponds to a separate audio stream. For example, when high-speed wired interface source transmits two different audio streams, sub-packet 0 may be used to transmit an audio sample of stream 0, and sub-packet 1 may be used to transmit an audio sample of stream 1.

Second Exemplary Embodiment

The second exemplary embodiment modifies and uses the related art audio sample packet format, and provides more information whether it provides multi-stream audio or not. As shown below in Table 21, the related art audio sample packet of a reserved area may be used as the stream_identifier. Stream_ID displays a stream number when multi-stream audio is provided. Two bits may be used in Stream_ID in one exemplary embodiment and a first stream is displayed when Stream_ID is 00, and second stream is displayed when Stream_ID is 01. Each stream corresponds to a view for different contents. Of course, these examples are one exemplary embodiment, and packets matching bits may vary.

Layout displays the information on the number of samples and channels under high-speed wired interface. For example, one audio sample packet may comprise four samples of 2 audio channels or one sample of 8 audio channels.

TABLE 21

| Modified Audio Sample Packet Header | | | | | | | | |
|---|---|---|---|---|---|---|---|---|
| | Bit7 | Bit6 | Bit5 | Bit4 | Bit3 | Bit2 | Bit1 | Bit0 |
| HB0 | Packet type = 0x02 (Audio Sample Packet) | | | | | | | |
| HB1 | Stream_Identifier | | reserved | Layout | Sample_ present.sp 3 | Sample_ present.sp 2 | Sample_ present.sp1 | Sample_ present.sp0 |

TABLE 21-continued

Modified Audio Sample Packet Header

| | Bit7 | Bit6 | Bit5 | Bit4 | Bit3 | Bit2 | Bit1 | Bit0 |
|---|---|---|---|---|---|---|---|---|
| HB2 | B.3 | B.2 | B.1 | B.0 | Sample_flat.sp3 | Sample_flat.sp2 | Sample_flat.sp1 | Sample-flat.sp0 |
| SP0 | Audio Sample Subpacktet 0 (7 Bytes) | | | | | | | |
| SP1 | Audio Sample Subpacktet 1 (7 Bytes) | | | | | | | |
| SP2 | Audio Sample Subpacktet 2 (7 Bytes) | | | | | | | |
| SP3 | Audio Sample Subpacktet 3 (7 Bytes) | | | | | | | |

TABLE 21-1

Description of Stream_Identifer

| Stream_Identifer | Description |
|---|---|
| 00 | Stream_1 |
| 01 | Stream_2 |
| 10 | Stream_3 |
| 11 | Stream_4 |

These structures have the advantage of being able to provide a multi-stream ID easily by using the existing reserved area.

Figure 9:
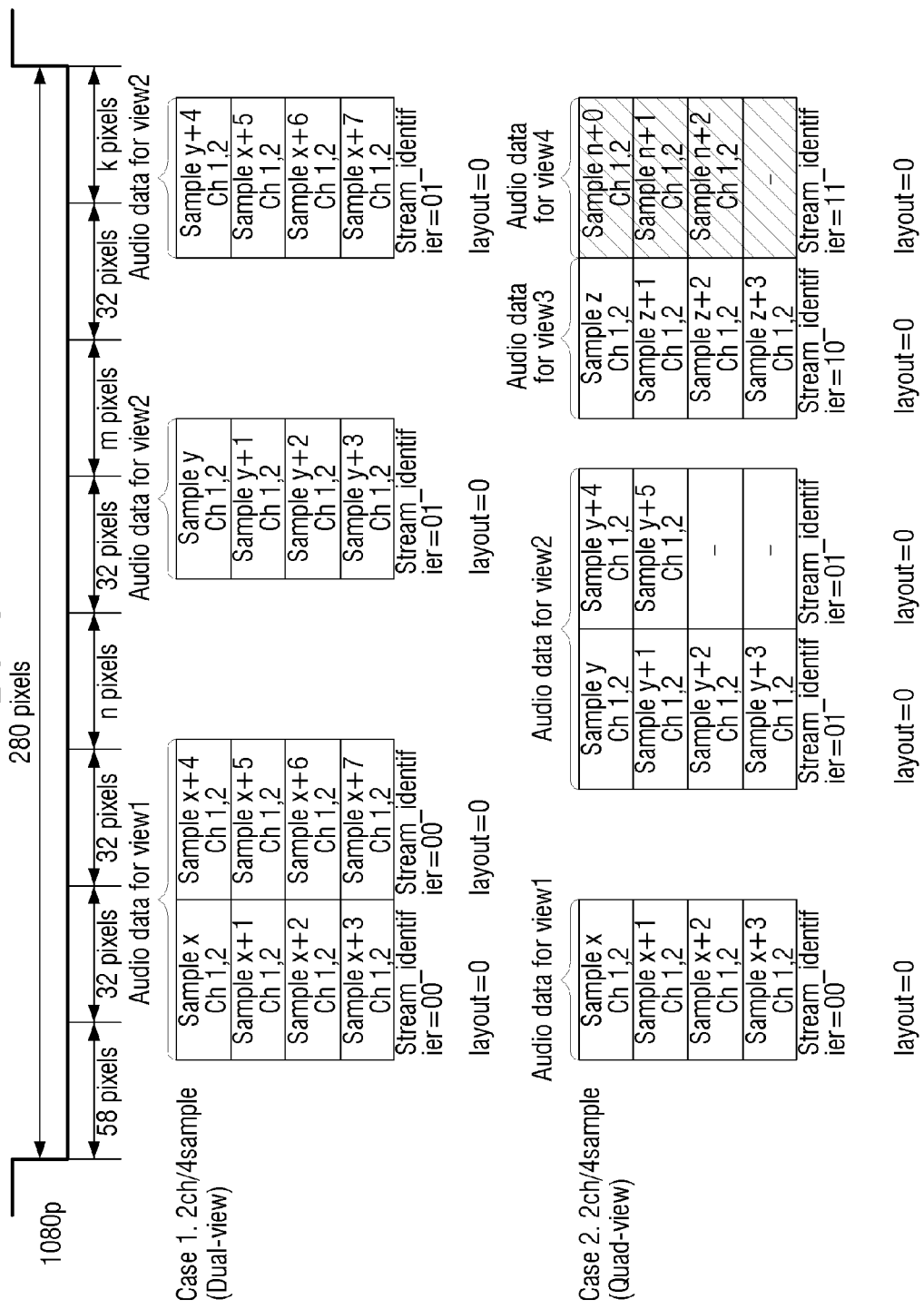
FIGS. 9 and 10 are views illustrating a transmission stream of multi-streams audio sample packet according to an exemplary embodiment.
Figure 10:
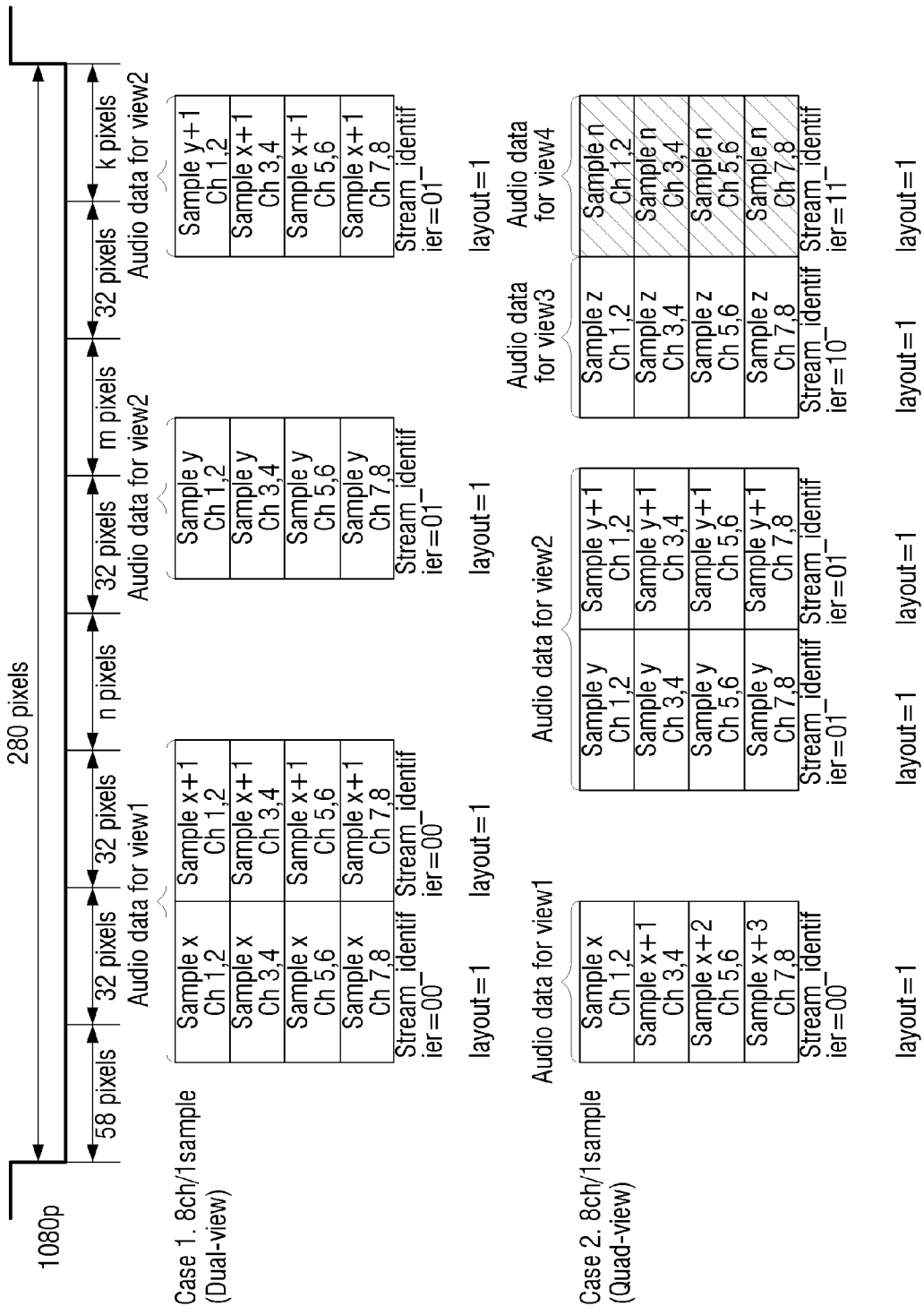

FIGS. 9 and 10 are views representing a transmission stream of a multi-stream audio sample packet of the second exemplary embodiment.

FIG. 9 shows that one sample packet comprises four sample data of identical contents which may be transmitted in a horizontal blanking interval in the case of a 2 audio channels sample packet for dual-view.

That is, one sample packet comprises audio signals of one view. Four sample packets of four views are transmitted in horizontal blanking interval in case of a 2 audio channels sample packet for quad-view. In addition, a sample packet of any view may be transmitted in a row like the exemplary embodiment of view 2, or it may be transmitted in turns with another view. In FIG. 9, a 2 audio channels sample packet has been described as an example. However, the description would the same for a multi-channel audio sample packet of more than 2 channels. In addition, sample data comprising a fixed number of sample data for each view may be transmitted as illustrated. However, a different number of sample data may also be transmitted.

FIG. 10 illustrates the state of transmitting two sample packets which comprise sample data indicating 8 channels in a horizontal blanking interval in case of an 8 audio channels sample packet for dual-view. Transmission of sample data on one view is completed through one sample packet. A sample packet of each view may be transmitted in a row, or may be transmitted in turns with a sample packet of another view. For an 8 audio channels sample packet for quad view, it is the same as one sample packet including sample data on one content and may be transmitted in a horizontal blanking interval. However, it is preferable if each sample packet of four views is transmitted.

When Stream_Identifier is used as described in the second exemplary embodiment, video and audio may be synchronized more efficiently if this information is included in an audio clock regeneration packet. The following table is a table showing the structure of modified audio clock regeneration packet for the second exemplary embodiment.

TABLE 22-1

Audio Clock Regeneration Packet Header

| Byte/Bit # | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | 0 | 0 | 0 | 0 | 0 |
| HB2 | 0 | 0 | 0 | 0 | 0 | 0 | 0 | 0 |

TABLE 22-2

Audio clock Regeneration subpacket

| Byte/Bit # | 7 | 6 | 5 | 4 | 3 | 2 | 1 | 0 |
|---|---|---|---|---|---|---|---|---|
| SB0 | 0 | 0 | 0 | 0 | 0 | 0 | Stream identifier | |
| SB1 | 0 | 0 | 0 | 0 | CTS 19 | — | — | CTS 16 |
| SB2 | CTS 15 | — | — | — | — | — | — | CTS 8 |
| SB3 | CTS 7 | — | — | — | — | — | — | CTS 0 |
| SB4 | 0 | 0 | 0 | 0 | N19 | — | — | N 16 |
| SB5 | N 15 | — | — | — | — | — | — | N 8 |
| SB6 | N 7 | — | — | — | — | — | — | N 0 |

TABLE 22-3

Description of Stream_Identifer

| Stream_Identifer | Description |
|---|---|
| 00 | Stream_1 |
| 01 | Stream_2 |
| 10 | Stream_3 |
| 11 | Stream_4 |

As shown in Table 22 above, synchronization between video and audio of multi-views systems may be efficiently performed by using information on the index of the multi-stream in a reserved area of the audio clock regeneration packet. In particular, in case of a system where multi-views are not displayed at the same time, the structure of this packet would be useful.

Third Exemplary Embodiment

The third exemplary embodiment is similar to the fourth exemplary embodiment of the 3D audio sample packet, and modifies and uses the related art audio sample packet format. The third exemplary embodiment may provide multi-stream identification information.

As shown below in Table 23, the reserved area of the related art audio sample packet may be used as a Stream_ID and multiASP_layout. In terms of the Stream_ID and the multiASP_layout, it is the same as described in the fourth exemplary embodiment of the 3D audio sample packet.

TABLE 23

| | Bit7 | Bit6 | Bit5 | Bit4 | Bit3 | Bit2 | Bit1 | Bit0 |
|---|---|---|---|---|---|---|---|---|
| | | | | Modified Audio Sample Packet Header | | | | |
| HB0 | | | | Packet type = 0x02 | | | | |
| HB1 | Stream_ID | multiASP_layout | re-served | Layout/start | Sample_present.sp3 | Sample_present.sp2 | Sample_present.sp1 | Sample_present.sp0 |
| HB2 | B.3 | B.2 | B.1 | B.0 | Sample_flat.sp3 | Sample_flat.sp2 | Sample_flat.sp1 | Sampleflat.sp0 |
| SP0 | | | | Audio Sample Subpacktet 0 (7 Bytes) | | | | |
| SP1 | | | | Audio Sample Subpacktet 1 (7 Bytes) | | | | |
| SP2 | | | | Audio Sample Subpacktet 2 (7 Bytes) | | | | |
| SP3 | | | | Audio Sample Subpacktet 3 (7 Bytes) | | | | |

TABLE 23-1

Description of Stream_Identifer

| Stream_Identifer | Description |
|---|---|
| 0 | 1st Stream |
| 01 | 2nd Stream |

This structure has the advantage of compatibility in terms of being able to display all of the information about the multi-stream audio and the 3D audio through one data sample packet.

The feature of the audio data transmission stream in accordance with a combination of the values of the Stream_ID field, the multiASP_layout field, and layout/start field is the same as described in the fourth exemplary embodiment of 3D audio sample packet.

Fourth Exemplary Embodiment

Likewise, the fourth exemplary embodiment modifies and uses the related art audio sample packet format. The fourth exemplary embodiment corresponds to the fifth exemplary embodiment of the 3D audio sample packet.

As shown in Table 24 below, the reserved area of the related art audio sample packet may be used as Supports_Multistream and multiASP_layout. Supports_Multistream, and multiASP_layout are the same as described in the fifth exemplary embodiment of the 3D audio sample packet.

TABLE 24

| | Bit7 | Bit6 | Bit5 | Bit4 | Bit3 | Bit2 | Bit1 | Bit0 |
|---|---|---|---|---|---|---|---|---|
| | | | | Modified Audio Sample Packet Header | | | | |
| HB0 | | | | Packet type = 0x02 | | | | |
| HB1 | Supports_Multistream | multiASP_layout | reserved | Layout/start | Sample_present.sp3 | Sample_present.sp2 | Sample_present.sp1 | Sample_present.sp0 |
| HB2 | B.3 | B.2 | B.1 | B.0 | Sample_flat.sp3 | Sample_flat.sp2 | Sample_flat.sp1 | Sampleflat.sp0 |
| SP0 | | | | Audio Sample Subpacktet 0 (7 Bytes): Reserved for 1st stream | | | | |
| SP1 | | | | Audio Sample Subpacktet 1 (7 Bytes): Reserved for 2nd stream | | | | |
| SP2 | | | | Audio Sample Subpacktet 2 (7 Bytes): Reserved for 3rd stream | | | | |
| SP3 | | | | Audio Sample Subpacktet 3 (7 Bytes): Reserved for 4th stream | | | | |

This structure has the advantage of compatibility in terms of being able to display all the information about the multi-stream audio and the 3D audio through one data sample packet. In addition, it has the advantage of being able to list all features that are supported in one audio sample packet.

The feature of the audio data transmission stream in accordance with a combination of the values of the Supports_Multistream field, the multiASP_layout field and layout/start field may be considered. The contents of each field value are the same as described in Table 13 of the 3D audio sample packet.

Meanwhile, in the stated alternative, a multi-stream audio signal may be transmitted by being included in the area corresponding to the area where video data of each view is located in the vertical synchronization blanking period. This is described in FIG. 7 as described above.

Fifth Exemplary Embodiment

The fifth exemplary embodiment provides a plan that modifies the related art audio sample packet format which is similar to the third exemplary embodiment.

Therefore, as shown in Table 25 below, the reserved area of the related art audio sample packet may be used as Stream_ID and multiASP_layout. Stream_ID, and multiASP_layout each have the same function as Stream_ID and multiASP_layout of the third exemplary embodiment.

However, four stream numbers may be shown when multi-stream audio is provided, since Stream_ID is represented with two bits. Different bit combinations correspond to a view of different contents.

If one view of multi-stream audio holds an audio signal less than 8 channels, Stream_Id may not be more than 1 and multiASP_layout may not be 1 at the same time in one audio sample packet.

TABLE 25

Modified Audio Sample Packet Header

| | Bit7 | Bit6 | Bit5 | Bit4 | Bit3 | Bit2 | Bit1 | Bit0 |
|---|---|---|---|---|---|---|---|---|
| HB0 | | | | Packet type = 0x02 (Audio Sample Packet) | | | | |
| HB1 | Stream ID | | multiASP_layout | Layout/start | Sample_present.sp3 | Sample_present.sp2 | Sample_present.sp1 | Sample_present.sp0 |
| HB2 | 8.3 | 8.2 | 8.1 | 8.0 | Sample_flat.sp3 | Sample_flat.sp2 | Sample_flat.sp1 | Sampleflat.sp0 |
| SP0 | | | | Audio Sample Subpacktet 0 (7 Bytes) | | | | |
| SP1 | | | | Audio Sample Subpacktet 1 (7 Bytes) | | | | |
| SP2 | | | | Audio Sample Subpacktet 2 (7 Bytes) | | | | |
| SP3 | | | | Audio Sample Subpacktet 3 (7 Bytes) | | | | |

TABLE 25-1

Description of Stream_Identifer

| Stream_Identifer | Description |
|---|---|
| 00 | 1$^{st}$ stream |
| 01 | 2$^{nd}$ stream |
| 10 | 3$^{rd}$ stream |
| 11 | 4$^{th}$ stream |

This structure has the advantage of compatibility in terms of being able to display all the information about multi-stream audio and the 3D audio through one data sample packet. In particular, it may identify more multi-stream compared to the third exemplary embodiment.

Table 26 shows a feature of the audio data transmission stream in accordance with a combination of the values of the Stream_ID field, the multiASP_layout field, and the layout/start field. If multiASP_layout=1, it represents the transmission stream of 3D audio, and at this time layout/start displays the starting position of the packet. If Stream_ID=01~11, multi-stream is displayed, and the number of samples and channels is set based on the layout/start.

TABLE 26

Capability to deal with Proposed Features According to Exemplary Embodiments

| ASP header fields | | | |
|---|---|---|---|
| Stream_ID | multiASP_layout | Layout/start | Description |
| 00b | 0 | Layout = 0 | 24bits-sample + default (2ch/4sample) |
| 00b | 0 | Layout = 1 | 24bits-sample + default (8ch/1sample) |

TABLE 26-continued

Capability to deal with Proposed Features According to Exemplary Embodiments

| ASP header fields | | | |
|---|---|---|---|
| Stream_ID | multiASP_layout | Layout/start | Description |
| 00b | 1 | Start = 0 | 24bits-sample + 3D-audio-channel non-start('N'ch/1sample) |
| 00b | 1 | Start = 1 | 24bits-sample + 3D-audio-channel start('N'ch/1sample) |
| 00b~11b | 0 | Layout = 0 | 24bits-sample + Multi-stream (2ch/4sample) |
| 00b~11b | 0 | Layout = 1 | 24bits-sample + Multi-stream (8ch/1sample) |
| 1 | 1 | 0 | Not supported (refer to the 2. |
| 1 | 1 | 1 | Analysis of proposed features (½)'' slide. Poage8) |

Sixth Exemplary Embodiment

The sixth exemplary embodiment is a plan that adds Stream_ID in an audio sample packet in accordance with the first exemplary embodiment. The Stream_ID is the same as described above, and other fields are the same as described in the first exemplary embodiment. Table 27 indicates an audio sample packet header in accordance with the sixth exemplary embodiment. However, Stream_ID is set as 4 bits in the following table, but it is available to be set as 1~3 bits or more than 5 bits. Here, the packet type refers to the packet type that is newly defined.

Since the Stream_ID is used to identify the audio of each stream, unlike the first exemplary embodiment, the audio sample data for one stream is included in one multi-stream audio sample packet.

TABLE 27

Extension Audio Sample Packet

| | Bit7 | Bit6 | Bit5 | Bit4 | Bit3 | Bit2 | Bit1 | Bit0 |
|---|---|---|---|---|---|---|---|---|
| HB0 | | | | Packet type = 0x02 (Multi-Stream Audio Sample Packet) | | | | |
| HB1 | | Stream_ID | | | Sample_present.sp3 | Sample_present.sp2 | Sample_present.sp1 | Sample_present.sp0 |
| HB2 | B.3 | B.2 | B.1 | B.0 | Sample_flat.sp3 | Sample_flat.sp2 | Sample_flat.sp1 | Sampleflat.sp0 |
| SP0 | | | | Audio Sample Subpacktet 0 (7 Bytes) | | | | |
| SP1 | | | | Audio Sample Subpacktet 1 (7 Bytes) | | | | |
| SP2 | | | | Audio Sample Subpacktet 2 (7 Bytes) | | | | |
| SP3 | | | | Audio Sample Subpacktet 3 (7 Bytes) | | | | |

Seventh Exemplary Embodiment

The seventh exemplary embodiment uses a 3D audio sample packet that is newly defined in the first exemplary embodiment of 1.1 to indicate a 3D audio sample packet and a multi-stream audio sample packet.

The seventh exemplary embodiment is similar to the first exemplary embodiment, but it has more ext_layout fields indicating whether it transmits the multi-stream or not. That is, if ext_layout=0, it means transmitting the multi-stream audio, and if ext_layout=1, it means transmitting the 3D audio.

Since the sample_start field, sample_present.spX field, and sample_flat.spX are identical to the first exemplary embodiment, overlapping description will be omitted. Table 28 shows the audio sample packet structure in accordance with the seventh exemplary embodiment.

TABLE 28

| Extended Audio Sample Packet (2channels 2streams Fs = 96 kHz) | | |
|---|---|---|
| N/chan 1, 2 (Stream 1) | N/chan 1, 2 (Stream 1) | N/chan 1, 2 (Stream 1) |
| N/chan 1, 2 (Stream 1) | N/chan 1, 2 (Stream 1) | N/chan 1, 2 (Stream 1) |
| — | — | — |

TABLE 28 -1

| Example of extended audio sample packet | | | | | | | | |
|---|---|---|---|---|---|---|---|---|
| Byte/Bit# | 7 | 6 | 5 | 4 | 3 | 2 | 1 | 0 |
| HB0 | 0 | 0 | 0 | 0 | 1 | 0 | 1 | 1 |
| HB1 | 0 | 0 | Sample_start = X | Ext_layout = 0 | Sample_present.sp3 = 0 | Sample_present.sp2 = 0 | Sample_present.sp1 = 1 | Sample_present.sp0 = 1 |
| HB2 | B.3 | B.2 | B.1 | B.0 | Sample_flat.sp3 | Sample_flat.sp2 | Sample_flat.sp1 | Sampleflat.sp0 |
| PB0~PB6 | | | | Channel 1, 2 audio data/sample N(Stream 1) | | | | |
| PB7~PB13 | | | | Channel 1, 2 audio data/sample M(Stream 2) | | | | |
| PB14~PB20 | | | | — | | | | |
| PB21~PB27 | | | | — | | | | |

Table 29 shows the body structure of a packet according to the value of the ext_layout field. As illustrated, in the case of multi-stream, an audio signal corresponding to one view may be formed by 2 channels. Therefore, one packet may comprise audio signals of four views. On the other hand, audio signals of a multi-channel may be displayed for a 3D audio signal. In various exemplary embodiments that are described herein, 3D audio of up to 32 channels will be described. However, the exemplary embodiments are not limited to this, but may be applied to more than 32 channels of audio signal.

TABLE 29

| EASP packetization | | | | | | | |
|---|---|---|---|---|---|---|---|
| Ext_layout Value | Sample_start Value | Max Num Channels | Samples | Subpkt 0 | Subpkt 1 | Subpkt 2 | Subpkt 3 |
| 0 | X | 2 | 4 | Chnl 1, 2 Stream 0 (Sample M) | Chnl 1, 2 Stream 1 (Sample M) | Chnl 1, 2 Stream 2 (Sample M) | Chnl 1, 2 Stream 3 (Sample M) |
| 1 | 1 | N | 1 | Chnl 1, 2 Stream 0 (Sample M) | Chnl 3, 4 Stream 0 (Sample M) | Chnl 5, 6 Stream 0 (Sample M) | Chnl 7, 8 Stream 0 (Sample M) |
| 1 | 0 | | | — | — | — | — |
| 1 | 0 | | | Chnl N − 7, N − 6 Stream 0 (Sample M) | Chnl N − 5, N − 4 Stream 0 (Sample M) | Chnl N − 3, N − 2 Stream 0 (Sample M) | Chnl N − 1, N Stream 0 (Sample M) |

Table 30 presents valid Sample_Present bits.

TABLE 30

| \multicolumn{5}{c}{Valid Sample_Present Bit Configurations for Multiple Audio Stream Transmission} |
|---|---|---|---|---|
| SP0 | SP1 | SP1 | SP3 | Description |
| 0 | 0 | 0 | 0 | No Subpackets contain audio samples. |
| 1 | 0 | 0 | 0 | Only Subpacket 0 contains audio samples for stream 0 |
| 1 | 1 | 0 | 0 | Subpackets 0 and 1 contain audio samples for stream 0 and 1 |
| 1 | 1 | 1 | 0 | Subpackets 0, 1 and 2 contain audio samples for stream 0, 1 and 2 |
| 1 | 1 | 1 | 1 | All subpackets contain audio samples for stream 0, 1, 2, and 3 |

When transmitting a multi-stream one bit audio, each sub-packet may comprise one audio bit for zero, one, or two (or more) audio channels. Multi-stream one bit audio samples comprise four stream_present bits, and each stream_present bit is for sub-packet.

If the sub-packet comprises audio samples of each individual stream, a corresponding bit will be set. Four stream_invalid.spX bits are set when there is no useful audio data that is available in the source. When stream_invalid.spX is set, sub-packet X continues to indicate the sample period, but it does not contain any useful data.

TABLE 31

| \multicolumn{9}{c}{Multi-Stream One Bit Audio Packet Header} |
|---|---|---|---|---|---|---|---|---|
| | \multicolumn{8}{c}{Bit#} |
| Byte | 7 | 6 | 5 | 4 | 3 | 2 | 1 | 0 |
| HB0 | 0 | 0 | 0 | 0 | 1 | 1 | 1 | 1 |
| HB1 | Rsvd (0) | Rsvd (0) | Rsvd (0) | Rsvd (0) | samples_present sp3 | Samples_present sp2 | Samples_present sp1 | Samples_present sp0 |
| HB2 | Rsvd (0) | Rsvd (0) | Rsvd (0) | Rsvd (0) | Samples_invaild.sp3 | Samples_invalid.sp2 | Samples_invalid.sp1 | Samples_invalid.sp0 |

FIG. 11 is a view representing a transmission stream of a multi-stream audio sample packet of the seventh exemplary embodiment.

FIG. 11 illustrates that the multi-stream audio sample packet may be transmitted in a sample of two views in one sample packet in horizontal blanking interval in case of a 2 audio channels sample packet for dual-view. The multi-stream audio sample may be transmitted by including samples of four view in one sample packet in horizontal blanking interval in case of 2 audio channels sample packet for quad-view. That is, the multi-stream audio sample is transmitted by including samples of 4 views in one sample packet. In FIG. 11, a 2 audio channels sample packet has been described as an example. However, the discussion will the same in the case of a multi-channel audio sample packet of more than 2 channels.

In the various exemplary embodiments, multi-stream audio signals may be transmitted by being included in the area corresponding to the area where each video data of views is located in a vertical synchronization blanking period. FIG. 7 described above is a view illustrating a transmission stream format in such a case. The transmission stream format as illustrated in FIG. 7 may also include audio signals.

1-4. Multi-Stream One Bit Audio Packet

First Exemplary Embodiment

A new packet for a multi-stream one bit audio may be defined. The new packet corresponds to a 3D audio sample packet.

In stream_present.spX: [4 fields, 1 bit each], sub-packet X indicates whether it comprises audio sample of stream X. Since stream_present.spX has substantially the same function as sample_present.spX of the 3D audio sample packets described above, a detailed description thereof will be omitted in the overlapping ranges.

In stream_invalid.spX: [4 fields, 1 bit each], sub-packet X shows sub-packet X whether it comprises invalid sample of stream X. Stream_invalid=1, if samples comprised in the sub-packet X are not valid. Otherwise Stream_invalid=0. Bit is valid only when relevant stream_present.spX is set. Since stream_present.spX has substantially the same function as sample_present.spX of the 3D audio sample packet described above, a detailed description thereof will be omitted in the overlapping ranges.

The sample frequency information about multi-stream one bit audio is transmitted by being included in audio InfoFrame (Reference to section 8.2.2 of HDMI 1.4b).

A multi-stream one bit audio sample packet uses four sub-packets that are identical with one bit audio sample sub-packet shown in Table 31. The reason that one bit multi-stream audio sample packet does not hold B0~B3 fields, unlike the multi-stream audio sample packet, is because it does not follow IEC 60958 block format.

Various Alternatives

One bit multi-stream audio sample packets each corresponding to various exemplary embodiments of the multi-stream audio sample packet described above may be defined. That is, one bit multi-stream audio sample packets may be defined identically as the multi-stream audio sample packet besides the samples_invalid.spX described above, and only B0~B3 fields may be excluded in the multi-stream audio sample packet. A detailed description thereof will be omitted since other contents overlap.

2-1. InfoFrame for 3D Audio/Metadata Packet

First Exemplary Embodiment

In the first exemplary embodiment, additional information related to the 3D audio instead of the infoframe as described above may be transmitted by using a newly defined audio metadata packet. The source transmits audio Meta data in two video fields at least once, always when 3D audio stream is transmitted.

Audio Meta data may comprise the number of channels, Audio Channel Allocation Standard Type (ACAT), and the channel/speaker of the 3D audio stream. Table 32 below shows the header of the audio Meta data packets that are newly defined.

TABLE 32

Audio Metadata Packet Header

| Byte | Bit# 7 | 6 | 5 | 4 | 3 | 2 | 1 | 0 |
|---|---|---|---|---|---|---|---|---|
| HB0 | 0 | 0 | 0 | 0 | 1 | 1 | 0 | 1 |
| HB1 | Rsvd (0) | Rsvd (0) | Rsvd (0) | Rsvd (0) | Rsvd (0) | Rsvd (0) | Rsvd (0) | Rsvd (0) |
| HB2 | Rsvd (0) | Rsvd (0) | Rsvd (0) | Rsvd (0) | Rsvd (0) | Rsvd (0) | Rsvd (0) | Rsvd (0) |

TABLE 33

Audio Metadata Packet Contents

| Byte | Bit# 7 | 6 | 5 | 4 | 3 | 2 | 1 | 0 |
|---|---|---|---|---|---|---|---|---|
| PB0 | Rsvd (0) | Rsvd (0) | Rsvd (0) | 3D_CC4 | 3D_CC3 | 3D_CC2 | 3D_CC1 | 3D_CC0 |
| PB1 | Rsvd (0) | Rsvd (0) | Rsvd (0) | Rsvd (0) | ACAT3 | ACAT2 | ACAT1 | ACAT0 |
| PB2 | 3D_CA7 | 3D_CA6 | 3D_CA5 | 3D_CA4 | 3D_CA3 | 3D_CA2 | 3D_CA1 | 3D_CA0 |
| PB2 PB27 | Reserved (0) | | | | | | | |

Each field of the packet is defined as follows.

3D_CC: [5 bits] indicates a channel count of the transmitted 3D audio. If an audio channel count (CC0 . . . CC2) in an audio infoframe does not match the 3D audio channel count (3D_CC0 . . . 3D_CC4) of the audio Meta data packet, the channel count of the audio infoframe will be ignored. Table 34 shows the audio channel in accordance with the value of 3D_CC.

ACAT: [4 bits] indicates ACAT that is provided by the source. Table 35 below shows the value of the ACAT field. Table 36 describes the allocation of the position of the speaker, when ACAT is set to 0x01 (10.2 channels), Similarly, Table 38 and Table 37 each comprises information for 22.2 channels and 30.2 channels.

3D_CA: [8 bits] shows the channel/speaker allocation for 3D audio. Detailed contents will be illustrated in Table 36~Table 38. 3 D_CA field is not valid for IEC 61937 compressed audio stream.

TABLE 34

3D_CC Field

| 3D_CC4 | 3D_CC3 | 3D_CC2 | 3D_CC1 | 3D_CC0 | Audio Channel Count |
|---|---|---|---|---|---|
| 0 | 0 | 0 | 0 | 0 | Refer to Stream Header |
| 0 | 0 | 0 | 0 | 1 | 2 channels |
| 0 | 0 | 0 | 1 | 0 | 3 channels |
| 0 | 0 | 0 | 1 | 1 | 4 channels |
| 0 | 0 | 1 | 0 | 0 | 5 channels |
| 0 | 0 | 1 | 0 | 1 | 6 channels |
| 0 | 0 | 1 | 1 | 0 | 7 channels |
| 0 | 0 | 1 | 1 | 1 | 8 channels |

TABLE 34-continued

3D_CC Field

| 3D_CC4 | 3D_CC3 | 3D_CC2 | 3D_CC1 | 3D_CC0 | Audio Channel Count |
|---|---|---|---|---|---|
| 0 | 1 | 0 | 0 | 0 | 9 channels |
| 0 | 1 | 0 | 0 | 1 | 10 channels |
| 0 | 1 | 0 | 1 | 0 | 11 channels |
| 0 | 1 | 0 | 1 | 1 | 12 channels |
| — | — | — | — | — | |
| 1 | 1 | 1 | 1 | 1 | 32 channels |

TABLE 35

Audio Channel Allocation Standard Type Field

| ACAT3 | ACAT2 | ACAT1 | ACAT0 | Description |
|---|---|---|---|---|
| 0 | 0 | 0 | 0 | Reserved |
| 0 | 0 | 0 | 1 | Refer to 10 2 channels (TTA Standard) |
| 0 | 0 | 1 | 0 | Refer to 22 2 channels (SMPTE2036-2) |

TABLE 35-continued

Audio Channel Allocation Standard Type Field

| ACAT3 | ACAT2 | ACAT1 | ACAT0 | Description |
|---|---|---|---|---|
| 0 | 0 | 1 | 1 | Refer to 30 2 channels (IEC62574/Ed 1) |
| 0 | 1 | 0 | 0 | reserved |
| 1 | 1 | 1 | 1 | |

TABLE 36

3D_CA Field for 10.2 channels (ACAT = 0x01)

| 3D_CA (binary) | | | | | | | | 3D_CA | Channel Number | | | | | | | | | | | |
|---|---|---|---|---|---|---|---|---|---|---|---|---|---|---|---|---|---|---|---|---|
| 7 | 6 | 5 | 4 | 3 | 2 | 1 | 0 | (hex) | 12 | 11 | 10 | 9 | 8 | 7 | 6 | 5 | 4 | 3 | 2 | 1 |
| 0 | 0 | 0 | 0 | 0 | 0 | 0 | 0 | 0x00 | | | | | | | | | | | FR | FL |
| 0 | 0 | 0 | 0 | 0 | 0 | 0 | 1 | 0x01 | | | | | | | RS | LS | FC | LFE1 | FR | FL |
| 0 | 0 | 0 | 0 | 0 | 0 | 1 | 0 | 0x02 | | | | | BR | BL | RS | LS | FC | LFE1 | FR | FL |
| 0 | 0 | 0 | 0 | 0 | 0 | 1 | 1 | 0x03 | TpFC | LFE2 | TpFR | TpFL | BR | BL | RS | LS | FC | LFE1 | FR | FL |
| 0 | 0 | 0 | 0 | 0 | 1 | 0 | 0 | 0x04 | | | | | | | Reserved | | | | | |
| 1 | 1 | 1 | 1 | 1 | 1 | 1 | 1 | 0xFF | | | | | | | | | | | | |

TABLE 37

3D_CA Field for 22.2 channels (ACAT = 0x02)

| 3D_CA (binary) | | | | | | | | 3D_CA | Channel Number | | | | | | | | | | | |
|---|---|---|---|---|---|---|---|---|---|---|---|---|---|---|---|---|---|---|---|---|
| 7 | 6 | 5 | 4 | 3 | 2 | 1 | 0 | (hex) | 12 | 11 | 10 | 9 | 8 | 7 | 6 | 5 | 4 | 3 | 2 | 1 |
| 0 | 0 | 0 | 0 | 0 | 0 | 0 | 0 | 0x00 | | | | | | | | | | | FR | FL |
| 0 | 0 | 0 | 0 | 0 | 0 | 0 | 1 | 0x01 | | | | | | | SiR | SiL | FC | LFE1 | FR | FL |
| 0 | 0 | 0 | 0 | 0 | 0 | 1 | 0 | 0x02 | | | | | BR | BL | SiR | SiL | FC | LFE1 | FR | FL |
| 0 | 0 | 0 | 0 | 0 | 0 | 1 | 1 | 0x03 | TpFC | LFE2 | TpFR | TpFL | BR | BL | SiR | SiL | FC | LFE1 | FR | FL |
| 0 | 0 | 0 | 0 | 0 | 1 | 0 | 0 | 0x04 | TpFC | LFE2 | TpFR | TpFL | BR | BL | SiR | SiL | FC | LFE1 | FR | FL |
| 0 | 0 | 0 | 0 | 0 | 1 | 0 | 1 | 0x05 | | | | | | | Reserved | | | | | |
| 1 | 1 | 1 | 1 | 1 | 1 | 1 | 1 | 0xFF | | | | | | | | | | | | |

| 3D_CA (binary) | | | | | | | | 3D_CA | Channel Number | | | | | | | | | | | |
|---|---|---|---|---|---|---|---|---|---|---|---|---|---|---|---|---|---|---|---|---|
| 7 | 6 | 5 | 4 | 3 | 2 | 1 | 0 | (hex) | 24 | 23 | 22 | 21 | 20 | 19 | 18 | 17 | 16 | 15 | 14 | 13 |
| 0 | 0 | 0 | 0 | 0 | 0 | 0 | 0 | 0x00 | — | — | — | — | — | — | — | — | — | — | — | — |
| 0 | 0 | 0 | 0 | 0 | 0 | 0 | 1 | 0x01 | — | — | — | — | — | — | — | — | — | — | — | — |
| 0 | 0 | 0 | 0 | 0 | 0 | 1 | 0 | 0x02 | — | — | — | — | — | — | — | — | — | — | — | — |
| 0 | 0 | 0 | 0 | 0 | 0 | 1 | 1 | 0x03 | — | — | — | — | — | — | — | — | — | — | — | — |
| 0 | 0 | 0 | 0 | 0 | 1 | 0 | 0 | 0x04 | BtFC | BtFR | BtFL | TpC | TpSIR | TpSiL | TpBC | TpBR | TpBL | BC | FRC | FLC |
| 0 | 0 | 0 | 0 | 0 | 1 | 0 | 1 | 0x05 | | | | | | | Reserved | | | | | |
| 1 | 1 | 1 | 1 | 1 | 1 | 1 | 1 | 0xFF | | | | | | | | | | | | |

TABLE 38

3D_CA Field for 30.2 channels (ACAT = 0x03)

| 3D_CA (binary) | | | | | | | | 3D_CA | Channel Number | | | | | | | | | | | |
|---|---|---|---|---|---|---|---|---|---|---|---|---|---|---|---|---|---|---|---|---|
| 7 | 6 | 5 | 4 | 3 | 2 | 1 | 0 | (hex) | 12 | 11 | 10 | 9 | 8 | 7 | 6 | 5 | 4 | 3 | 2 | 1 |
| 0 | 0 | 0 | 0 | 0 | 0 | 0 | 0 | 0x00 | | | | | | | | | | | FR | FL |
| 0 | 0 | 0 | 0 | 0 | 0 | 0 | 1 | 0x01 | | | | | | | SiR | SiL | FC | LFE1 | FR | FL |
| 0 | 0 | 0 | 0 | 0 | 0 | 1 | 0 | 0x02 | | | | | BR | BL | SiR | SiL | FC | LFE1 | FR | FL |
| 0 | 0 | 0 | 0 | 0 | 0 | 1 | 1 | 0x03 | TpFC | LFE2 | TpFR | TpFL | BR | BL | SiR | SiL | FC | LFE1 | FR | FL |
| 0 | 0 | 0 | 0 | 0 | 1 | 0 | 0 | 0x04 | TpFC | LFE2 | TpFR | TpFL | BR | BL | SiR | SiL | FC | LFE1 | FR | FL |

TABLE 38-continued

3D_CA Field for 30.2 channels (ACAT = 0x03)

| 0 | 0 | 0 | 0 | 0 | 1 | 0 | 1 | 0x05 | TpFC | LFE2 | TpFR | TpFL | BR | BL | SiR | SiL | FC | LFE1 | FR | FL |
| 0 | 0 | 0 | 0 | 0 | 1 | 1 | 0 | 0x06 | | | | | | | Reserved | | | | | |
| 1 | 1 | 1 | 1 | 1 | 1 | 1 | 1 | 0xFF | | | | | | | | | | | | |

| 3D_CA (binary) | | | | | | | | 3D_CA | Channel Number | | | | | | | | | | | | |
|---|---|---|---|---|---|---|---|---|---|---|---|---|---|---|---|---|---|---|---|---|---|
| 7 | 6 | 5 | 4 | 3 | 2 | 1 | 0 | (hex) | 24 | 23 | 22 | 21 | 20 | 19 | 18 | 17 | 16 | 15 | 14 | 13 | |
| 0 | 0 | 0 | 0 | 0 | 0 | 0 | 0 | 0x00 | — | — | — | — | — | — | — | — | — | — | — | — |
| 0 | 0 | 0 | 0 | 0 | 0 | 0 | 1 | 0x01 | — | — | — | — | — | — | — | — | — | — | — | — |
| 0 | 0 | 0 | 0 | 0 | 0 | 1 | 0 | 0x02 | — | — | — | — | — | — | — | — | — | — | — | — |
| 0 | 0 | 0 | 0 | 0 | 0 | 1 | 1 | 0x03 | — | — | — | — | — | — | — | — | — | — | — | — |
| 0 | 0 | 0 | 0 | 0 | 1 | 0 | 0 | 0x04 | BtFC | BtFR | BtFL | TpC | TpSIR | TpSIL | TpBC | TpBR | TpBL | BC | FRC | FLC |
| 0 | 0 | 0 | 0 | 0 | 1 | 0 | 1 | 0x05 | BtFC | BtFR | BtFL | TpC | TpSIR | TpSIL | TpBC | TpBR | TpBL | BC | FRC | FLC |
| 0 | 0 | 0 | 0 | 0 | 1 | 1 | 0 | 0x06 | | | | | | | Reserved | | | | | |
| 1 | 1 | 1 | 1 | 1 | 1 | 1 | 1 | 0xFF | | | | | | | | | | | | |

| 3D_CA (binary) | | | | | | | | 3D_CA | Channel Number | | | | | | | |
|---|---|---|---|---|---|---|---|---|---|---|---|---|---|---|---|---|
| 7 | 6 | 5 | 4 | 3 | 2 | 1 | 0 | (hex) | 32 | 31 | 30 | 29 | 28 | 27 | 26 | 25 |
| 0 | 0 | 0 | 0 | 0 | 0 | 0 | 0 | 0x00 | — | — | — | — | — | — | — | — |
| 0 | 0 | 0 | 0 | 0 | 0 | 0 | 1 | 0x01 | — | — | — | — | — | — | — | — |
| 0 | 0 | 0 | 0 | 0 | 0 | 1 | 0 | 0x02 | — | — | — | — | — | — | — | — |
| 0 | 0 | 0 | 0 | 0 | 0 | 1 | 1 | 0x03 | — | — | — | — | — | — | — | — |
| 0 | 0 | 0 | 0 | 0 | 1 | 0 | 0 | 0x04 | — | — | — | — | — | — | — | — |
| 0 | 0 | 0 | 0 | 0 | 1 | 0 | 1 | 0x05 | TpRS | TpLS | RSd | LSd | RS | LS | FRW | FLW |
| 0 | 0 | 0 | 0 | 0 | 1 | 1 | 0 | 0x06 | | | | Reserved | | | | |
| 1 | 1 | 1 | 1 | 1 | 1 | 1 | 1 | 0xFF | | | | | | | | |

Whenever an active 3D audio stream is transmitted, an accurate audio metadata packet may be transmitted to two video fields at least once. If there is a start of a new 3D audio stream or there is a change included in a 3D audio stream which may be displayed by audio metadata packet and audio infoframe, a modified and accurate audio metadata packet may be transmitted no later than one video frame following a non-silent audio sample which is first affected. This may occur just before the first audio sample that is affected is transmitted. In terms of a 3D one bit audio stream, audio metadata may be transmitted before the firstly affected sample. An audio metadata packet may be transmitted at any time including the vertical blanking period or horizontal blanking period within the data island period. When 3D audio is streamed, the sink ignores CC and CA fields included in audio infoframe and instead refers to 3D_CC and 3D_CA that are included in the audio metadata.

However, when transmitting the audio metadata described above, the existing Audio Info Frame is still available. In other words, in the case that audio metadata is newly used for the channel allocation for 3D audio, audio infoframe is used for channel allocation for 2D audio.

The ACAT in the exemplary embodiment described above has described 10.2 channels, 22.2 channels, and 30.2 channels. However, the exemplary embodiments may be applied in a case of less than 10.2 channels, more than 30.2 channels, or between 10.2 channels and 30.2 channels.

Further, although a metadata packet is not illustrated in Table 38 above, metadata packet may comprise at least one more field among fields indicating the number of fields and an entire stream that represents stream identification information corresponding to the multi-channel audio data.

Hereinafter, the data transceiving system 1000 according to the first exemplary embodiment described above will be described.

Figure 2:
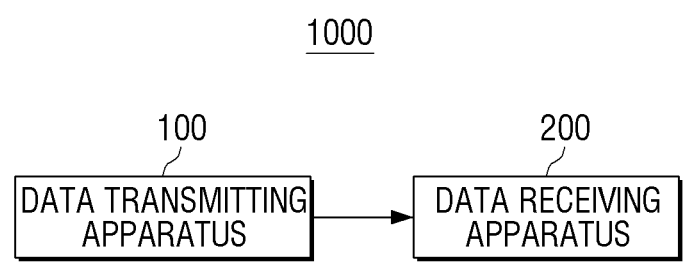
FIG. 2 is a block diagram showing a configuration of a data transceiving system according to an exemplary embodiment.
Figure 3:
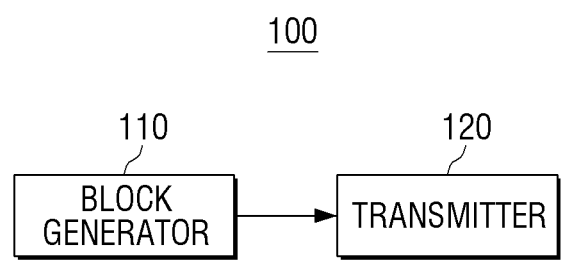
FIG. 3 is a block diagram showing the configuration of a data transmission apparatus of the data transceiving system.
Figure 4:
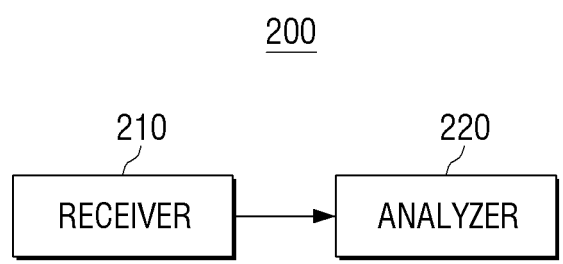
FIG. 4 is a block diagram showing the configuration of a data receiving apparatus of the data transceiving system.

FIG. 2 is a block diagram showing the configuration of the data transceiving system 1000, FIG. 3 is a block diagram showing the configuration of a data transmitting apparatus 100 of the data transceiving system 1000, and FIG. 4 is a block diagram showing the configuration of a data receiving apparatus 200 of the data transceiving system 1000.

As shown in FIG. 2, the data transceiving system 1000 includes the data transmitting apparatus 100 and the data receiving apparatus 200.

As shown in FIG. 3, the data transmitting apparatus 100 includes a block generator 110 and a transmitter 120.

The block generator 110 generates an Extended Display Identification Data (EDID) block for multi-channel audio data. The EDID block includes at least one of a first sub block representing 3D audio characteristics of the multi-channel audio data, a second sub block representing 3D speaker placement information of the multi-channel audio data, and a third sub block representing multi-stream audio characteristics of the multi-channel audio data.

The transmitter 120 transmits the EDID block to a data receiving apparatus.

The EDID block generated and transmitted by the data transmitting apparatus 100 has been described in the first exemplary embodiment.

As shown in FIG. 4, the data receiving apparatus 200 includes a receiver 210 and an analyzer 220.

The receiver 210 receives an EDID block regarding multi-channel audio data from the data transmitting apparatus 100. The EDID block includes at least one of a first sub block representing 3D audio characteristics of the multi-channel audio data, a second sub block representing 3D speaker placement information of the multi-channel audio data, and a third sub block representing multi-stream audio characteristics of the multi-channel audio data.

The analyzer 220 analyzes the EDID block, and processes data included in each sub block.

The EDID block received and processed by the data receiving apparatus 200 has been described in the first exemplary embodiment.

Second Exemplary Embodiment

Unlike the first exemplary embodiment, to the second exemplary embodiment changes an Audio Infoframe that is defined by the related art high-speed wired interface standards. Table 39 shows the audio info frame structure in such a case. CC field indicates the channel count of transmitted audio, and CA field indicates channel/speaker allocation information.

A related art CC field has been represented as three bits. However, the second exemplary embodiment uses two more bits of a reserved area for the CC field. In other words, channel count information is displayed by using five bits of CC0, CC1, CC2, CC3, and CC4.

Meanwhile, CEA861-D, channel/speaker allocation information is added to the reserved area of Table 20. Unlike the first exemplary embodiment, the second exemplary embodiment does not comprise the ACAT field.

Table 39—Modified Audio Infoframe

TABLE 39-1

| Modified Audio InfoFrame Packet Header | | | | | | | | |
|---|---|---|---|---|---|---|---|---|
| Byte/Bit# | 7 | 6 | 5 | 4 | 3 | 2 | 1 | 0 |
| HB0 | | | | Packet type = 0x84 | | | | |
| HB1 | | | | Version Number = 0x01 | | | | |
| HB2 | 0 | 0 | 0 | | Length = 10(0x0A) | | | |

TABLE 39-2

| Audio infoframe Packet contents | | | | | | | | | |
|---|---|---|---|---|---|---|---|---|---|
| Packet Byte # | CEA-861-D Byte # | 7 | 6 | 5 | 4 | 3 | 2 | 1 | 0 |
| PB0 | n. a | | | | Checksum | | | | |
| PB1 | Data Byte 1 | CT3 | CT2 | CT1 | CT0 | Rsvd | CC2 | CC1 | CC0 |
| PB2 | Data Byte 2 | CC4 | CC3 | | SF2 | SF1 | SF0 | SS1 | SS0 |
| PB3 | Data Byte 3 | Format depends on coding type (i.e. CT0 . . . CT3) | | | | | | | |
| PB4 | Data Byte 4 | CA7 | CA6 | CA5 | CA4 | CA3 | CA2 | CA1 | CA0 |
| PB5 | Data Byte 5 | DM_INH | LSV3 | LSV2 | LSV1 | LSV0 | Rsvd(0) | LFEP BL1 | LFEP BL0 |
| PB6 | Data Byte 6 | | | | Reserved(0) | | | | |
| PB7 | Data Byte 7 | | | | Reserved(0) | | | | |
| PB8 | Data Byte 8 | | | | Reserved(0) | | | | |
| PB9 | Data Byte 9 | | | | Reserved(0) | | | | |
| PB10 | Data Byte 10 | | | | Reserved(0) | | | | |
| PB11-PB27 | n. a | | | | Reserved(0) | | | | |

Third Exemplary Embodiment

Likewise, the third exemplary embodiment modifies the audio infoframe that is defined by the related art high-speed wired interface standard by extending the second exemplary embodiment. Table 40 shows the audio info frame structure in such a case. Similar to the second exemplary embodiment, CC field indicates channel count of transmitted audio, and CA field indicates channel/speaker allocation information.

The third exemplary embodiment is basically similar to the second exemplary embodiment, but it provides a plan to expand the CA field. When one bit of the reserved area is set as a channel_extension bit, and a channel_extension=0, CC# and CA# fields that are defined in CEA861 are used as they are. In other words, 2D audio mode is supported. On the other hand, in the case of channel_extension=1, PB2 [7:6] is used as extension bits (CC4, CC3) of CC, and the reserved area of PB6 is used as the CA ext field. Extension bit for 3D audio is used.

In this case, related art CC field has been represented as three bits as described in the second exemplary embodiment. However, the second exemplary embodiment uses two more bits of a reserved area for the CC field. In other words, channel count information is displayed by using five bits of CC0, CC1, CC2, CC3, and CC4.

In addition, it may be used by adding PB6 field in existing CA bits (PB4). The definition of channel/speaker allocation information for audio more than 10.2ch is added in the reserved area of CEA861-D and Table 20. Extra table may be defined by standard. Consequently, multi-channel audio transmission may be available since CA field is expanded to 16 bits.

However, a new 8-bit field may be defined and may be used by replacing the existing CA field. For example, a new CA bit may be defined by using the PB6 field or the PB7 field. A new CA bit may be defined for the PB7 field and the PB6 field.

Table 40—Modified Audio InfoFrame 2

TABLE 40-1

| Audio infoframe Pocket Header | | | | | | | | |
|---|---|---|---|---|---|---|---|---|
| Byte/Bit# | 7 | 6 | 5 | 4 | 3 | 2 | 1 | 0 |
| HB0 | | | | Packet type = 0x84 | | | | |
| HB1 | | | | Version Number = 0x01 | | | | |
| HB2 | 0 | 0 | 0 | | Length = 10(0x0A) | | | |

TABLE 40-2

Audio infoframe Pocket contents

| Packet Byte # | CEA-861-D Byte # | 7 | 6 | 5 | 4 | 3 | 2 | 1 | 0 |
|---|---|---|---|---|---|---|---|---|---|
| PB0 | n. a | | | | Checksum | | | | |
| PB1 | Data Byte 1 | CT3 | CT2 | CT1 | CT0 | Rsvd | CC2 | CC1 | CC0 |
| PB2 | Data Byte 2 | CC4 | CC3 | | SF2 | SF1 | SF0 | SS1 | SS0 |
| PB3 | Data Byte 3 | Format depends on coding type (i.e. CT0 . . . CT3) | | | | | | | |
| PB4 | Data Byte 4 | CA7 | CA6 | CA5 | CA4 | CA3 | CA2 | CA1 | CA0 |
| PB5 | Data Byte 5 | DM_INH | LSV3 | LSV2 | LSV1 | LSV0 | Rsvd(0) | LFEPBL1 | LFEPBL0 |
| PB6 | Data Byte 6 | | | | CA ext | | | | |
| PB7 | Data Byte 7 | | | | Reserved(0) | | | | |
| PB8 | Data Byte 8 | | | | Reserved(0) | | | | |
| PB9 | Data Byte 9 | | | | Reserved(0) | | | | |
| PB10 | Data Byte 10 | | | | Reserved(0) | | | | |
| PB11-PB27 | n. a | | | | Reserved(0) | | | | |

Fourth Exemplary Embodiment

The fourth exemplary embodiment combines the second exemplary embodiment and the third exemplary embodiment. In the fourth exemplary embodiment, the related art audio infoframe comprises a 3D_CH_present field, a CA field of PB4, and a 3D_CC field of PB6.

The 3D_CH_present field performs the same function as the channel_extension in the third exemplary embodiment. In other words, if the 3D_CH_present=0, CC # and CA # fields that are defined in the CEA861-D are used at they are. That is, 2D audio mode is supported. On the other hand, when 3D_CH_present=1, PB6[4:0] is used as extension bit (CC4, CC3, CC2, CC1, CC0), and the reserved area of PB4 is used as the CA field as the second exemplary embodiment. An extension bit for 3D audio is used. Like the second and third exemplary embodiments, the ACAT field is not defined. Other contents that are not specially described are the same as the first to third exemplary embodiments described above.

Table 41—Modified Audio InfoFrame 3

TABLE 41-1

Modified Audio InfoFrame Packet Header

| Byte/Bit# | 7 | 6 | 5 | 4 | 3 | 2 | 1 | 0 |
|---|---|---|---|---|---|---|---|---|
| HB0 | | | | Packet type = 0x84 | | | | |
| HB1 | | | | Version Number = 0x01 | | | | |
| HB2 | 0 | 0 | 0 | | Length = 10(0x0A) | | | |

TABLE 41-2

Modified Audio InfoFrame Packet Contents

| Packet Byte # | CEA-861-D Byte # | 7 | 6 | 5 | 4 | 3 | 2 | 1 | 0 |
|---|---|---|---|---|---|---|---|---|---|
| PB0 | n. a | | | | Checksum | | | | |
| PB1 | Data Byte 1 | CT3 | CT2 | CT1 | CT0 | 3D_CH_present = 1 | CC2 | CC1 | CC0 |
| PB2 | Data Byte 2 | Reserved (0) | | | SF2 | SF1 | SF0 | SS1 | SS0 |
| PB3 | Data Byte 3 | Format depends on coding type (i.e. CT0 . . . CT3) | | | | | | | |
| PB4 | Data Byte 4 | CA7 | CA6 | CA5 | CA4 | CA3 | CA2 | CA1 | CA0 |
| PB5 | Data Byte 5 | DM_INH | LSV3 | LSV2 | LSV1 | LSV0 | Rsvd(0) | LFEPBL1 | LFEPBL0 |
| PB6 | Data Byte 6 | Reserved (0) | | | 3D_CC4 | 3D_CC3 | 3D_CC2 | 3D_CC1 | 3D_CC0 |
| PB7 | Data Byte 7 | | | | Reserved(0) | | | | |
| PB8 | Data Byte 8 | | | | Reserved(0) | | | | |
| PB9 | Data Byte 9 | | | | Reserved(0) | | | | |
| PB10 | Data Byte 10 | | | | Reserved(0) | | | | |
| PB11-PB27 | n. a | | | | Reserved(0) | | | | |

2-2. InfoFrame for Multi-Stream Audio

For multi-stream audio, a new metadata packet is not defined and infoframe that is defined by existing high-speed wired interface standard is used. If a plurality of active audio streams is transmitted by using multi-stream audio sample packets, accurate audio infoframe may be transmitted at least once per two video fields. In this case, the audio infoframe may be used to describe the audio features of all active audio streams.

If there are some changes that are included in an audio stream that may be displayed by the start of a new audio stream, and a plurality of new audio streams, or an audio infoframe, a modified accurate audio infoframe may be transmitted no later than one video field followed by a first non-silent audio sample that is affected. This may occur just before the first audio sample that is affected is transmitted. An audio infoframe may be transmitted before the firstly affected sample in terms of one bit audio stream.

Alteration of InfoFrame

In the case of the exemplary embodiment (the fourth and sixth exemplary embodiments of the 3D audio sample packet, and the second, third, fifth, and sixth exemplary embodiments of the multi-stream audio sample packet) using the stream_ID unlike the exemplary embodiment described above, the stream_ID may be included in an audio infoframe as shown below in Table 42.

In Table 42, stream_ID indicates stream ID of a current audio infoframe, and stream_count indicates the number of the entire transmitting audio stream. In the exemplary embodiment described above, the infoframe is not modified as the way of transmitting samples in four sub-packets composing the body of the multi-stream audio sample packet instead of using a stream identifier.

Table 42—Modified InfoFrame

TABLE 42-1

| Audio InfoFrame Packet Header | | | | | | | | |
|---|---|---|---|---|---|---|---|---|
| Byte/Bit# | 7 | 6 | 5 | 4 | 3 | 2 | 1 | 0 |
| HB0 | | | | Packet type = 0x84 | | | | |
| HB1 | | | | Version Number = 0x01 | | | | |
| HB2 | 0 | 0 | 0 | Length = 10(0x0A) | | | | |

TABLE 42-2

| Audio InfoFrame Packet contents | | | | | | | | | |
|---|---|---|---|---|---|---|---|---|---|
| Packet Byte # | CEA-861-D Byte # | 7 | 6 | 5 | 4 | 3 | 2 | 1 | 0 |
| PB0 | n. a | | | | | Checksum | | | |
| PB1 | Data Byte 1 | CT3 | CT2 | CT1 | CT0 | 3D_CH_present | CC2 | CC1 | CC0 |
| PB2 | Data Byte 2 | | Reserved (0) | | SF2 | SF1 | SF0 | SS1 | SS0 |
| PB3 | Data Byte 3 | | | Format depends on coding type (i.e. CT0 . . . CT3) | | | | | |
| PB4 | Data Byte 4 | CA7 | CA6 | CA5 | CA4 | CA3 | CA2 | CA1 | CA0 |
| PB5 | Data Byte 5 | DM_INH | LSV3 | LSV2 | LSV1 | LSV0 | Rsvd(0) | LFEPBL1 | LFEPBL0 |
| PB6 | Data Byte 6 | | Reserved (0) | | 3D_CC4 | 3D_CC3 | 3D_CC2 | 3D_CC1 | 3D_CC0 |
| PB7 | Data Byte 7 | | Reserved(0) | | | Stream_count-1 | | Stream_ID | |
| PB8 | Data Byte 8 | | | | | Reserved(0) | | | |
| PB9 | Data Byte 9 | | | | | Reserved(0) | | | |
| PB10 | Data Byte 10 | | | | | Reserved(0) | | | |
| PB11-PB27 | n. a | | | | | Reserved(0) | | | |

3-1. EDID for 3D Audio

Information in an audio feature and speaker allocation on 3D audio may be included in EDID using one of the following methods (1) by modifying related art short audio descriptor and speaker allocation data block, (2) by defining new data blocks in a reserved area for audio-related blocks from Extended Tag Codes, and (3) by defining one new data block in a reserved area of HDMI Audio Data Block from Extended Tag Codes.

For example, an EDID data block written in CEA-861-F (or D or E) may be used to indicate all of the sink audio features and the speaker allocation support. Sink audio feature and speaker allocation support are displayed on a series of short audio descriptors located in data block collection of the CEA Extension. These data comprise parameters that are related to each encoding which is the same as an audio encoding list supported by a sink and as the number of channel supporting formats thereof. Speaker allocation descriptor may be included in data block collection, and may be required in a sink supporting multi-channel (up to 8 channels) L-PCM for 2D audio or multi-channel (up to 8 channels) one bit audio.

First Exemplary Embodiment

However, when a sink supports multi-stream audio and/or 3D audio transmission in the exemplary embodiments, HDMI audio data block (High Speed Cable Interface Audio Data Block) with an extended tag code 18 may be used to indicate a 3D audio feature, a 3D speaker allocation, and a multi-stream audio feature.

If a sink supports 3D audio transmission, the HDMI audio data block comprises more than one HDMI 3D audio descriptor (HDMI_3D_AD) with four bytes. The HDMI audio data block may include one HDMI 3D speaker allocation descriptor (HDMI_3D_SAD) followed by last HDMI 3D audio descriptor.

When a sink supports multi-steam audio transmission but does not support 3D audio transmission, an HDMI audio data block may include more than one CEA short audio descriptor (CEA_SAD) following 3 bytes. CEA short audio descriptor is displayed in CEA-861-F (D or E).

When the sink supports multi-stream audio transmission and 3D audio transmission, HDMI audio data block comprises more than one CEA short audio descriptor following HDMI 3D speaker allocation descriptor. For more information, see Table 43.

The above-mentioned HDMI 3D audio descriptor indicates the support for audio encoding that is defined in CEA-861-F (also D or E). A high-speed wired interface apparatus may support a 3D audio format following TTA (10.2ch), SMPTE2036-2 (22.2ch), and IEC62574 (30.2ch). A detailed content of Table 49 will be described in Table 45. These tables are categorized by the audio format code that is specified in Table 24 and Table 26 of CEA-861-F (also D or E).

HDMI 3D speaker allocation descriptor as described above may be included in HDMI audio data block, and may be required in a sink supporting 3D audio. The structure of an HDMI 3D speaker allocation descriptor is shown in Table 50. Sink shows an audio ability by indicating a pair of speakers, and sets the corresponding flag. HDMI 3D speaker allocation descriptor may comprise 4 bits ACAT field, and these indicate the type of audio channel allocation standard. A detailed content of Table 52 will be described in Table 50. CEA short audio descriptors may also be comprised in HDMI audio data block, and may be required in a sink supporting multi-stream audio transmission. These descriptors describe an audio feature of each audio stream. Maximum channel count is limited to 2 channels on each audio stream, but it may be more according to the exemplary embodiment.

TABLE 43

| | | | | | | | | |
|---|---|---|---|---|---|---|---|---|
| HDMI Audio Data Block | | | | | | | | |
| Byte/Bit # | 7 | 6 | 5 | 4 | 3 | 2 | 1 | 0 |
| 1 | Tag cod = 7 (Use Extended Tag) | | | L* = Length of following data block payload (in bytes) | | | | |
| 2 | Extended Tag Code = 18 (0x12) | | | | | | | |
| 3 | NUM_HDML_3D_AD(=X) | | | NUM_CEA_SAD(=Y) | | | Max_Stream_coun | |
| (4)~(7) | (if NUM_HDMI_3D_AD > 0) HDMI_3D_AD_1 | | | | | | | |
| ... | ... | | | | | | | |
| (3 * X + 1)~(3 * X + 4) | (if NUM_HDMI_3D_AD > 0) HDMI_3D_AD_X | | | | | | | |
| (N**)~(n + 3) | (if NUM_HDMI_3D_AD > 0) HDMI_3D_SAD | | | | | | | |
| (N + 4)~(N + 6) | (if Max_Stream_Count − 1 > 0 and NUM_CEA_SAD > 0) CEA_SAD_1 | | | | | | | |
| ... | ... | | | | | | | |
| (N + (3 * y + 1))~(N + (3 * Y + 3)) | (if Max_Stream_Count − 1 > 0 and NUM_CEA_SAD > 0) CEA_SAD_Y | | | | | | | |

*The length of the following data block payload (in bytes), 2 + 4 * X + 4 + 3 * Y ** 3 + 4 * X + 1

It is as follows to describe each field of HDMI audio data blocks that have been illustrated in Table 43 above.

NUM_HDMI_3D_AD: [3 bits] indicates the number of HDMI 3D audio descriptors.

NUM_CEA_SAD:[3 bits] indicates the number of CEA Short Audio Descriptors.

Max_Stream_Count−1: [2 bits] indicates the number obtained when 1 is subtracted from the maximum stream count. Refer to Table 44.

HDMI_3D_AD: HDMI 3D Audio Descriptor.

HDMI_3D_SAD: HDMI 3D Speaker Allocation Descriptor.

CEA_SAD CEA: CEA Short Audio Descriptor).

TABLE 44

| Max_Stream_Count − 1 field | |
|---|---|
| Max_Stream_Count − 1 | Description |
| 00 | Do not support Multi-Stream Audio |
| 01 | 2 audio streams |
| 10 | 3 audio streams |
| 11 | 4 audio streams |

TABLE 45

| | | | | | | | | |
|---|---|---|---|---|---|---|---|---|
| HDMI 3D Audio Descriptor for Audio Format Code = 1 (LPCM) | | | | | | | | |
| Byte/Bit # | 7 | 6 | 5 | 4 | 3 | 2 | 1 | 0 |
| 1 | 0 | 0 | 0 | 0 | Audio Format Code = 0001b | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHZ | 32 kHz |
| 4 | 0 | 0 | 0 | 0 | 0 | 24 bit | 20 bit | 16 bit |

TABLE 46

HDMI 3D Audio Descriptor for Audio Format Codes 2 to 8

| Byte/Bit # | 7 | 6 | 5 | 4 | 3 | 2 | 1 | 0 |
|---|---|---|---|---|---|---|---|---|
| 1 | 0 | 0 | 0 | 0 | Audio Format Code | | | |
| 2 | 0 | 0 | 0 | Max Number of channels − 1 | | | | |
| 3 | 0 | 192 kHz | 176.4 kH | 96 kHz | 88.2 kHz | 48 kHz | 44.1 kHZ | 32 kHz |
| 4 | Maximum bit rate divided by 8 kHz | | | | | | | |

TABLE 47

HDMI 3D Audio Descriptor for Audio Format Codes 9 to 13

| Byte/Bit # | 7 | 6 | 5 | 4 | 3 | 2 | 1 | 0 |
|---|---|---|---|---|---|---|---|---|
| 1 | 0 | 0 | 0 | 0 | Audio Format Code | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHZ | 32 kHz |
| 4 | Audio Format Code dependent value | | | | | | | |

TABLE 48

HDMI 3D Audio Descriptor for Audio Format Code 14 (WWA Pro)

| Byte/Bit # | 7 | 6 | 5 | 4 | 3 | 2 | 1 | 0 |
|---|---|---|---|---|---|---|---|---|
| 1 | 0 | 0 | 0 | 0 | Audio Format Code = 1110b | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHZ | 32 kHz |
| 4 | Reserved (0) | | | | Profile | | | |

TABLE 49

HDMI 3D Audio Descriptor for Audio Format Code 15 (Extension)

| Byte/Bit # | 7 | 6 | 5 | 4 | 3 | 2 | 1 | 0 |
|---|---|---|---|---|---|---|---|---|
| 1 | 0 | 0 | 0 | 0 | Audio Format Code = 1111b | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHZ | 32 kHz |
| 4 | Audio Format Code Extension | | | | 0 | 0 | 0 | 0 |

TABLE 50

HDMI 3D Speaker Allocation Descriptor for 10.2 channels (TTA Standard)

| Byte/Bit # | 7 | 6 | 5 | 4 | 3 | 2 | 1 | 0 |
|---|---|---|---|---|---|---|---|---|
| PB1 | FLW/FRW | BLC/BRC | FLC/FRC | BC | BL/BR | FC | LFE1 | FL/FR |
| PB2 | TpSIL/TpSiR | SiL/SiR | TpBC | LFE2 | LS/RS | TpFC | TpC | TpFL/TpFR |
| PB3 | 0 | 0 | 0 | LSd/LRd | TpLS/TpRS | BtFL/BtFR | BtFC | TpBL/TpBR |
| PB4 | ACAT (=0X01) | | | | 0 | 0 | 0 | 0 |

Bit presented in bold letter in Table 50 above is the specified speaker associated with the 10.2. channels.

TABLE 51

HDMI 3D Speaker Allocation Descriptor for 22.2 channels (SMPTE2036-2)

| Byte/Bit # | 7 | 6 | 5 | 4 | 3 | 2 | 1 | 0 |
|---|---|---|---|---|---|---|---|---|
| PB1 | FLW/FRW | BLC/BRC | FLC/FRC | BC | BL/BR | FC | LFE1 | FL/FR |
| PB2 | TpSiL/TpSiR | SiL/SiR | TpBC | LFE2 | LS/RS | TpFC | TpC | TpFL/TpFR |
| PB3 | 0 | 0 | 0 | LSd/LRd | TpLS/TpRS | BtFL/BtFR | BtFC | TpBL/TpBR |
| PB4 | | ACAT (=0X02) | | | 0 | 0 | 0 | 0 |

Bit presented in bold letter in Table above is the specified speaker associated with the 22.2. channels.

TABLE 52

HDMI 3D Speaker Allocation Descriptor for 30.2 channels (IEC62574/Ed. 1)

| Byte/Bit # | 7 | 6 | 5 | 4 | 3 | 2 | 1 | 0 |
|---|---|---|---|---|---|---|---|---|
| PB1 | FLW/FRW | BLC/BRC | FLC/FRC | BC | BL/BR | FC | LFE1 | FL/FR |
| PB2 | TpSIL/TpSiR | SiL/SiR | TpBC | LFE2 | LS/RS | TpFC | TpC | TpFL/TpFR |
| PB3 | 0 | 0 | 0 | LSd/LRd | TpLS/TpRS | BtFL/BtFR | BtFC | TpBL/TpBR |
| PB4 | | ACAT (=0X03) | | | 0 | 0 | 0 | 0 |

Bit presented in bold letter in Table above is the specified speaker associated with the 30.2. channels.

In the first exemplary embodiment, speaker allocation of multi-channel 3D audio data is described with 3 bytes, but this is merely an example. More speaker allocation information may be needed for a 3D audio data of more than 30.2 channels, and 3D speaker allocation descriptor may display speaker allocation by using more than 4 bytes in this case.

TABLE 53

Audio Channel Allocation Type (ACAT) Field

| ACAT3 | ACAT2 | ACAT1 | ACAT0 | Description |
|---|---|---|---|---|
| 0 | 0 | 0 | 0 | Reserved |
| 0 | 0 | 0 | 1 | Refer to 10 2 channels (TTA Standard) |
| 0 | 0 | 1 | 0 | Refer to 22 2 channels (SMPTE2036-2) |
| 0 | 0 | 1 | 1 | Refer to 30 2 channels (IEC62574/Ed 1) |

TABLE 53-continued

Audio Channel Allocation Type (ACAT) Field

| ACAT3 | ACAT2 | ACAT1 | ACAT0 | Description |
|---|---|---|---|---|
| 0 | 1 | 0 | 0 | Reserved |
| 1 | 1 | 1 | 1 | |

Meanwhile, remaining values of bits of ACAT field may be used by being allocated in various channel types (eg Dolby, USC, or a format of ITU-R which will be standardized in the future) in accordance with the manufacturer.

The Second Exemplary Embodiment

Unlike the first exemplary embodiment, the second exemplary embodiment modifies the audio data block. In particular, a reserved area of CEA Short Audio Descriptor may be used to extend and display max number of channel. For example, it may be extended by using Byte 1 [7] and Byte 2 [7] as shown in Table 54 below. Thus, 3D audio may be represented. CEA Short Audio Descriptor may hold a different field area in accordance with audio format.

TABLE 54-1

CEA Short Audio Descriptor for Audio Code = 1 (LPCM)

| Byte# | Bits | | | | | | | |
|---|---|---|---|---|---|---|---|---|
| | 7 | 6 | 5 | 4 | 3 | 2 | 1 | 0 |
| 1 | $F17 = 0$ | Audio Format Code = 0001 | | | | Max Number of channels - 1 | | |
| 2 | $F27 = 0$ | 192 kHz | 176.4 kHz | 96 kHz | 88.2 kHz | 48 kHz | 44.1 kHz | 32 kHZ |
| 3 | $F37 = 0$ | $F36 = 0$ | $F35 = 0$ | $F34 = 0$ | $F33 = 0$ | 24 bit | 20 bit | 16 bit |

TABLE 54-2

CEA Short Audio Descriptor for Audio Codes 2 to 8

| Byte# | \ | \ | \ | Bits | \ | \ | \ | \ |
|---|---|---|---|---|---|---|---|---|
| | 7 | 6 | 5 | 4 | 3 | 2 | 1 | 0 |
| 1 | F17 = 0 | | Audio Format Code | | | Max Number of channels - 1 | | |
| 2 | F27 = 0 | 192 kHz | 176.4 kHz | 96 kHz | 88.2 kHz | 48 kHz | 44.1 kHz | 32 kHZ |
| 3 | | | Maimum bit rate divided by 8 kHz | | | | | |

TABLE 54-3

CEA Short Audio Descriptor for Audio Codes 9 to 15

| Byte# | \ | \ | \ | bits | \ | \ | \ | \ |
|---|---|---|---|---|---|---|---|---|
| | 7 | 6 | 5 | 4 | 3 | 2 | 1 | 0 |
| 1 | F17 = 0 | | Audio Format Code | | | Max Number of channels - 1 | | |
| 2 | F27 = 0 | 192 kHz | 176.4 kHz | 96 kHz | 88.2 kHz | 48 kHz | 44.1 kHz | 32 kHZ |
| 3 | | | [Default = 0, unless Defined by Audio Codex Vendor] | | | | | |

ACAT (Audio Channel Allocation Standard Type) may be set by modifying speaker allocation data block independently from the second exemplary embodiment. ACAT may be identified by using Byte 3 [7:4], which is a reserved area of speaker allocation data block payload, speaker allocation data block for each type may be defined as a separate new table.

The position of the ACAT field may be defined in a different position within the range of Byte 2 [7:3]~Byte 3 [7:0].

As illustrated in Table 55 below, ACAT=0001 may indicate 10.2 channels of TTA standard, and ACAT=0010 may indicate 22.2 channels.

Table 55—Speaker Allocation Data Block Payload

TABLE 55

Speaker Allocation Data Block Payload (Refer to CEA861-E)

| Byte# | \ | \ | \ | bits | \ | \ | \ | \ |
|---|---|---|---|---|---|---|---|---|
| | 7 | 6 | 5 | 4 | 3 | 2 | 1 | 0 |
| 1 | FLW/FRW | RLC/RRC | FLC/FRC | RC | RL/RR | FC | LFL | FL/FR |
| 2 | F27 = 0 | F26 = 0 | F25 = 0 | F24 = 0 | F23 = 0 | FCH | TC | FLH/FRH |
| 3 | F37 = 0 | F36 = 0 | F35 = 0 | F34 = 0 | F33 = 0 | F32 = 0 | F31 = 0 | F30 = 0 |

TABLE 55-1

ACAT Field

| ACAT | description |
|---|---|
| 0000 | Refer to CEA861-D (E,F) |
| 0001 | Refer to 10.2 channel (TTA Standard) |
| 0010 | Refer to 22.2 channel (SMPTE2036-2) |
| 0011~1111 | Reserved |
| 0011~1111 | Reserved |

TABLE 55-2

Speaker Allocation Data Block Payload (for 22.2 channel)

| Byte#/bit | 7 | 6 | 5 | 4 | 3 | 2 | 1 | 0 |
|---|---|---|---|---|---|---|---|---|
| 1 | LFE2 | SIL/SIR | FLC/FLR | BC | BL/BR | FC | LFE1 | FL/FR |
| 2 | BtFC | BtFL/BtFR | TpBC | TpSIL/TpSIR | TpBL/TpBR | TpC | TpFC | TpFL/TpFR |
| 3 | | | ACAT = 0010b | | 0 | 0 | 0 | 0 |

TABLE 55-3

Speaker Allocation Data Block Payload (for 10.2 channel)

| Byte#/bit | 7 | 6 | 5 | 4 | 3 | 2 | 1 | 0 |
|---|---|---|---|---|---|---|---|---|
| 1 | CH | LC/RC | LB/RB | LS/RS | LFE2 | LFE1 | C | L/R |
| 2 | 0 | 0 | 0 | 0 | 0 | 0 | 0 | 0 |
| 3 | | | ACAT = 0010b | | 0 | 0 | 0 | 0 |

However, the allocation data block of a speaker may be defined differently in accordance with the manufacturer. In this case, a plan of enhancing compatibility may be considered by utilizing a common speaker placement in accordance with the manufacturer. Table 56 below shows the SMPTE2036-2 standard for 3D audio of 22.2 channels. Bit presented in bold letter corresponds to common speaker placement of several manufacturers.

TABLE 56

Speaker Allocation Data Block Payload 2 (Refer to CEA861-E)

| Byte# | Bits | | | | | | | |
|---|---|---|---|---|---|---|---|---|
| | 7 | 6 | 5 | 4 | 3 | 2 | 1 | 0 |
| 1 | FLW/FRW | RLC/RRC | FLC/FRC | RC | RL/RR | FC | LFL | FL/FR |
| 2 | F27 = 0 | F26 = 0 | F25 = 0 | F24 = 0 | F23 = 0 | FCH | TC | FLH/FRH |
| 3 | F37 = 0 | F36 = 0 | F35 = 0 | F34 = 0 | F33 = 0 | F32 = 0 | F31 = 0 | F30 = 0 |

TABLE 56-1

ACAT Field

| ACAT | Description |
|---|---|
| 0000 | Refer to CEA861-D (E,F) |
| 0001 | Refer to 10.2 channel (TTA Standard) |
| 0010 | Refer to 22.2 channel (SMPTE2036-2) |
| 0011~1111 | Reserved |

TABLE 56-2

Speaker Allocation Data Block Payload (for 22.2 channel)

| Byte#/bit | 7 | 6 | 5 | 4 | 3 | 2 | 1 | 0 |
|---|---|---|---|---|---|---|---|---|
| 1 | FLW/FRW | RLC/RRC | FLC/FRC | RC | RL/RR | FC | LFE | FL/FR |
| 2 | TpBC | TpSIL/TpSIR | TpBL/TpBR | LFE2 | SIL/SIR | FCH | TC | FLH/FRH |
| 3 | | | ACAT = 0010b | | 0 | 0 | BtFC | BtFL/BtFR |

TABLE 56-3

Speaker Allocation Data Block Payload (for 10.2 channel)

| Byte#/bit | 7 | 6 | 5 | 4 | 3 | 2 | 1 | 0 |
|---|---|---|---|---|---|---|---|---|
| 1 | FLW/FRW | RLC/RRC (LB/RB) | FLC/FRC | RC | RL/RR (LS/RS) | FC | LFE | FL/FR |
| 2 | TpBC | TpSIL/TpSIR | TpBL/TpBR | LFE2 | SIL/SIR | FCH | TC | FLH/FRH |
| 3 | | | ACAT = 0010b | | 0 | 0 | BtFC | BtFL/BtFR |

However, ACAT field is not defined separately in the exemplary embodiment of the speaker allocation data block payload described above, and classification of each type (eg 10.2ch (TTA), 22.2ch (SMPTE2036-2), 13.1 ch (Dolby)) may be available in the source after checking the position and types of bits that are set in the speaker allocation data block payload. Accordingly, the number of channels that are available through modified audio data block may be known.

Third Exemplary Embodiment

The third exemplary embodiment is not defined in the HDMI audio data block, but newly defines "Extended Speaker Allocation Data Block" type in the Extended Tag Code of EDID without having to define a new data block from the HDMI audio. The size of the new data block will be available up to a maximum of 32 bytes. Table 57 gives an example of a case of 4 bytes. The size of ACAT may be modified based on the needs of the user.

ACAT is identified by using reserved area (Byte 3 [7:4]), and speaker allocation data block for each type is defined. The configuration of payload may be the same as the exemplary embodiment described above. Of course, ACAT field may be located in different area other than the reserved area as described above.

A remaining bit value of the ACAT field may be used by being allocated to various channel types (e.g., Dolby, USC, or ITU-R format that will be standardized in the future) in accordance with the manufacturer.

TABLE 57

Modified Speaker Allocation Data Block

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6 . . . 15 | Reserved for video = relaesed blocks |
| 16 | CEA Mrscellaneous Audio Fields |
| 17 | Vendor-Specific Audio Data Block |
| 18 | Reserved for HDMI Audio Data Block |
| 19 | Extended Speaker Allocation Data Block |
| 20 . . . 31 | Reserved for audio-related blocks |
| 32 . . . 255 | Reserved for general |

TABLE 57-1

ACAT Description

| ACAT | description |
|---|---|
| 0000 | CEA861-D (E,F) |
| 0001 | 10.2 channel (TTA Standard) |
| 0010 | 22.2 channel (SMPTE2036-2) |
| 0011~1111 | Reserved |

TABLE 57-2

Extended Speaker Allocation Data Block Payload (for 10.2 channel)

| Byte#/bit | 7 | 6 | 5 | 4 | 3 | 2 | 1 | 0 |
|---|---|---|---|---|---|---|---|---|
| 1 | FLW/FRW | RLC/RRC | FLC/FRC | RC | RL/RR | FC | LFE | FL/FR |
| 2 | TpBC | TpSIL/TpSIR | TpBL/TpBR | LFE2 | SIL/SIR | FCH | TC | FLH/FRH |
| 3 | 0 | 0 | 0 | LSd/RSd | LS/RS | TpLS/TpRS | BtFC | BtFL/BtFR |
| 4 | | | ACAT = 0001b | | 0 | 0 | 0 | 0 |

TABLE 57-3

Extended Speaker Allocation Data Block Payload (for 22.2 channel)

| Byte#/bit | 7 | 6 | 5 | 4 | 3 | 2 | 1 | 0 |
|---|---|---|---|---|---|---|---|---|
| 1 | FLW/FRW | RLC/RRC | FLC/FRC | RC | RL/RR | FC | LFE | FL/FR |
| 2 | TpBC | TpSIL/TpSIR | TpBL/TpBR | LFE2 | SIL/SIR | FCH | TC | FLH/FRH |
| 3 | 0 | 0 | 0 | LSd/RSd | LS/RS | TpLS/TpRS | BtFC | BtFL/BtFR |
| 4 | | | ACAT = 0010b | | 0 | 0 | 0 | 0 |

TABLE 57-4

Extended Speaker Allocation Data Block Payload (for 30.2 channel)

| Byte#/bit | 7 | 6 | 5 | 4 | 3 | 2 | 1 | 0 |
|---|---|---|---|---|---|---|---|---|
| 1 | FLW/FRW | RLC/RRC | FLC/FRC | RC | RL/RR | FC | LFE | FL/FR |
| 2 | TpBC | TpSIL/TpSIR | TpBL/TpBR | LFE2 | SIL/SIR | FCH | TC | FLH/FRH |
| 3 | 0 | 0 | 0 | LSd/RSd | LS/RS | TpLS/TpRS | BtFC | BtFL/BtFR |
| 4 | | | ACAT = 0011b | | 0 | 0 | 0 | 0 |

Fourth Exemplary Embodiment

The fourth exemplary embodiment is similar to the third exemplary embodiment, but it is different in that data blocks are added in extended tag codes after defining the data block for a speaker allocation standard type (e.g. 10.2ch (TTA), 22.2ch (NHK), 13.1 ch (Dolby)).

For example, the block tag code 19 may indicate speaker allocation data block for TTA 10.2 channels, the data block tag code 20 may indicate speaker allocation data block for NHK 22.2 channels, and data block tag code 21 may indicate speaker allocation data block for Dolby 13.1 channels.

TABLE 58

Modified Speaker Allocation Data Block

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6 . . . 15 | Reserved for video = relaesed blocks |
| 16 | CEA Mrscellaneous Audio Fields |
| 17 | Vendor-Specific Audio Data Block |
| 18 | Reserved for HDMI Audio Data Block |
| 19 | HDMI Speaker Allocation Data Block for 10.2 ch (TTA) |
| 20 | HDMI Speaker Allocation Data Block for 22.2 ch (NHK) |
| 21 | HDMI Speaker Allocation Data Block for 13.1 ch (Dolby) |

TABLE 58-continued

Modified Speaker Allocation Data Block

| Extended Tag Codes | Type of Data Block |
|---|---|
| 22 ... 31 | Reserved for audio-related blocks |
| 32 ... 255 | Reserved for general |

TABLE 58-1

Speaker Allocation Data Block payload(for multi-channel)

| Byte#/bit | 7 | 6 | 5 | 4 | 3 | 2 | 1 | 0 |
|---|---|---|---|---|---|---|---|---|
| 1 | Pos.7 | — | — | — | — | — | — | Pos.0 |
| 2 | Pos.15 | — | — | — | — | — | — | Pos.8 |
| 3 | Pos.23 | — | — | — | — | — | — | Pos.16 |
| 4 | Pos.31 | — | — | — | — | — | — | Pos.24 |

Fifth Exemplary Embodiment

The fifth exemplary embodiment defines an extended audio data block. The extended audio data block corresponds to the value of an extended tag code. And the extended audio data block comprises more than one extension CEA short audio descriptor. Each extension CEA short audio descriptor comprises information on the number of channels. In this case, the size or the format of each field may be the same as a short audio descriptor of an audio data block, but it may be defined differently.

TABLE 59

Extended Audio Data Block

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6 ... 15 | Reserved for video = relaesed blocks |
| 16 | CEA Mrscellaneous Audio Fields |
| 17 | Vendor-Specific Audio Data Block |
| 18 | Reserved for HDMI Audio Data Block |
| 19 | Extended Audio Data Block (includes one or more Extended Short Audio Descriptors) |
| 20 | Extended Speaker Allocation Data Block |
| 21 | Multiple Audio Stream Data Block |
| 22 ... 31 | Reserved for audio-related blocks |
| 32 ... 255 | Reserved for general |

TABLE 59-1

Extended Audio Data Block

| Byte#/bit | 7 | 6 | 5 | 4 | 3 | 2 | 1 | 0 |
|---|---|---|---|---|---|---|---|---|
| PB1 | Tag Code = 7 (USE Extended Tag) | | | | Length = total number of extension audio bytes following chis byte | | | |
| PB2 | Extended data Block Tag Code = 13 h | | | | | | | |
| PB3 | Extended CEA Short Audio Descriptor 1 (Refer to table 8*25) | | | | | | | |
| PB4 | | | | | | | | |
| PB5 | | | | | | | | |
| ... | | | | | — | | | |
| PB N-2 | **Extended CEA Short Audio Descriptor X (Refer to table 8*25)** | | | | | | | |
| PB N-1 | | | | | | | | |
| PB N | | | | | | | | |

TABLE 59-2

Extended CEA Short Audio Descriptor

| Byte#/bit | 7 | 6 | 5 | 4 | 3 | 2 | 1 | 0 |
|---|---|---|---|---|---|---|---|---|
| PB1 | 0 | Uncompressed Audiio Format Code = 00 or 01 | | | Max number of channels-1 | | | |
| PB2 | 0 | 192 kHz | 176.4 kHz | 96 kHz | 88.2 kHz | 48 kHz | 44.1 kHz | 32 kHz |
| PB3 | 0 | 0 | 0 | 0 | 0 | 24 bit | 20 bit | 16 bit |

An extension CEA short audio descriptor may comprise uncompressed audio format code as illustrated in Table 59 above. The uncompressed audio format code may be defined as follows.

TABLE 60

| Uncompressed Audio Format Code | |
|---|---|
| Uncompressed Audio Format Code | Description |
| 00 | FCM |
| 01 | One Bit Audio |
| 10 | Reserved |
| 11 | |

At this time, an extended speaker allocation data block may be defined as the value of an extended tag code. Extended speaker allocation data block may include an ACAT field as the following table. A reserved area may be used for extension, or a remaining value of the bit may be used by being allocated in various channel types (e.g. Dolby, USC or ITU-R format which will be standardized in the future) in accordance with the manufacturer.

TABLE 61

| Extended Speaker Allocation Data Block | |
|---|---|
| Extended Tag Codes | Type of Data Block |
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6 ... 15 | Reserved for video = relaesed blocks |
| 16 | CEA Mrscellaneous Audio Fields |
| 17 | Vendor-Specific Audio Data Block |
| 18 | Reserved for HDMI Audio Data Block |
| 19 | Extended Audio Data Block (includes one or more Extended Short Audio Descriptors) |
| 20 | Extended Speaker Allocation Data Block |
| 21 | Multiple Audio Stream Data Block |
| 22 ... 31 | Reserved for audio-related blocks |
| 32 ... 255 | Reserved for general |

TABLE 61-1

| Extended Speaker Allocation Data Block | | | | | | | | |
|---|---|---|---|---|---|---|---|---|
| Byte#/bit | 7 | 6 | 5 | 4 | 3 | 2 | 1 | 0 |
| PB1 | Tag Code = 7 (USE Extended Tag) | | | Length = total number of extension audio bytes following chis byte (=5 byte) | | | | |
| PB2 | Extended data Block Tag Code = 13 h | | | | | | | |
| PB3 | FLw/FRw | RLC/RRC | FLC/FRC | RC | RL/RR | FC | LFE1 | FL/FR |
| PB4 | TpBC | TpSIL/TpSIR | TpBL/TpBR | LFE2 | SiL/SiR | FCM | TC | FLH/FRH |
| PB5 | 0 | 0 | 0 | LSd/LRd | LS/RS | TpLS/TpRS | BtFC | BtFL/BtFR |
| PB6 | ACAT(Audio Channel Allocation Type) | | | | 0 | 0 | 0 | 0 |

TABLE 61-2

| ACAT Description | | | | |
|---|---|---|---|---|
| ACAT3 | ACAT2 | ACAT1 | ACAT0 | Description |
| 0 | 0 | 0 | 0 | Refer to CEA861-D (or E, F) |
| 0 | 0 | 0 | 1 | Refer to 10.2 channels (TTA Standard) |
| 0 | 0 | 1 | 0 | Refer to 22.2 channels (SMRTE 2036-2) |
| 0 | 0 | 1 | 1 | Refer to 30.2 channels (IEC62574Ed 1) |
| 0 | 1 | 0 | 0 | Reserved |
| 1 | 1 | 1 | 1 | |

In this exemplary embodiment, the payload of an extended speaker allocation data block is illustrated in the following table. The shaded area is used for speaker allocation of each channel allocation type.

TABLE 62

| Byte#/bit | 7 | 6 | 5 | 4 | 3 | 2 | 1 | 0 |
|---|---|---|---|---|---|---|---|---|
| | | | Channel Allocation Compatibility | | | | | |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpRS | BtFC | BtFL/BtFR |
| PB4 | ACAT(Audio channel Allocation Type) | | | | 0 | 0 | 0 | 0 |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpRS | BtFC | BtFL/BtFR |
| PB4 | ACAT(Audio channel Allocation Type) | | | | 0 | 0 | 0 | 0 |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpRS | BtFC | BtFL/BtFR |
| PB4 | ACAT(Audio channel Allocation Type) | | | | 0 | 0 | 0 | 0 |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpRS | BtFC | BtFL/BtFR |
| PB4 | ACAT(Audio channel Allocation Type) | | | | 0 | 0 | 0 | 0 |

EDID/CEC for New Speaker Position

In the exemplary embodiments, a speaker position data block for transmitting new speaker position information to the source may be defined. The data block comprises an arranged coordinate value and placement angle value of every speaker that is connected to the sink. The source may be used in various processing such as down mixing or object audio coding through this information. Since the value of extended tag code of the table below is one exemplary embodiment, the speaker position data block may be used by being defined with several data blocks that are defined above.

TABLE 63

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6 ... 15 | Reserved for video = relaesed blocks |
| 16 | CEA Miscellaneous Audio Fields |
| 17 | Vendor -Specific Audio Data Block |
| 18 | Reserved for HDMI Audio Data Block |
| 19 | Reserved for audio-related blocks |
| 20 | Speaker Position Data Block 1 |
| 21 | Speaker Position Data Block 2 |
| 22 | Speaker Position Data Block 3 |
| 23 | Speaker Position Data Block 4 |
| ... | ... |
| 31 | Reserved for audio-related blocks |
| 32 ... 255 | Reserved for general |

The speaker position data block may be defined by the following table. Byte [1]~[5] store position information of one speaker. Byte [6]~[30] store speaker position information in accordance with the same method. Byte 31 and 32 are defined as a reserved area.

When using the method of the example, a rounded up (N/6) speaker position data block may be needed to correspond with N channel since one data block may transmit a maximum of six speakers.

TABLE 64

Speaker Position Data Block

| Byte#/bit | 7 | 6 | 5 | 4 | 3 | 2 | 1 | 0 |
|---|---|---|---|---|---|---|---|---|
| 1 | height | | Speaker_id | | | | | Ang.8 |
| 2 | Ang.7 | Ang.6 | Ang.5 | Ang.4 | Ang.3 | Ang.2 | Ang.1 | Ang.0 |
| 3 | Offset_x | | | | | | | |
| 4 | Offset_y | | | | | | | |
| 5 | Offset_z | | | | | | | |
| 6~10 | 2nd speaker position data | | | | | | | |
| 11~15 | 3th speaker position data | | | | | | | |
| 16~20 | 4th speaker position data | | | | | | | |
| 21~25 | 5th speaker position data | | | | | | | |
| 26~30 | 6th speaker position data | | | | | | | |
| 31~32 | reserved | | | | | | | |

TABLE 64-1

Speaker_id field

| Speaker_id | Description |
|---|---|
| 00000 | FL |
| 00001 | FR |
| 00010-11111 | ... |

Transmission of Speaker Position Information Using CEC

FIG. 12 is a schematic diagram showing the transmission of speaker position information using the CEC.

As illustrated in FIG. 12, when the source requests the speaker position of from the sink, the sink may tell the information about the speaker position.

Transmitting Speaker Position Information using CEC

3-1. EDID for 3D Audio

A new data block for multi-stream audio may be defined in extended tag code. The multi-stream audio data block comprises a Max_stream_count-1 field, and a CEA Short Audio Descriptor area. Max_stream_count-1 indicates the number of streams to be transmitted. There are more than one CEA Short Audio Descriptor, and they may be defined in accordance with CEA861-D.

TABLE 65

Multi Stream Audio Data Block

| Byte#/bit | 7 | 6 | 5 | 4 | 3 | 2 | 1 | 0 |
|---|---|---|---|---|---|---|---|---|
| 1 | Reserved | | | | Max_stream_count-1 | | | |
| 2 | CEA Short Audio Descriptor 1 | | | | | | | |
| 3 | | | | | | | | |
| 4 | | | | | | | | |
| ... | ... | | | | | | | |
| N | CEA Short Audio Descriptor X | | | | | | | |

TABLE 65-1

CEA Data Block Tag Codes

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |

TABLE 65-1-continued

CEA Data Block Tag Codes

| Extended Tag Codes | Type of Data Block |
|---|---|
| 5 | Colonmetry Data Block |
| 6 ... 15 | Reserved for video = relaesed blocks |
| 16 | CEA Mrscellaneous Audio Fields |
| 17 | Vendor-Specific Audio Data Block |
| 18 | Reserved for HDMI Audio Data Block |
| 19 ... | Reserved for audio-related blocks |
| XX | Multiple Audio Stream Data Block |
| ... 31 | Reserved for audio-related blocks |
| 32 ... 255 | Reserved for general |

Meanwhile, the Vendor-specific Data Block may be displayed whether multi-stream video/audio is provided or not. The Vendor-specific Data Block uses a multistream_in indicator field. When the sink supports multi-stream, multistream_indicator=1. However, multistream_indicator field may be defined in other areas of the data block as well as HDMI VSDB.

TABLE 66

Vendor-specific Data Block

| Byte# | 7 | 6 | 5 | 4 | 3 | 2 | 1 | 0 |
|---|---|---|---|---|---|---|---|---|
| 0 | Vendor-specific tag code(=3) | | | Length(=N) | | | | |
| 1 | 24-bit IEEE Registration (0x000c03) | | | | | | | |
| 2 | | | | | | | | |
| 3 | | | | | | | | |
| 4 | A | | | | B | | | |
| 5 | C | | | | D | | | |
| 6 | Suppors_AI | DC_40bit | DC_30bit | DC_30bit | DC_Y444 | Rsvd(0) | RSCD(0) | DVI_Dual |
| 7 | Max_TMDS_Clock | | | | | | | |
| 8 | Latency_Fields Present | I_Latency_Fields_Present | HDMI_Video_Presen | Rsvd(0) | CNC3 | CNC2 | CNC1 | CNC0 |
| (9) | Video_Latency | | | | | | | |
| (10) | Audio_Latency | | | | | | | |
| (11) | Interacted_Video_Latency | | | | | | | |
| (12) | Interacted_Audio_Latency | | | | | | | |
| (13) | 3D_present | 3D_Multi_Present | | Image_size | | Rsvd(0) | Rsvd(0) | Multistream_indicator |
| (14) | HDMI_VIC_LEN | | | | HDMI_3D_LEN | | | |
| (15) | (if HDMI_VIC_LEN > 0) | | | | | | | |
| | HDMI_VIC_1 | | | | | | | |
| ... | ... | | | | | | | |
| | HDMI_VIC_M | | | | | | | |
| | (if 3D_Multi_present 01 or 10) | | | | | | | |
| | 3D_Structure_ALL_15 ... 8 | | | | | | | |
| | 3D_Structure_ALL_7 ... 0 | | | | | | | |
| | (if 3D_Multi_present 10) | | | | | | | |
| | 3D_MASK_7 ... 0 | | | | | | | |
| | 3D_MASK_7 ... 0 | | | | | | | |
| | 3D_VIC_1 | | | | | | | 3D_Structure_1 |

Various multi-streams may be identified by defining the multistream_indicator using extra bits.

TABLE 67

Vendor-specific Data Block

| Byte# | 7 | 6 | 5 | 4 | 3 | 2 | 1 | 0 |
|---|---|---|---|---|---|---|---|---|
| 0 | Vendor-specific tag code(=3) | | | | Length(=N) | | | |
| 1 | 24-bit IEEE Registration (0x000c03) | | | | | | | |
| 2 | | | | | | | | |
| 3 | | | | | | | | |
| 4 | A | | | | B | | | |
| 5 | C | | | | D | | | |
| 6 | Supports_AI | DC_40bit | DC_30bit | DC_30bit | DC_Y444 | Rsvd(0) | RSCD(0) | DVI_Dual |
| 7 | Max_TMDS_Clock | | | | | | | |
| 8 | Latency_Fields Present | I_Latency_Fields_Present | HDMI_Video_Presen | Rsvd(0) | CNC3 | CNC2 | CNC1 | CNC0 |
| (9) | Video_Latency | | | | | | | |
| (10) | Audio_Latency | | | | | | | |
| (11) | Interacted_Video_Latency | | | | | | | |
| (12) | Interacted_Audio_Latency | | | | | | | |
| (13) | 3D_present | | 3D_Multi_Present | | Image_size | | Multistream mode | |
| (14) | HDMI_VIC_LEN | | | | HDMI_3D_LEN | | | |
| (15) | (if HDMI_VIC_LEN > 0) | | | | | | | |
| | HDMI_VIC_1 | | | | | | | |
| ... | ... | | | | | | | |
| | HDMI_VIC_M | | | | | | | |
| | (if 3D_Multi_present 01 or 10) | | | | | | | |
| | 3D_Structure_ALL_15...8 | | | | | | | |
| | 3D_Structure_ALL_7...0 | | | | | | | |
| | (if 3D_Multi_present 10) | | | | | | | |
| | 3D_MASK_7...0 | | | | | | | |
| | 3D_MASK_7...0 | | | | | | | |
| | 3D_VIC_1 | | | | 3D_Structure_1 | | | |

Second Exemplary Embodiment

The first exemplary embodiment newly defines multi-audio stream data block using extended tag code. The newly defined multi-audio stream data block comprises CEA short audio descriptor area, the length of audio stream, and Max_stream_count field. Since each field is the same as other exemplary embodiments described above, overlapping description thereof is omitted.

TABLE 68

Multi Audio Stream Data Block

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6...15 | Reserved for video = relaesed blocks |
| 16 | CEA Mrscellaneous Audio Fields |
| 17 | Vendor-Specific Audio Data Block |
| 18 | Reserved for HDMI Audio Data Block |
| 19 | Extended Audio Data Block (includes one or more Extended Short Audio Descriptors) |
| 20 | Extended Speaker Allocation Data Block |
| 21 | Multiple Audio Stream Data Block |
| 22...31 | Reserved for audio-related blocks |
| 32...255 | Reserved for general |

TABLE 68-1

Multiple Audio Stream Data Block

| Byte#/bit | 7 | 6 | 5 | 4 | 3 | 2 | 1 | 0 |
|---|---|---|---|---|---|---|---|---|
| PB1 | Tag Code = 7 (USE Extended Tag) | | | Length = total number of extension audio bytes following this byte | | | | |
| PB2 | Extended data Block Tag Code = 13 h | | | | | | | |
| PB3 | 0 | 0 | 0 | 0 | 0 | 0 | Max_Stream_count-1 | |
| PB4 | CEA Short Audio Descriptor 1 | | | | | | | |
| PB5 | | | | | | | | |
| PB6 | | | | | | | | |
| ... | | | | | | | | |
| PB N-2 | CEA Short Audio Descriptor 1 X | | | | | | | |
| PB N-1 | | | | | | | | |
| PB N | | | | | | | | |

Third Exemplary Embodiment

Meanwhile, another method using an HDMI audio data block may be considered similar to the first exemplary embodiment.

Extended tag code is newly defined. As in the first exemplary embodiment, tag code 18 may be used to add extended HDMI audio data block.

The table below shows the structure of an extended HDMI audio data block. Extended HDMI audio data block in accordance with the third exemplary embodiment comprises Extended CEA Short Audio Descriptor (ECSAD), Extended Speaker Allocation Descriptor (ESAD), and Multiple Audio Stream Descriptor (MASD).

Extended CEA short audio descriptor (ECSAD) comprises descriptors as much as the value of Num_ECSAD field when the sink supports a 3D audio function. Extended speaker allocation descriptor (ESAD) comprises one descriptor when the value of Num_ECSAD field is more than 0, when the sink supports 3D-audio-channel function. Multi-audio stream descriptor (MASD) includes a descriptor as much as the value of the Num_MASD field when the sink supports multi-stream audio function.

The Max Stream_Count −1 field is defined as the number of maximum stream, which the sink may receive, −1. Audio stream for each view shows the same audio feature of having the same coding type and sampling frequency since the audio stream transmits multi-stream audio with one audio sample packet.

The Num_MASD field defines the number of extended short audio descriptor. Num_MASD field may comprise up to seven extended short audio descriptors. When Num_MASD field is 0, it means that this field does not support the 3D audio function.

The Num_ECSAD field defines the number of multi-stream audio descriptors that are included in this data block. The Num_ECSAD field may include up to a maximum of four multi-stream audio descriptors. If this field is 0, it means that the field does not support multi-stream audio, and if Max Stream_Count−1 is not 0, at least more than one MASD may certainly be defined. If ECSAD includes of method that is defined as 4 bytes, up to a maximum of 6 MASDs may be defined.

TABLE 69-1

| Stream Count-1 field | |
|---|---|
| MaxStream Count-1 | Description |
| 00 | Do not support multiple audio stream |
| 01 | 2 audio streams |
| 10 | 3 audio streams |
| 11 | 4 audio streams |

The third exemplary embodiment may consider alternatives that are transformed as follows.

For example, the method of including only ECSAD in extended HDMI audio data block, and of defining ESAD and MASD using other extended tag codes may be considered.

In this case, two descriptors that are defined as another extended tag code may be defined as one separate data block or as different data block. Max Stream_count−1 in field that is defined in PB3 is included in a data block in which the multi-stream audio descriptor is defined in the table described above.

Unlike the above, ECSAD and ESAD that are related to 3D audio are included in extended HDMI audio data block, and MASD may be defined by using another extended tag code.

The structure of ECSAD is described by referring to the table below. The structure corresponds to the shaded part of the table.

As shown in the table at the bottom left, this descriptor may currently select only two coding types of LPCM and DSD. However, other uncompressed audio formats may be included by using a reserved area of the UAFC field.

The number of channels may be selected up to a maximum of 32 since 5 bits are allocated.

Table 70—Extended CEA Short Audio Descriptor

TABLE 69

| Extended HDMI Audio Data Block | | | | | | | | |
|---|---|---|---|---|---|---|---|---|
| Byte#/bit | 7 | 6 | 5 | 4 | 3 | 2 | 1 | 0 |
| PB1 | Tag Code = 7 (USE Extended Tag) | | | Length = total number of extension audio bytes following this byte | | | | |
| PB2 | Extended data Block Tag Code = 13 h | | | | | | | |
| PB3 | Max Stream Count-1 | | Num MASD | | | Num ECSAD | | |
| PB4~PB6 | (if Num_ECSAD(X)>0) Extended CEA Short Descriptor 1 | | | | | | | |
| ... | | | | | | | | |
| PB(N − 3)~PB(N − 1) | (if Num_ECSAD(X)>0) Extended CEA Short Descriptor X | | | | | | | |
| PB(N)~PB(N + 3) | (if Num_ECSAD(X)>0) Extended Speaker Allocation Descriptor | | | | | | | |
| PB(N + 4)~PB(N + 6) | (if Max Stream_Count-1>0 and Num MASD(Y)>0) Multiple Audio Stream Descriptor 1 | | | | | | | |
| ... | | | | | | | | |
| PB(L − 1)~PB(L + 1) | (if Max Stream_Count-1>0 and Num MASD(Y)>0) Multiple Audio Stream Descriptor Y | | | | | | | |

X: The number of ECSAD
Y: the number of MASD

TABLE 70-1

Extended HDMI Audio Data Block Structure

| Byte#/bit | 7 | 6 | 5 | 4 | 3 | 2 | 1 | 0 |
|---|---|---|---|---|---|---|---|---|
| PB1 | Tag Code=7 (USE Extended Tag) | | | Length = total number of extension audio bytes following this byte | | | | |
| PB2 | Extended data Block Tag Code =13h | | | | | | | |
| PB3 | Max Stream Count-1 | | | Num MASD | | | Num ECSAD | |
| PB4~PB6 | (if Num_ECSAD(X)>0) | | | | | | | |
| | Extended CEA Short Descriptor 1 | | | | | | | |
| ... | | | | | | | | |
| PB(N−3)~ PB(N−1) | (if Num ECSAD(X)>0) | | | | | | | |
| | Extended CEA Short Descriptor X | | | | | | | |
| PB(N)~ PB(N+3) | (if Num_ECSAD(X)>0) | | | | | | | |
| | Extended Speaker Allocation Descriptor | | | | | | | |
| PB(N+4)~ PB(N+6) | (if Max Stream_Count-1>0 and Num MASD(Y)>0) | | | | | | | |
| | Multiple Audio Stream Descriptor 1 | | | | | | | |
| ... | | | | | | | | |
| PB (L−1)~ PB(L+1) | (if Max Stream_Count-1>0 and Num MASD(Y)>0) | | | | | | | |
| | Multiple Audio Stream Descriptor Y | | | | | | | |

TABLE 70-2

Uncompressed Audio Format Code field

| UAFC (Uncompressed Audio Format Code) | Description |
|---|---|
| 00 | LPCM |
| 01 | DSD |
| 10 | Reserved |
| 11 | |

TABLE 70-3

Extended CEA Short Audio Descriptor

| Byte/Bit# | 7 | 6 | 5 | 4 | 3 | 2 | 1 | 0 |
|---|---|---|---|---|---|---|---|---|
| PB1 | 0 | UAFC | | | Max Number of channels-1 | | | |
| PB2 | 0 | 192 kHz | 176.4 kHz | 96 kHz | 88.2 kHz | 48 kHz | 44.1 kHz | 32 kHZ |
| PB3 | 0 | 0 | 0 | 0 | 0 | 24bit | 20bit | 16bit | to the table that is defined in CEA861-E. Therefore, all compression/non-compression coding types that are defined in CEA861-E may be designated.

Since the size of the descriptor is increasing, the number of extended CEA short audio descriptors (ECSAD) that may be included within the data block is limited to a maximum of six descriptors. Meanwhile, up to four descriptors may be included in the exemplary embodiment described above.

However, the following alternative on the method above may be considered.

The table below has extended the total size of the descriptor into 4 Bytes. In addition, the audio format code was referred In response to changes in each audio format code type, syntax of PB3 and PB4 are defined in the same manner as the Byte 2 and 3 of Table 45~49 of CEA861-E.

Table 71—Extended CEA Short Audio Descriptor

TABLE 71-1

Extended HDMI Audio Data Block Structure

| Byte #/bit | 7 | 6 | 5 | 4 | 3 | 2 | 1 | 0 |
|---|---|---|---|---|---|---|---|---|
| PB1 | Tag Code = 7 (USE Extended Tag) | | | Length = total number of extension audio bytes following this byte | | | | |
| PB2 | Extended data Block Tag Code = 13 h | | | | | | | |
| PB3 | Max Stream Count-1 | | | Num MASD | | | Num ECSAD | |
| PB4~PB6 | (if Num ECSAD(X)>0) | | | | | | | |
| | Extended CEA Short Descriptor 1 | | | | | | | |
| ... | | | | | | | | |
| PB(N-3)~ PB(N-1) | (if Num ECSAD(X)>0) | | | | | | | |
| | Extended CEA Short Descriptor X | | | | | | | |
| PB(N)~ PB(N+3) | (if Num_ECSAD(X)>0) | | | | | | | |
| | Extended Speaker Allocation Descriptor | | | | | | | |
| PB(N+4)~ PB(N+6) | (if Max Stream_Count-1>0 and Num MASD(Y)>0) | | | | | | | |
| | Multiple Audio Stream Descriptor 1 | | | | | | | |
| ... | | | | | | | | |
| PB(L-1)~ PB(L+1) | (if Max Stream_Count-1>0 and Num MASD(Y)>0) | | | | | | | |
| | Multiple Audio Stream Descriptor Y | | | | | | | |

TABLE 71-2

Extended CEA Short Audio Descriptor

| Byte/Bit# | 7 | 6 | 5 | 4 | 3 | 2 | 1 | 0 |
|---|---|---|---|---|---|---|---|---|
| PB1 | 0 | 0 | 0 | Max Number of channels-1 | | | | |
| PB2 | 0 | 0 | 0 | 0 | Audio Format Code | | | |
| PB3 | 0 | 192 kHz | 176.4 kHz | 96 kHz | 88.2 kHz | 48 kHz | 44.1 kHz | 32 kHZ |
| PB4 | 0 | 0 | 0 | 0 | 0 | 24bit | 20bit | 16bit |

The structure of ESAD is described in the third exemplary embodiment.

The structure corresponds to the shaded area in the table below.

ESAD may currently select speaker allocation information of up to a maximum of 30.2 channels. However, other speaker placement formats may be included by using the reserved area of the ACAT field.

Table 72—Extended Speaker Allocation Descriptor

TABLE 72-1

Extended HDMI Audio Block Structure

| Byte#/bit | 7 | 6 | 5 | 4 | 3 | 2 | 1 | 0 |
|---|---|---|---|---|---|---|---|---|
| PB1 | Tag Code=7 (USE Extended Tag) | | | Length = total number of extension audio bytes following this byte | | | | |
| PB2 | Extended data Block Tag Code =13h | | | | | | | |
| PB3 | Max Stream Count-1 | | | Num MASD | | | Num ECSAD | |
| PB4~PB6 | (if Num_ECSAD(X)>0) Extended CEA Short Descriptor 1 | | | | | | | |
| ... | | | | | | | | |
| PB(N−3)~ PB (N−1) | (if Num_ECSAD(X)>0) Extended CEA Short Descriptor X | | | | | | | |
| PB(N)~ PB(N+3) | (if Num_ECSAD(X)>0) Extended Speaker Allocation Descriptor | | | | | | | |
| PB(N+4)~ PB(N+6) | (if Max Stream_Count-1>0 and Num MASD(Y)>0) Multiple Audio Stream Descriptor 1 | | | | | | | |
| ... | | | | | | | | |
| PB(L−1)~ PB(L+1) | (if Max Stream_Count-1>0 and Num MASD(Y)>0) Multiple Audio Stream Descriptor Y | | | | | | | |

TABLE 72-2

Audio Channel Allocation Type filed

| ACAT3 | ACAT2 | ACAT1 | ACAT0 | Description |
|---|---|---|---|---|
| 0 | 0 | 0 | 0 | Refer to CEA861-D (or E,F) |
| 0 | 0 | 0 | 1 | Refer to 10.2 channels (TTA Standard) |
| 0 | 0 | 1 | 0 | Refer to 22.2 channels (SMPTE2036-2) |
| 0 | 0 | 1 | 1 | Refer to 30.2 channels (IEC62574/Ed 1) |
| 0 | 1 | 0 | 0 | Reserved |
| ... | | | | |
| 1 | 1 | 1 | 1 | |

TABLE 72-3

Extended Speaker Allocation Descriptor

| Byte#/bit | 7 | 6 | 5 | 4 | 3 | 2 | 1 | 0 |
|---|---|---|---|---|---|---|---|---|
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFL2 | SIL/SIR | FCH | TC | FLH/FRH |
| PB3 | 0 | 0 | 0 | LSd/LRd | LS/RS | TpLS/TpR | BtFC | BtFL/BtFR |
| PB4 | ACAT(Audio Channel Allocation Type) | | | | 0 | 0 | 0 | 0 |

The following table is ESAD. The shaded part of each table is used in speaker allocation of channel allocation type.

TABLE 73

| Byte#/bit | 7 | 6 | 5 | 4 | 3 | 2 | 1 | 0 |
|---|---|---|---|---|---|---|---|---|
| | | | | Extended Speaker Allocation Descriptors | | | | |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpR | BtFC | BtFL/BtFR |
| PB4 | | ACAT(Audio Channel Allocation Type) | | | 0 | 0 | 0 | 0 |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpR | BtFC | BtFL/BtFR |
| PB4 | | ACAT(Audio Channel Allocation Type) | | | 0 | 0 | 0 | 0 |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpR | BtFC | BtFL/BtFR |
| PB4 | | ACAT(Audio Channel Allocation Type) | | | 0 | 0 | 0 | 0 |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpR | BtFC | BtFL/BtFR |
| PB4 | | ACAT(Audio Channel Allocation Type) | | | 0 | 0 | 0 | 0 |

The following describes the structure of ESAD of the third exemplary embodiment. The structure corresponds to the shaded area of the table.

CEA short audio descriptor that is defined in CEA861-E is still used. However, new format that has partially modified/changed the placement or the size of existing field may be defined by including each field that is included in the CEA short audio descriptor. This descriptor is included only in transmitting multi-stream audio, and at least one descriptor may be included when it is being used.

Table 74—Multiple Auto Stream Descriptor

TABLE 74-1

| Byte#/bit | 7 | 6 | 5 | 4 | 3 | 2 | 1 | 0 |
|---|---|---|---|---|---|---|---|---|
| | | | | Extended HDMI Audio Data Block Structure | | | | |
| PB1 | Tag Code=7 (USE Extended Tag) | | | | Length = total number of extension audio bytes following this byte | | | |
| PB2 | Extended data Block Tag Code =13h | | | | | | | |
| PB3 | Max Stream Count-1 | | | Num MASD | | | Num ECSAD | |
| PB4~PB7 | (if Num_ECSAD(X)>0) Extended CEA Short Descriptor 1 | | | | | | | |
| ... | | | | | | | | |
| PB(N-4)~PB(N-1) | (if Num_ECSAD(X)>0) Extended CEA Short Descriptor X | | | | | | | |
| PB(N)~PB(N+3) | (if Num_ECSAD(X)>0) Extended Speaker Allocation Descriptor | | | | | | | |
| PB(N+4)~PB(N+6) | (if Max Stream_Count-1>0 and Num MASD(Y)>0) Multiple Audio Stream Descriptor 1 | | | | | | | |
| ... | | | | | | | | |
| PB(L-1)~PB(L+1) | (if Max Stream_Count-1>0 and Num MASD(Y)>0) Multiple Audio Stream Descriptor Y | | | | | | | |

TABLE 74-2

| Byte#/bit | 7 | 6 | 5 | 4 | 3 | 2 | 1 | 0 |
|---|---|---|---|---|---|---|---|---|
| | | | | Multiple Audio Stream Descriptor | | | | |
| PB1 PB2 PB3 | CEA Short Audio Descriptor for each Audio Format Code | | | | | | | |

The table below is a table that has newly defined the structure of the multi-stream audio descriptor. Instead of using CEA short audio descriptor as it is, a new descriptor is used here.

The number of channels of multi-stream audio is limited to two. Therefore, an unnecessary channel count field is removed from the descriptor and instead Max Number of Stream −1 is defined as 2-bit. At this time, Max_Stream_Count−1 that is defined in the extended HDMI audio data block is defined as a maximum value among Max_Stream_Count −1 of each descriptor.

Each table shows the descriptors for each audio format code.

Table 75—Multiple Audio Stream Descriptor

TABLE 75-1

Multiple Audio Stream Descriptor for Audio Format Code 1 (LPCM)

| Byte/Bit# | 7 | 6 | 5 | 4 | 3 | 2 | 1 | 0 |
|---|---|---|---|---|---|---|---|---|
| PB1 | 0 | Audio Format Code = 0001 | | | | 0 | Max Stream_Count-1 | |
| PB2 | 0 | 192 kHz | 176.4 kHz | 96 kHz | 88.2 kHz | 48 kHz | 44.1 kHz | 32 kHZ |
| PB3 | 0 | 0 | 0 | 0 | 0 | 24bit | 20bit | 16bit |

TABLE 75-2

Multiple Audio Stream Descriptor for Audio Format Code 2 to 8

| Byte/Bit# | 7 | 6 | 5 | 4 | 3 | 2 | 1 | 0 |
|---|---|---|---|---|---|---|---|---|
| PB1 | 0 | Audio Format Code | | | | 0 | Max Stream_Count-1 | |
| PB2 | 0 | 192 kHz | 176.4 kHz | 96 kHz | 88.2 kHz | 48 kHz | 44.1 kHz | 32 kHZ |
| PB3 | Maximum bit rate divided by 8 kHz | | | | | | | |

TABLE 75-3

Multiple Audio Stream Descriptor for Audio Format Code 9 to 13

| Byte/Bit# | 7 | 6 | 5 | 4 | 3 | 2 | 1 | 0 |
|---|---|---|---|---|---|---|---|---|
| PB1 | 0 | Audio Format Code | | | | 0 | Max Stream_Count-1 | |
| PB2 | 0 | 192 kHz | 176.4 kHz | 96 kHz | 88.2 kHz | 48 kHz | 44.1 kHz | 32 kHZ |
| PB3 | Audio Format Code dependent value | | | | | | | |

TABLE 75-4

Multiple Audio Stream Descriptor for Audio Format Code 14 (WMA Pro)

| Byte/Bit# | 7 | 6 | 5 | 4 | 3 | 2 | 1 | 0 |
|---|---|---|---|---|---|---|---|---|
| PB1 | 0 | Audio Format Code = 1110 | | | | 0 | Max Stream_Count-1 | |
| PB2 | 0 | 192 kHz | 176.4 kHz | 96 kHz | 88.2 kHz | 48 kHz | 44.1 kHz | 32 kHZ |
| PB3 | Reserved | | | | | Profile | | |

TABLE 75-5

Multiple Audio Stream Descriptor for Audio Format Code 15 (extension)

| Byte/Bit# | 7 | 6 | 5 | 4 | 3 | 2 | 1 | 0 |
|---|---|---|---|---|---|---|---|---|
| PB1 | 0 | Audio Format Code = 1111 | | | | 0 | Max Stream_Count-1 | |
| PB2 | 0 | 192 kHz | 176.4 kHz | 96 kHz | 88.2 kHz | 48 kHz | 44.1 kHz | 32 kHZ |
| PB3 | Audio Format Code Extension | | | | | 24 bit | 20 bit | 16 bit |

4-1. Application Scenario for 3D Audio and Multi-stream Audio

In the following, application scenarios for 3D audio and multi-stream audio in accordance with the first exemplary embodiment are provided. These examples demonstrate the ability of a sink apparatus for transmission of HDMI 2.0 source, 3D audio and multi-stream audio.

Scenario for 3D Audio

Figure 13:
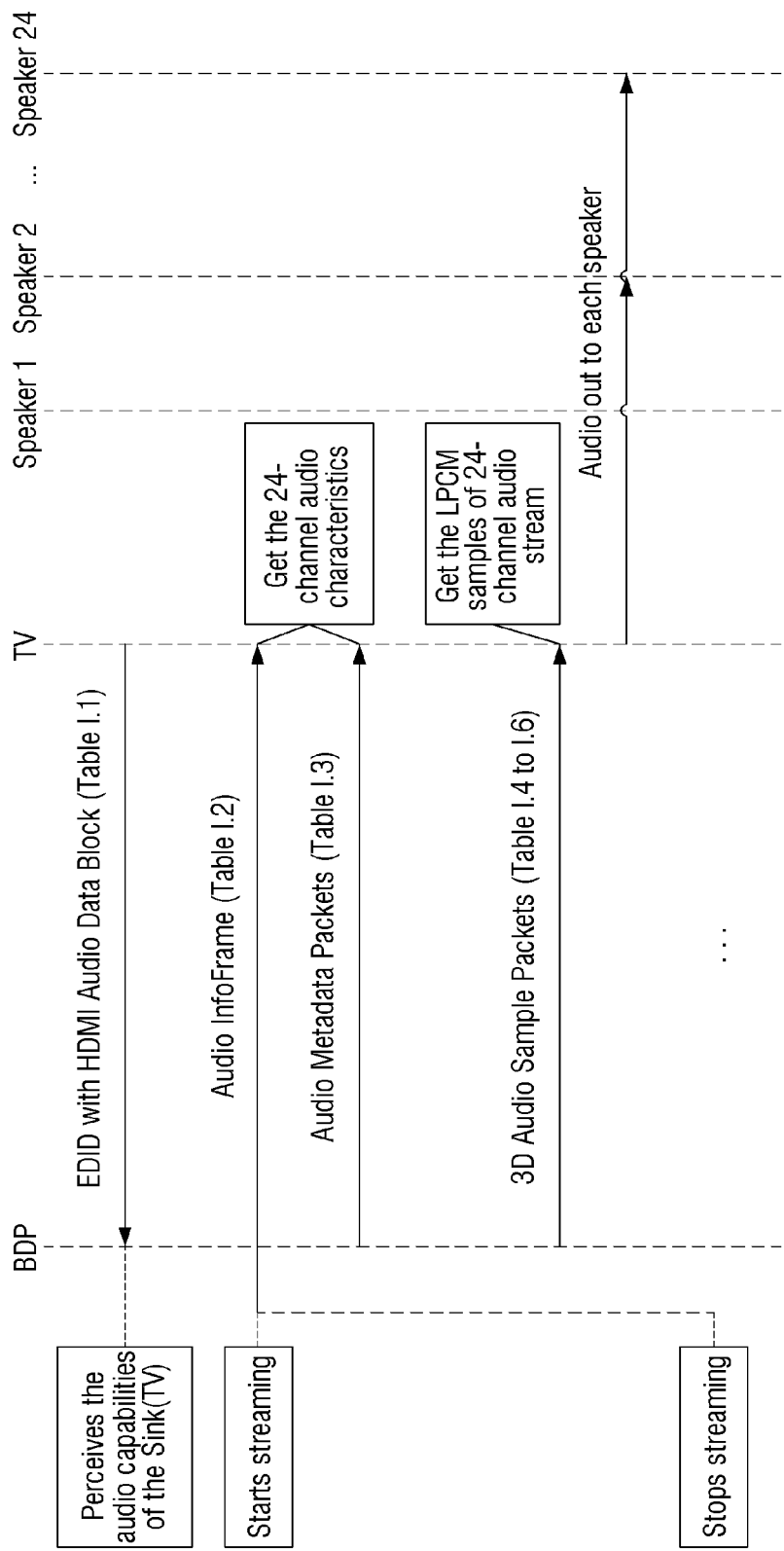
FIG. 13 is a view illustrating a step in which a 3D audio sample is transmitted from a Blu-ray disk player (BDP) to a television (TV).

FIG. 13 is a view showing how 3D audio samples may be transmitted from a Blu-ray disk (BDP) to a television (TV). This example proposes as follows.

Source (ex. BDP) and sink (ex. TV) are all high-speed wired interface apparatuses.

The source transmits L-PCM 48 kHz 22.2 channels audio stream with the sink.

The sink may receive L-PCM 48 kHz 22.2 channels audio samples, and may transmit each individual audio stream to the related speaker. The transmitted video packet is 1080 p/60 Hz.

The TV comprises compliant CEA-861-F (D or E) E-EDID data structure which may be accessed through DDC. E-EDID comprise HDMI audio data block by adding it into other required data block to support 3D audio transmission. The BDP receives HDMI audio data block and recognizes 3D audio ability of TV described in Table 76.

Bytes 1, 2, and 3 show the header of the HDMI audio data block. NUM_HDMI_3D_AD indicates that it supports 3D audio transmission by being set to 1. NUM_CEA_SAD, and Max_Stream_Count−1 are set to 0 because BDP does not handle multi-stream audio on the scenario.

Bytes 4, 5, 6, and 7 include HDMI 3D audio descriptors that describe the features of the 3D audio of TV. Audio format code, Maximum number of channels −1, sampling frequency, and sample size are defined.

Bytes 8, 9, 10, and 11 include the HDMI 3D speaker allocation descriptor that describes the active speaker for 22.2. channels (SM PTE 2036-2).

The BDP transmits audio infoframe and audio metadata packets after receiving EDID from the TV. In this case, the channel count and channel/speaker allocation information are transmitted by using an audio metadata packet instead of using audio infoframe.

3D_CC and 3D_CA that are included in the audio metadata packet each describe channel count and channel/speaker allocation information for 22.2 channels audio stream. Table 77 shows an example of an audio infoframe payload for 22.2 channels audio transmission. Table 78 also shows the payload of audio metadata packet for 22.2 channels audio transmission.

TABLE 76

Example of the HDMI Audio Data Block for 22.2 Channels

| Byte/bit # | 7 | 6 | 5 | 4 | 3 | 2 | 1 | 0 |
|---|---|---|---|---|---|---|---|---|
| 1 | Tag Code = 7 (Use Extended Tag) | | | | L = 10(1010b) | | | |
| 2 | Extended Tag Code = 18(0x12) | | | | | | | |
| 3 | NUM_HDMI_3D_AD = 001b | | | NUM_CEA_SAD = 000b | | | Max_Stream_Count1 = oob | |
| 4 | 0 | 0 | 0 | 0 | Audio Format Code = 1 | | | |
| 5 | 0 | 0 | 0 | Max Number of channels − 1 = 23 (10111b) | | | | |
| 6 | 0 | 192 kHZ (0) | 176.4 kHz (0) | 96 kHz (1) | 88 2 kHz (1) | 48 kHz (1) | 44 1 kHz (1) | 32 kHz (1) |
| 7 | 0 | 0 | 0 | 0 | 0 | 24 bit | 20 bit | 16 bit |
| 8 | FLW/FRW (0) | BLC/BRC (0) | FLC/FRC (1) | BC (1) | BL/BR (1) | FC (1) | LFE1 (1) | FL/FR (1) |
| 9 | TpSIL/TpSIR (1) | SIL/SIR (1) | TpBC (1) | LFE2 (1) | LS/RS (0) | TpFC (1) | TpC (1) | TpFL/TpFR (1) |
| 10 | 0 | 0 | 0 | LSd/LRd (0) | TpLS/TpRS (0) | BtFL/BtFR (1) | BtFC (1) | TpBL/TpBR (1) |
| 11 | ACAT = 2(0010b) | | | | 0 | 0 | 0 | 0 |

TABLE 77

Example of the Audio InfoFrame Payload for 22.2 Channels

| Packet Byte# | 7 | 6 | 5 | 4 | 3 | 2 | 1 | 0 |
|---|---|---|---|---|---|---|---|---|
| PB0 | | | | Checksum | | | | |
| PB1 | CT3 (0) | CT2 (0) | CT1 (0) | CT0 (0) | Reserved (0) | CC2 (0) | CC1 (0) | CC0 (0) |
| PB2 | Reserved (0) | | | SF2 (0) | SF1 (0) | SF0 (0) | SS1 (0) | SS0 (0) |
| PB3 | | | Format depends on coding type (i.e CT0 ... CT3) | | | | | |
| PB4 | CA7 (0) | CA6 (0) | CA5 (0) | CA4 (0) | CA3 (0) | CA2 (0) | CA1 (0) | CA0 (0) |
| PB5 | DM_INH | LSV3 | LSV2 | LSV1 | LSV0 | Rscd(0) | LFEP BL1 | LFEP BL0 |
| PB6 | | | | Reserved (0) | | | | |
| PB7 | | | | Reserved (0) | | | | |
| PB8 | | | | Reserved (0) | | | | |
| PB9 | | | | Reserved (0) | | | | |
| PB10 | | | | Reserved (0) | | | | |
| PB11-PB27 | | | | Reserved (0) | | | | |

TABLE 78

Audio Metadata Packet payload

| Byte/Bit# | 7 | 6 | 5 | 4 | 3 | 2 | 1 | 0 |
|---|---|---|---|---|---|---|---|---|
| PB0 | Rsvd (0) | Rsvd (0) | Rsvd (0) | 3D_CC4 (1) | 3D_CC3 (0) | 3D_CC2 (1) | 3D_CC1 (1) | 3D_CC0 (1) |
| PB1 | Rsvd (0) | Rsvd (0) | Rsvd (0) | Rsvd (0) | ACAT = 0x02 | | | |
| PB2 | 3D_CA7 (0) | 3D_CA6 (0) | 3D_CA5 (0) | 3D_CA4 (0) | 3D_CA3 (0) | 3D_CA2 (1) | 3D_CA1 (0) | 3D_CA0 (0) |
| PB2...PB27 | | | | Reserved (0) | | | | |

The BDP transmits 22.2 channels of audio samples through a 3D audio sample packet. Each 3D audio sample packet supports up to 8 audio channels, therefore three consecutive 3D audio sample packets are needed to transmit 22.2 channels audio sample. Sample_start is used to specify the first 3D audio sample packet. As shown in Tables 79~81, three 3D audio sample packets may be defined in this exemplary embodiment.

TABLE 79

Example of First 3D Audio Sample Packet for 22.2 Channels

| Byte/bit# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | Sample_Start (1) | Sample_Present sp3 (1) | Sample_Present sp2 (1) | Sample_Present sp1 (1) | Sample_Present sp0 (1) |
| HB2 | B 3 | B 2 | B 1 | B 0 | Sample_flat sp3(0) | Sample_flat sp2(0) | Sample_flat sp1 (0) | Sample_flat sp0(0) |
| SB0~SB2 | | | | | Channel 1/Sample N | | | |
| SB3~SB5 | | | | | Channel 2/Sample N | | | |
| SB6 | | | PCUV of Ch 2 | | | | PCUV of Ch 1 | |
| SB7~SB9 | | | | | Channel 3/Sample N | | | |
| SB10~SB12 | | | | | Channel 4/Sample N | | | |
| SB13 | | | PCUV of Ch 4 | | | | PCUV of Ch 3 | |
| SB14~SB16 | | | | | Channel 5/Sample N | | | |
| SB17~SB19 | | | | | Channel 6/Sample N | | | |
| SB20 | | | PCUV of Ch 6 | | | | PCUV of Ch 5 | |
| SB21~SB23 | | | | | Channel 7/Sample N | | | |
| SB24~SB26 | | | | | Channel 8/Sample N | | | |
| SB27 | | | PCUV of Ch 8 | | | | PCUV of Ch 7 | |

TABLE 80

Example of Second 3D Audio Sample Packet for 22.2 Channels

| Byte/bit# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | Sample_Start (0) | Sample_Present sp3 (1) | Sample_Present sp2 (1) | Sample_Present sp1 (1) | Sample_Present sp0 (1) |
| HB2 | B 3 | B 2 | B 1 | B 0 | Sample_flat sp3(0) | Sample_flat sp2(0) | Sample_flat sp1 (0) | Sample_flat sp0(0) |
| SB0~SB2 | | | | | Channel 9/Sample N | | | |
| SB3~SB5 | | | | | Channel 10/Sample N | | | |
| SB6 | | | PCUV of Ch 10 | | | | PCUV of Ch 9 | |
| SB7~SB9 | | | | | Channel 11/Sample N | | | |
| SB10~SB12 | | | | | Channel 12/Sample N | | | |
| SB13 | | | PCUV of Ch 12 | | | | PCUV of Ch 11 | |
| SB14~SB16 | | | | | Channel 13/Sample N | | | |
| SB17~SB19 | | | | | Channel 14/Sample N | | | |
| SB20 | | | PCUV of Ch 14 | | | | PCUV of Ch 13 | |
| SB21~SB23 | | | | | Channel 15/Sample N | | | |
| SB24~SB26 | | | | | Channel 16/Sample N | | | |
| SB27 | | | PCUV of Ch 16 | | | | PCUV of Ch 15 | |

TABLE 81

Example of Third 3D Audio Sample Packet for 22.2 Channels

| Byte/bit# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | Sample_Start (0) | Sample_Present sp3 (1) | Sample_Present sp2 (1) | Sample_Present sp1 (1) | Sample_Present sp0 (1) |
| HB2 | B 3 | B 2 | B 1 | B 0 | Sample_flat sp3(0) | Sample_flat sp2(0) | Sample_flat sp1 (0) | Sample_flat sp0(0) |
| SB0~SB2 | | | | | Channel 17/Sample N | | | |
| SB3~SB5 | | | | | Channel 18/Sample N | | | |
| SB6 | | | PCUV of Ch 18 | | | | PCUV of Ch 17 | |
| SB7~SB9 | | | | | Channel 19/Sample N | | | |
| SB10~SB12 | | | | | Channel 20/Sample N | | | |
| SB13 | | | PCUV of Ch 20 | | | | PCUV of Ch 19 | |
| SB14~SB16 | | | | | Channel 21/Sample N | | | |
| SB17~SB19 | | | | | Channel 22/Sample N | | | |
| SB20 | | | PCUV of Ch 22 | | | | PCUV of Ch 21 | |
| SB21~SB23 | | | | | Channel 23/Sample N | | | |
| SB24~SB26 | | | | | Channel 24/Sample N | | | |
| SB27 | | | PCUV of Ch 24 | | | | PCUV of Ch 23 | |

4-2. Example of Scenario for Multi-stream Audio

Figure 14:
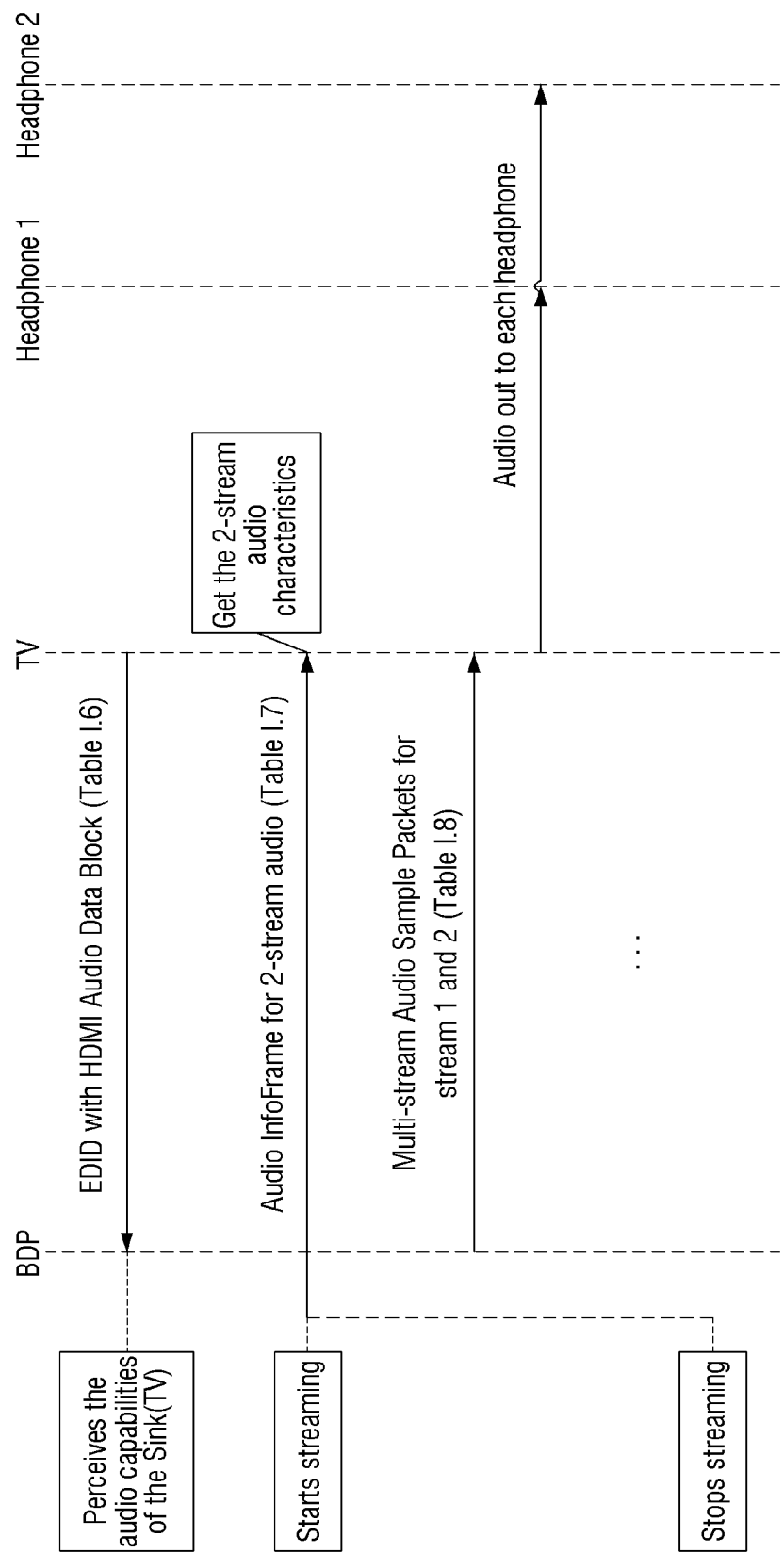
FIG. 14 is a view illustrating a step in which multi-streams audio is transmitted from a BDP to a TV.

FIG. 14 is a view showing how multi-stream audio is transmitted from the BDP to the TV. It proposes the example below.

Source (for example, the BDP) and sink (for example, the TV) are all high-speed wired interface apparatuses. The source/sink enter into dual-view game mode. The source transmits two audio streams of each view. The sink may transmit two audio streams to two different headphones. For example, a video format that is transmitted is HDMI 3D 1080 p/60 Hz.

The TV includes the E-EDID data structure conforms C EA-861-F (also E or D) which can be accessed via the DDC. In order to support multiple audio streams, in addition to other required data blocks, E-EDID is available to include a block of HDMI audio data. The BDP receives the HDMI audio data blocks, recognizes the ability of the TV audio multi-stream, such as described in table 76. The TV comprises CEA-861-F (also D or E) compliant E-EDID data structure) which may be accessed through the DDC. In order to support multi-stream audio, E-EDID may include a HDMI audio data block by adding it to another required data block. The BDP receives the HDMI audio data block and recognizes multi-stream audio ability of the TV that is the same as described in Table 76.

TABLE 82

Example of HDMI Audio Data Block for Two Audio Streams

| Byte/bit# | 7 | 6 | 5 | 4 | 3 | 2 | 1 | 0 |
|---|---|---|---|---|---|---|---|---|
| 1 | Tag Code = 7 (Use Extended Tag) | | | | | L = 8(1010b) | | |
| 2 | Extended Tag Code = 18(0x12) | | | | | | | |
| 3 | NUM_HDMI_3D_AD = 000b | | | NUM_CEA_SAD = 010b | | | Max_Stream_Count1 = 01b | |
| 4 | 0 | Audio Format Code = 0001b | | | | Max Number of channel 1 = 001b | | |
| 5 | 0 | 192 kHZ (1) | 176.4 kHz (1) | 96 kHz (1) | 88 2 kHz (1) | 48 kHz (1) | 44 1 kHz (1) | 32 kHz (1) |
| 6 | 0 | 0 | 0 | 0 | 0 | 24 bit | 20 bit | 16 bit |
| 7 | 0 | Audio Format Code = 0110b | | | | Max Number of channel 1 = 001b | | |
| 8 | 0 | 192 kHZ (1) | 176.4 kHz (1) | 96 kHz (1) | 88 2 kHz (1) | 48 kHz (1) | 44 1 kHz (1) | 32 kHz (1) |
| 9 | Maximum bit rate divided by 8 kHz | | | | | | | |

Bytes 1, 2, and 3 show the header of HDMI audio data block. NUM_CEA_SAD is set to 2, it is because the sink supports two types of audio format code for multi-stream audio. Max_Stream_Count−1 is set to 1, because sink may handle two independent audio streams described above. NUM_HDMI_3D_A is set to 0, because the BDP does not handle 3D audio transmission on the scenario.

Bytes 4, 5, and 6 include the first CEA short audio descriptors that describe audio features. In the case of multi-stream audio transmission, maximum channel count is limited to 2. For these reasons, Max Number of channels−1 will be 1.

Bytes 7, 8, and 9 include the second CEA short audio descriptors that describe audio features. Max Number of channels-1 will be 1 as described above. After receiving the EDID from the TV, the BDP may transmit audio infoframe to the TV. In contrast with the 3D audio transmission scenario, CC and CA each may be used to transmit channel count and channel/speaker allocation information. That is, audio metadata packet may not be used for multi-stream audio transmission. Table 83 shows an example of audio infoframe payload for transmitting two audio streams.

TABLE 83

Example of Audio InfoFrame Payload for Two Audio Streams

| Packet Byte# | 7 | 6 | 5 | 4 | 3 | 2 | 1 | 0 |
|---|---|---|---|---|---|---|---|---|
| PB0 | Checksum | | | | | | | |
| PB1 | CT3 (0) | CT2 (0) | CT1 (0) | CT0 (0) | Reserved (0) | CC2 (0) | CC1 (0) | CC0 (0) |
| PB2 | Reserved (0) | | | SF2 (0) | SF1 (0) | SF0 (0) | SS1 (0) | SS0 (0) |
| PB3 | Format depends on coding type (i.e CT0 ... CT3) | | | | | | | |
| PB4 | CA7 (0) | CA6 (0) | CA5 (0) | CA4 (0) | CA3 (0) | CA2 (0) | CA1 (0) | CA0 (0) |
| PB5 | DM_INH | LSV3 | LSV2 | LSV1 | LSV0 | Rscd(0) | LFEPBL1 | LFEPBL0 |
| PB6 | Reserved (0) | | | | | | | |
| PB7 | Reserved (0) | | | | | | | |
| PB8 | Reserved (0) | | | | | | | |
| PB9 | Reserved (0) | | | | | | | |
| PB10 | Reserved (0) | | | | | | | |
| PB11-PB27 | Reserved (0) | | | | | | | |

The BDP transmits the multi-stream audio sample packet including stereo audio samples for two independent audio streams. That is, the first sub-packet includes the stereo audio sample of the first audio stream, and the second sub-packet comprises the stereo audio sample of the second audio stream. In this example, multi-stream audio sample packet may be defined as shown in Table 84.

TABLE 84

Example of Multi-stream Audio Sample Packet for Two Audio Streams

| Byte/bit# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | 0 | Stream present sp3 (0) | Stream present sp2 (0) | Stream present sp1 (1) | Stream present sp0 (1) |
| HB2 | B 3 | B 2 | B 1 | B 0 | Stream_flat sp3(0) | Stream_flat sp2(0) | Stream_flat sp1 (0) | Stream_flat sp0(0) |
| SB0~SB2 | | | | Channel 1/Sample N (Stream 0) | | | | |
| SB3~SB5 | | | | Channel 2/Sample N (Stream 0) | | | | |
| SB6 | | PCUV of Ch 2 (Stream 0) | | | | PCUV of Ch 1 (Stream 0) | | |
| SB7~SB9 | | | | Channel 1/Sample N (Stream 1) | | | | |
| SB10~SB12 | | | | Channel 2/Sample N (Stream 1) | | | | |
| SB13 | | PCUV of Ch 2 (Stream 1) | | | | PCUV of Ch 1 (Stream 1) | | |
| SB14~SB16 | | | | Empty (0) | | | | |
| SB17~SB19 | | | | | | | | |
| SB20 | | | | | | | | |
| SB21~SB23 | | | | Empty (0) | | | | |
| SB24~SB26 | | | | | | | | |
| SB27 | | | | | | | | |

3D Audio Speaker Replacement and Channel Allocation

In the following, the speaker placement and channel allocation information for 3D audio transmission are provided.

Figure 15:
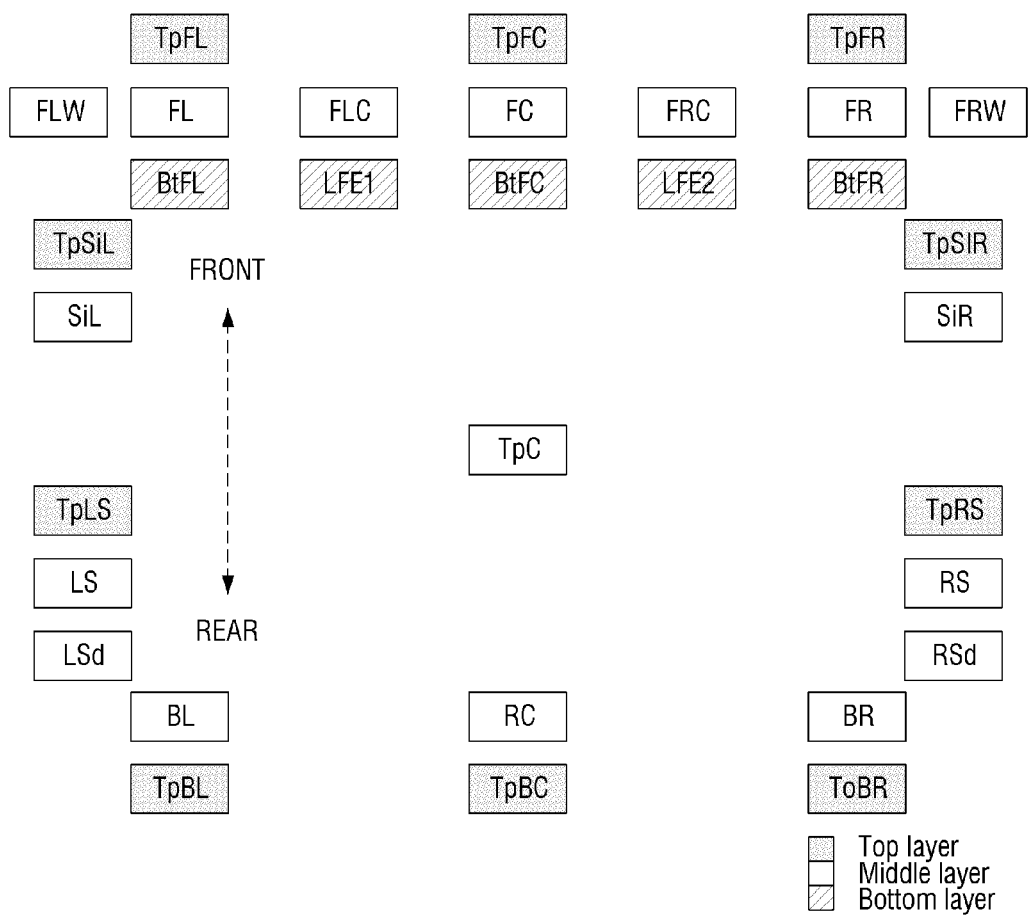
FIG. 15 is a view showing the placement of the speakers for 3D audio channel.

FIG. 15 is a view showing a speaker placement for channel of 3D audio.

In the case of 30.2 channels standard type of IEC among examples that are described in Table 85, FL indicates front left speaker, FR indicates front right speaker, LFF indicates low frequency effect 1 speaker, FC indicates front center speaker, BL indicates back left speaker, BR as back right speaker, FLW as front left wide speaker, FRW as front right wide speaker, TpFL as top front left speaker, TOR as top front right speaker, BC as back center speaker, LS as left surround speaker, RS as right surround speaker, LFE2 as low frequency effect 2 speaker, FLC as front left center speaker, FRC as front right center speaker, TpFC as top front center speaker, TpC as top center speaker, SiL as side left speaker, SiR as side right speaker, TpBL as top back left speaker, TpBR as top back right speaker, TpSiL as top side left speaker, TpSiR as top side right speaker, BtFC as bottom front center speaker, BtFL as bottom front left speaker, BtFR as bottom front right speaker, TpBC as top back center speaker, TpLS as top left surround speaker, TpRS as top right surround speaker, LSd as left surround direct speaker, and RSd as right surround direct speaker.

However, the name of the speaker may differ in accordance with types of standards. For example, front center speaker may be written as FC in the IEC standard described above, but front center speaker may be written as C in TTA standard. Various speaker names may exist besides the names that are illustrated in the tables below. That is, the contents illustrated in the table below and in FIG. 15 are only one exemplary embodiment, and speaker and channel allocation may be described differently.

However, 3D audio data in which multi-channels are supported has a common feature of having different speakers for each upper part, center part, lower part area of 3D space, unlike 2D audio data. Examples of spatial placement of these speakers are described in FIG. 15.

TABLE 85

Audio Channel Description & Abbreviation Comparison (CEA/TTA/SMPTE/IEC)

| | Abbreviation | | | |
|---|---|---|---|---|
| CEA_861 | TTA (10.2ch) | SMPTE (22.2ch) | IEC (30.2ch) | Description |
| FL | L | FL | FL | Front left |
| FR | R | FR | FR | Front right |
| LFE | LFE1 | LFE1 | LFE1 | Low Frequency Effect 1 |
| FC | C | FC | FC | Front center |
| RL | LB | BL | BL | Back Left |
| RR | RB | BR | BR | Back Right |
| FLW | | | FLW | Front Left Wide |
| FRW | | | FRW | Front Right Wide |
| FLH | LH | TpFL | TpFL | Top Front Left |
| FRH | RH | TpFR | TpFR | Top Front right |
| RC | | BC | BC | Back Center |
| | LS | | LS | Left Surround |
| | RS | | RS | Right Surround |
| | LFE2 | LFE2 | LFE2 | Low Frequency Effect 2 |
| FLC | | FLC | FLC | Front Left center |
| FRC | | FRC | FRC | Front right Center |
| RLC | | | | Rear Left Center |
| RRC | | | | Rear Right Center |
| FCH | | TpFC | TpFC | Top Front Center |
| TC | | TpC | TpC | Top Center |
| | | SiL | SiL | Side Left |
| | | SiR | SiR | Side Right |
| | | TpBL | TpBL | Top Back Left |
| | | TpBR | TpBR | Top Back Right |
| | | TpSiL | TpSiL | Top Side Left |
| | | TpSiR | TpSiR | Top Side Right |
| | | BtFC | BtFC | Bottom Front Center |
| | | BtFL | BtFL | Bottom Front Left |
| | | BtFR | BtFR | Bottom Front Right |
| | CH | TpBC | TpBC | Top Back Center |
| | | | TpLS | Top Left Surround |
| | | | TpRS | Top right Surround |
| | | | LSd | Left surround direct |
| | | | RSd | Right Surround direct |

5. Data Transmitting Method and Data Receiving Method

Hereinafter, a data transmitting method and a data receiving method based on the format according to the first exemplary embodiment described in paragraph 3.1 will be described with reference to FIGS. 16 and 17.

Figure 16:
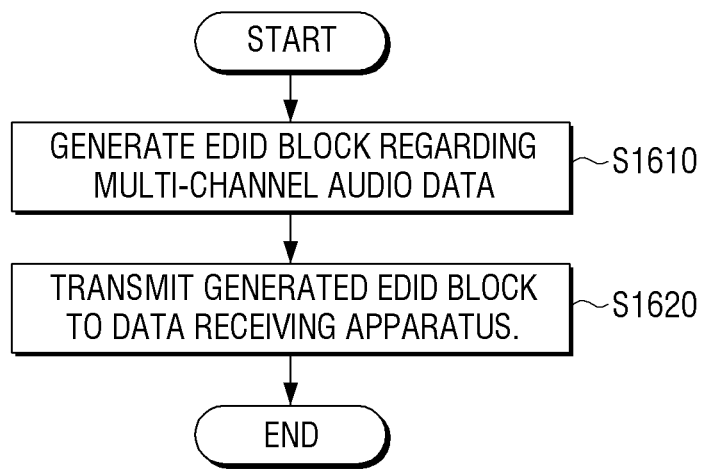
FIGS. 16 and 17 are flow charts illustrating a data transmission method and a data receiving method according to various exemplary embodiments.
Figure 17:
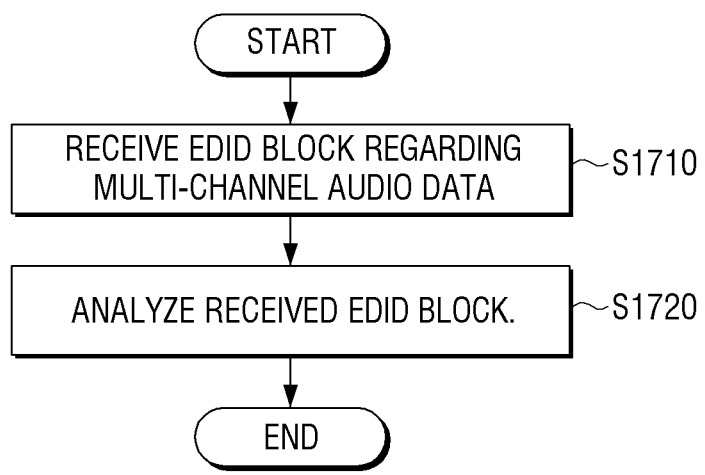

FIGS. 16 and 17 are flowcharts showing the data transmitting method and the data receiving method.

First, referring to FIG. 16, the data transmitting method includes operation S1610 of generating an EDID block regarding multi-channel audio data, and operation S1620 of transmitting the EDID block to a data receiving apparatus. The EDID block includes at least one of a first sub block representing 3D audio characteristics of the multi-channel audio data, a second sub block representing 3D speaker placement information of the multi-channel audio data, and a third sub block representing multi-stream audio characteristics of the multi-channel audio data.

The individual operations have been described in the first exemplary embodiment in paragraph 3.1, and accordingly, a repeated description will be omitted.

Referring to FIG. 17, the data receiving method includes operation S1710 of receiving an EDID block regarding multi-channel audio data from a data transmitting apparatus, and operation S1720 of analyzing the EDID block. The EDID block includes at least one of a first sub block representing 3D audio characteristics of the multi-channel audio data, a second sub block representing 3D speaker placement information of the multi-channel audio data, and a third sub block representing multi-stream audio characteristics of the multi-channel audio data.

The individual operations have been described in the first exemplary embodiment in paragraph 3.1, and accordingly, a repeated description will be omitted.

6. Multi-Audio

Supporting of multi-audio may be conducted under high-speed wired interface environment. The multi-audio environment means an environment that supports multi-audio for one content. For example, if two users are playing a game with the same screen then each user should receive different audio. In the following, transmission packet structure of a sink apparatus and a source apparatus is described when multi-audio is supported as described above.

6.1. Audio Sample Packet Modification Plan

The First Exemplary Embodiment

As shown below in the table, the structure of multi-stream audio sample packet may be utilized.

"MS_Layout" field for transmission of Multi-Audio for each view is newly defined in the header, but still Multi-Stream ASP structure is used. It is defined so that the layout structure of a sub-packet may differ in accordance with the MS_Layout field value. Additional information on each audio stream is transmitted through InfoFrame, Audio Metadata Packet, or newly defined audio description packet in the structure of transmitting multi-audio. The definition of the remaining field is the same as described in the defined Multi-Stream ASP.

The below table indicates MS_Layout value.

TABLE 87

| MS_Layout | | |
|---|---|---|
| MS_Layout | | Description |
| 0 | 0 | Normal Multi-Stream Audio Sample Packet |
| 0 | 1 | Dual View only |
| 1 | 0 | Multi-Audio only |
| 1 | 1 | Dual View and Multi-Audio |

\* In dual views, audio data for left bank (content 1) is transmitted through sub-packet 0 and 1, and audio data for right bank (content 2) is transmitted through sub-packets 2 and 3. Up to two samples per each audio data may be transmitted to one multi-stream.

\*\* Multi-audio for single view may be transmitted through sub-packets 0~3. Multi-stream ASP may transmit only audio data for one single view. For example, only audio signals for the left bank may be transmitted in case of 3D video. Up to a maximum of four multi-audio data for one single view may be transmitted.

\*\*\* Audio data on left bank (content 1) may be transmitted through sub-packets 0 and 1 in the case of dual view multi-audio. Sub-packets 0 and 1 hold two different audio streams. For example, one stream comprises Korean audio data and other stream comprises English audio stream.

However, the exemplary embodiment described above is only an exemplary embodiment, and the number of sub-packet for describing audio data may be extended. In addition, the order of sub-packet may be included differently from the above.

The Second Exemplary Embodiment

The second exemplary embodiment is a plan of defining new ASP apart from Multi-Stream ASP as the below table and using new ASP only for multi-audio.

TABLE 86

| Multi-Stream Audio Sample Packet | | | | | | | | |
|---|---|---|---|---|---|---|---|---|
| Byte/Bit # | 7 | 6 | 5 | 4 | 3 | 2 | 1 | 0 |
| HB0 | 0 | 0 | 0 | 0 | 1 | 1 | 1 | 0 |
| HB1 | Rsvd (0) | Rsvd (0) | MS_Layout | | Stream_present.-Sp3 | Stream_present.-Sp2 | Stream_present.-Sp1 | Stream_present.-Sp0 |
| HB2 | B3 | B2 | B1 | B0 | Stream_flat sp3 | Stream_flat sp2 | Stream_flat sp 1 | Stream_flat sp0 |
| PB0~PB6 | | | | | Subpacket 0 | | | |
| PB7~PB13 | | | | | Subpacket 1 | | | |
| PB14~PB20 | | | | | Subpacket 2 | | | |
| PB21~PB27 | | | | | Subpacket 3 | | | |

TABLE 88

Multi-Audio Audio Sample Packet

| Byte/Bit # | 7 | 6 | 5 | 4 | 3 | 2 | 1 | 0 |
|---|---|---|---|---|---|---|---|---|
| HB0 | | | | | New packet Type (TBD) | | | |
| HB 1 | Rsvd (0) | Rsvd (0) | Rsvd (0) | Rsvd (0) | Sample_pre sent.sp3 | Sample_pre sent.sp2 | Sample_pre sent.sp1 | Sample_prese nt.sp0 |
| HB2 | B3 | B2 | B1 | B0 | Sample_flat sp3 | Sample_flat sp2 | Sample_flat sp 1 | Sample_flat sp0 |
| PB0~PB6 | | | | | Subpacket 0 | | | |
| PB7~PB13 | | | | | Subpacket 1 | | | |
| PB14~PB20 | | | | | Subpacket 2 | | | |
| PB21~PB27 | | | | | Subpacket 3 | | | |

The second exemplary embodiment defines a new packet apart from the Multi-Stream ASP and uses the new packet for transmission of multi-audio data for each view. However, the new packet may not be used in 3D Video format and may be used only when single video is transmitted. Sample data of one type of audio stream may be transmitted per each sub-packet and different types of audio stream may be used per sub-packet. In this case, a maximum of four audio steam sample data may be transmitted simultaneously in terms of single video. Additional information for each audio stream is transmitted through InfoFrame, Audio Metadata Packet, or (newly defined) Audio Description Packet.

The Third Exemplary Embodiment

The third exemplary embodiment is a plan that uses multi-stream ASP structure which has defined AS_ID (Audio stream Identifier) field as the below table.

When transmitting multi-audio for each view, one ASP will transmit sample data of an audio stream corresponding to AS_ID among more than one audio stream that is related to left view (or right view). Additional information on which audio stream is an audio stream of which view that is transmitted from each ASP may be figured out through InfoFrame, Audio Metadata Packet, or (newly defined) Audio Description Packet.

As an another alternative to this plan, there may be a method of defining differently by allocating different packet types in multi-stream audio and multi-audio ASP for each single view. Here, two ASP structures may be identical or may be different in some fields, but "AS_ID" field may certainly be included in both.

TABLE 89

Multi-Audio Audio Sample Packet

| Byte/Bit # | 7 | 6 | 5 | 4 | 3 | 2 | 1 | 0 |
|---|---|---|---|---|---|---|---|---|
| HB0 | | | | | Packet Type = 0x0E 또는 0xXX (Newly defined packet type) | | | |
| HB1 | AS_ID (Audio Stream identifier) | | | | Sample_present.- sp3 | Sample_present.- sp2 | Sample_present.- sp1 | Sample_present.sp0 |
| HB2 | B3 | B2 | B1 | B0 | Sample_flat sp3 | Sample_flat sp2 | Sample_flat sp 1 | Sample_flat sp0 |
| PB0~PB6 | | | | | Subpacket 0 | | | |
| PB7~PB13 | | | | | Subpacket 1 | | | |
| PB14~PB20 | | | | | Subpacket 2 | | | |
| PB21~PB27 | | | | | Subpacket 3 | | | |

Each ASP transmits only one type of audio stream sample data. For dual-view, one ASP will transmit an audio data of any one of content (left or right). For quad-view, one ASP will transmit audio stream that is related to one view (content) among left odd, left even, right odd, or right even view (contents).

The Fourth Exemplary Embodiment

The fourth exemplary embodiment is an improvement over the third exemplary embodiment, and distinguishes ID at two levels as the below table. That is, AS_ID is defined by dividing into AS_Major_ID and AS_Minor_ID.

TABLE 90

| Byte/Bit # | 7 | 6 | 5 | 4 | 3 | 2 | 1 | 0 |
|---|---|---|---|---|---|---|---|---|
| | | | | | Multi-Audio Audio Sample Packet | | | |
| HB0 | Packet Type = 0x0E또는 0xXX (Newly defined packet type) | | | | | | | |
| HB1 | AS_Major_ID | | AS_Minor_ID | | Sample_present.-sp3 | Sample_present.-sp2 | Sample_present.-sp1 | Sample_present.-sp0 |
| HB2 | B3 | B2 | B1 | B0 | Sample_flat sp3 | Sample_flat sp2 | Sample_flat sp 1 | Sample_flat sp0 |
| PB0~PB6 | Subpacket 0 | | | | | | | |
| PB7~PB13 | Subpacket 1 | | | | | | | |
| PB14~PB20 | Subpacket 2 | | | | | | | |
| PB21~PB27 | Subpacket 3 | | | | | | | |

AS_Major_ID is an ID that identifies multi-stream audio, and AS_Minor_ID is an ID that identifies multi-audio for each view.
AS_Major_ID is an ID of higher level and AS_Minor_ID is defined per each value of AS_Major_ID.

The below table describes definition per each ID value.

TABLE 91

AS_Major_ID and AS_Minor_ID fields

| AS_Major_ID | | AS_Minor_ID | | Description |
|---|---|---|---|---|
| 0 | 0 | 0 | 0 | $1^{st}$ audio stream Left Odd view |
| 0 | 0 | 0 | 1 | $2^{nd}$ audio stream Left Odd view |
| 0 | 0 | 1 | 0 | $3^{rd}$ audio stream Left Odd view |
| 0 | 0 | 1 | 1 | $4^{th}$ audio stream Left Odd view |
| 0 | 1 | 0 | 0 | $1^{st}$ audio stream Right Odd view |
| 0 | 1 | 0 | 1 | $2^{nd}$ audio stream Right Odd view |
| 0 | 1 | 1 | 0 | $3^{rd}$ audio stream Right Odd view |
| 0 | 1 | 1 | 1 | $4^{th}$ audio stream Right Odd view |
| 1 | 0 | 0 | 0 | $1^{st}$ audio stream Left Even view |
| 1 | 0 | 0 | 1 | $2^{nd}$ audio stream Left Even view |
| 1 | 0 | 1 | 0 | $3^{rd}$ audio stream Left Even view |
| 1 | 0 | 1 | 1 | $4^{th}$ audio stream Left Even view |
| 1 | 1 | 0 | 0 | $1^{st}$ audio stream Right Even view |
| 1 | 1 | 0 | 1 | $2^{nd}$ audio stream Right Even view |
| 1 | 1 | 1 | 0 | $3^{rd}$ audio stream Right Even view |
| 1 | 1 | 1 | 1 | $4^{th}$ audio stream Right Even view |

As an another alternative to this plan, there may be a method of defining separately by allocating different packet type in multi-stream audio and multi-audio ASP for each view. Here, two ASP structures may be identical or may be different in some fields, but "AS_Major_ID" and "AS_Minor_ID" fields may certainly be included in both.

6-2. Signaling Data Modification Plan-1

The First Exemplary Embodiment

The first exemplary embodiment comprises a field (MS_Audio_Type) indicating whether multi-stream audio is transmitted to audio metadata packet or not, a field (Aux_Audio) indicating whether multi-audio data for each view is transmitted or not, and more than one audio/video mapping information (A/V Mapping Descriptor).

TABLE 92

Audio Metadata Packet Header

| Byte/bit # | 7 | 6 | 5 | 4 | 3 | 2 | 1 | 0 |
|---|---|---|---|---|---|---|---|---|
| HB0 | Packet Type = 0x0D또는 0xXX (Newly defined packet type) | | | | | | | |
| HB1 | Rsvd(0) | Rsvd(0) | Rsvd(0) | Rsvd(0) | Rsvd(0) | Rsvd(0) | Rsvd(0) | Rsvd(0) |
| HB2 | Rsvd(0) | Rsvd(0) | Rsvd(0) | Rsvd(0) | Rsvd(0) | Rsvd(0) | Rsvd(0) | Rsvd(0) |

TABLE 93

Audio Metadata Packet Contents

| Byte/bit # | 7 | 6 | 5 | 4 | 3 | 2 | 1 | 0 |
|---|---|---|---|---|---|---|---|---|
| PB0 | Rsvd(0) | Rsvd(0) | Rsvd(0) | 3D_CC4 | 3D_CC3 | 3D_CC2 | 3D_CC1 | 3D_CC0 |
| PB1 | Rsvd(0) | Rsvd(0) | Rsvd(0) | Rsvd(0) | ACAT3 | ACAT2 | ACAT1 | ACAT0 |
| PB2 | 3D_CA7 | 3D_CA6 | 3D_CA5 | 3D_CA4 | 3D_CA3 | 3D_CA2 | 3D_CA1 | 3D_CA0 |
| PB3 | MS_Audio_Type | | Aux_Audio | | Num_AV_Mapping_Descriptor (=N) | | | |
| PB4 | AV Mapping Descriptor 1 | | | | | | | |
| ... | ... | | | | | | | |
| PB(4 + N) | AV Mapping Descriptor N | | | | | | | |
| PB(4 + N) ... PB27 | Reserved (0) | | | | | | | |

MS_Audio_Type indicates whether multi-stream audio is transmitted or not as described above.

Field value is shown as the below table.

TABLE 94

MS_Audio_Type field

| MS_Audio_Type | | Description |
|---|---|---|
| 0 | 0 | Reserved |
| 0 | 1 | Transmits 2 audio streams for Dual view |
| 1 | 0 | Transmits 3 audio streams for Dual view |
| 1 | 1 | Transmits 4 audio streams for Dual view |

That is, it is described to transmit two audio streams for dual-view when the value of the field is 01, three audio streams for tri-view when the value is 10, and four audio streams for quad-view.

When the field value of Aux_Audio is 1 in the audio metadata packet, it means that more than two audio streams are being transmitted from any view. If the value is 0, it means that all views are transmitting only one audio stream.

Num_AV_Mapping_Descriptor means the number of AV Mapping Descriptor that is to be described after the byte in which this field belongs to.

AV Mapping Descriptor comprises information showing which view of video of audio data each audio stream includes. AV Mapping Descriptors that are described in order correspond to Audio Stream ID (or Subpacket number) according to the order. That is, the first AV Mapping Descriptor becomes a descriptor on audio stream that is transmitted through ASP with 0 of Audio Stream ID value, when ASP uses Audio Stream ID. When ASP uses a structure that identifies multi-stream audio with sub-packet unit in similar way, the first AV Mapping Descriptor becomes a descriptor on audio stream that is transmitted through sub-packet 0. A detail structure of AV Mapping Descriptor is as follows.

TABLE 95

| A V Mapping Descriptor | | | | | | | | |
|---|---|---|---|---|---|---|---|---|
| PB(X) | Rsvd (0) | Rsvd (0) | Rsvd (0) | Rsvd (0) | Rsvd (0) | RE | LE | R0 | L0 |

Audio stream in which LO is set to 1 means audio data of Left View (the first content of Dual View) or Left Odd View (the first content of Quad View).

Audio stream in which RO is set to 1 means audio data of Right View (the second content of Dual View) or Right Odd View (the third content of Quad View).

Audio stream in which LES is set to 1 means audio data of Left Even View (the second content of Quad View). (This field is set to 0 in Dual View)

Audio stream in which RE is set to 1 means audio data of Right Even View (the fourth content of Quad View). (This field is set to 0 in Dual View)

The Second Exemplary Embodiment

The second exemplary embodiment is similar to the first exemplary embodiment, but MS_Audio_Type, Aux_Audio, Num_AV_Mapping_Descriptor, and 3D Audio field are defined in Audio Metadata Packet header.

TABLE 96

| Audio Metadata Packet header | | | | | | | | |
|---|---|---|---|---|---|---|---|---|
| Byte/bit # | 7 | 6 | 5 | 4 | 3 | 2 | 1 | 0 |
| HB0 | Packet Type = 0x0D또는 0xXX (Newly defined packet type) | | | | | | | |
| HB1 | Rsvd(0) | Rsvd(0) | Rsvd(0) | Rsvd(0) | Rsvd(0) | Rsvd(0) | Rsvd(0) | 3D_Audio |
| HB2 | Num_AV_Mapping_Descriptor (=N) | | | | | MS_Audio_Type | | Aux_Audio |

TABLE 97

| Audio Metadata Packet contents | | | | | | | | |
|---|---|---|---|---|---|---|---|---|
| Byte/bit # | 7 | 6 | 5 | 4 | 3 | 2 | 1 | 0 |
| PB0 | Rsvd(0) | Rsvd(0) | Rsvd(0) | 3D_CC4 | 3D_CC3 | 3D_CC2 | 3D_CC1 | 3D_CC0 |
| PB1 | Rsvd(0) | Rsvd(0) | Rsvd(0) | Rsvd(0) | ACAT3 | ACAT2 | ACAT1 | ACAT0 |
| PB2 | 3D_CA7 | 3D_CA6 | 3D_CA5 | 3D_CA4 | 3D_CA3 | 3D_CA2 | 3D_CA1 | 3D_CA0 |
| PB3 | AV Mapping Descriptor 1 | | | | | | | |
| ... | ... | | | | | | | |
| PB(3 + N) | AV Mapping Descriptor N | | | | | | | |
| PB(3 + N) ... PB27 | Reserved (0) | | | | | | | |

3D_Audio shows whether 3D audio is transmitted to the Sink from the Source. PB0~PB2 of the audio metadata packet are included when the field value is set to 1. On the other hand, PB0~PB2 are omitted when the field value is set to 0. The definition of other fields is the same as the first exemplary embodiment.

The Third Exemplary Embodiment

The third exemplary embodiment is similar to the second exemplary embodiment, but Audio Metadata Descriptor is defined instead of AV Mapping Descriptor. This descriptor comprises AV Mapping information and Audio feature information (e.g. Channel Count, Sampling Frequency, Channel/Speaker Allocation, Level Shift Value, Downmix Inhibit, LFE Playback level information) for multi-audio on multi-stream and each view.

TABLE 98

| | | | | Audio Metadata Packet Header | | | | |
|---|---|---|---|---|---|---|---|---|
| Byte/bit # | 7 | 6 | 5 | 4 | 3 | 2 | 1 | 0 |
| HB0 | Packet Type = 0x0D 또는 0xXX (Newly defined packet type) | | | | | | | |
| HB1 | Rsvd(0) | Rsvd(0) | Rsvd(0) | Rsvd(0) | Rsvd(0) | Rsvd(0) | Rsvd(0) | 3D_Audio |
| HB2 | Num_AV_Mapping_Descriptor (=N) | | | | MS_Audio_Type | | | Aux_Audio |

TABLE 99

| | | | Audio Metadata Packet contents | | | | | |
|---|---|---|---|---|---|---|---|---|
| Byte/bit # | 7 | 6 | 5 | 4 | 3 | 2 | 1 | 0 |
| PB0 | Rsvd(0) | Rsvd(0) | Rsvd(0) | 3D_CC4 | 3D_CC3 | 3D_CC2 | 3D_CC1 | 3D_CC0 |
| PB1 | Rsvd(0) | Rsvd(0) | Rsvd(0) | Rsvd(0) | ACAT3 | ACAT2 | ACAT1 | ACAT0 |
| PB2 | 3D_CA7 | 3D_CA6 | 3D_CA5 | 3D_CA4 | 3D_CA3 | 3D_CA2 | 3D_CA1 | 3D_CA0 |
| PB3~PB6 | AV Mapping Descriptor 1 | | | | | | | |
| ... | ... | | | | | | | |
| PB(3 + 4 * N)~PB(7 + 4 * N) | AV Mapping Descriptor N | | | | | | | |
| PB(7 + 4 * N)...PB27 | Reserved (0) | | | | | | | |

TABLE 100

| | | | Audio Metadata Descriptor | | | | | |
|---|---|---|---|---|---|---|---|---|
| PB(X + 0) | Rsvd (0) | Rsvd (0) | Rsvd (0) | Rsvd (0) | RE | LE | R0 | L0 |
| PB(X + 1) | LFEPBL1 | LFEPBL0 | SF2 | SF1 | SF0 | CC2 | CC1 | CC0 |
| PB(X + 2) | CA7 | CA6 | CA5 | CA4 | CA3 | CA2 | CA1 | CA0 |
| PB(X + 3) | Rsvd (0) | Rsvd (0) | Rsvd (0) | DM_INH | LSV3 | LSV2 | LSV1 | LSV0 |

Each field of RE, LE, RP, and LO that are defined in PB(X+0) are used as they are defined in the second exemplary embodiment.

Each field that is defined in PB(X+1)~PB(X+3) is used in the same way as a field that is defined in Audio InfoFrame of CEA-861-F standard.

The following may be considered as an alternative of the third exemplary embodiment.
  The structure of Audio Metadata Packet is maintained as a form of the second exemplary embodiment.
  Audio Stream ID is added to a reserved area of the Header of Audio InfoFrame or the Payload Byte. The Audio InfoFrame should be transmitted as much as audio streams. That is, it is a method of transmitting a plurality of Audio InfoFrame by including Audio Stream ID in Audio InfoFrame, instead of these fields that are defined in Audio Metadata Descriptor PB(X+1)~PB(X+3) of the third exemplary embodiment that are from the fields existing in Audio InfoFrame.

The Fourth Exemplary Embodiment

The fourth exemplary embodiment is similar to the third exemplary embodiment but in the fourth exemplary embodiment, one audio metadata packet includes only signaling information on one view (content) by including AS_Major_ID, instead of MS_Audio_Type, in header of audio metadata packet. According to this plan, four audio metadata packets should be transmitted when transmitting Quad View, and each packet may be identified as AS_Major_ID.

TABLE 101

Audio Metadata Packet Header

| Byte/bit # | 7 | 6 | 5 | 4 | 3 | 2 | 1 | 0 |
|---|---|---|---|---|---|---|---|---|
| HB0 | Packet Type = 0x0D 또는 0xXX (Newly defined packet type) | | | | | | | |
| HB1 | Rsvd(0) | Rsvd(0) | Rsvd(0) | Rsvd(0) | Rsvd(0) | Rsvd(0) | Rsvd(0) | 3D_Audio |
| HB2 | Num_AV_Mapping_Descriptor (=N) | | | | AS_MAJOR_ID | | Aux_Audio | |

TABLE 102

Audio Metadata Packet contents

| Byte/bit # | 7 | 6 | 5 | 4 | 3 | 2 | 1 | 0 |
|---|---|---|---|---|---|---|---|---|
| PB0 | Rsvd(0) | Rsvd(0) | Rsvd(0) | 3D_CC4 | 3D_CC3 | 3D_CC2 | 3D_CC1 | 3D_CC0 |
| PB1 | Rsvd(0) | Rsvd(0) | Rsvd(0) | Rsvd(0) | ACAT3 | ACAT2 | ACAT1 | ACAT0 |
| PB2 | 3D_CA7 | 3D_CA6 | 3D_CA5 | 3D_CA4 | 3D_CA3 | 3D_CA2 | 3D_CA1 | 3D_CA0 |
| PB3~PB6 | AV Mapping Descriptor 1 | | | | | | | |
| ... | ... | | | | | | | |
| PB(3 + 4 * N)~PB(7 + 4 * N) | AV Mapping Descriptor N | | | | | | | |
| PB(7 + 4 * N) ... PB27 | Reserved (0) | | | | | | | |

In this plan, Audio Metadata Descriptors that are included in the payload comprise feature information of multi-audios that are related to one view. Therefore, the first Byte comprising LO, RO, LE, and RE fields are not needed unlike audio metadata descriptors that are defined in the third exemplary embodiment.

Here, audio metadata descriptors that are placed in order indicate that they are descriptors that correspond to AS_Minor_ID according to the order. That is, the first audio metadata descriptor means a descriptor of audio stream in which AS_Minor_ID is 0. In a same way, the second audio metadata descriptor means a descriptor of an audio stream in which AS_Minor_ID is 1.

In contrary to the plan reflecting AS_Minor_ID implicitly as above, a plan of explicitly including AS_Minor_ID field having 1 bit or more in the first Byte of each audio metadata descriptor may be considered. For example, if it is wanted to be used with ASP comprising 2 bits of AS_Minor_ID field, it should be defined by allocating 2 bits with AS_Minor_ID that is to be defined in audio metadata descriptor.

The 4-1 Exemplary Embodiment

Audio metadata descriptor may be defined as the following table. Here, each field that is defined PB(X+0)~PB(X+2) may be used as the meanings of fields that are defined in audio infoframe of CEA-861-F standard.

TABLE 103

Audio Metadata Descriptor

| | 7 | 6 | 5 | 4 | 3 | 2 | 1 | 0 |
|---|---|---|---|---|---|---|---|---|
| PB(X + 0) | LFEPBL1 | LFEPBL0 | SF2 | SF1 | SF0 | CC2 | CC1 | CC0 |
| PB(X + 1) | CA7 | CA6 | CA5 | CA4 | CA3 | CA2 | CA1 | CA0 |
| PB(X + 2) | Rsvd (0) | Rsvd (0) | Rsvd (0) | DM_INH | LSV3 | LSV2 | LSV1 | LSV0 |

The 4-2 Exemplary Embodiment

Audio metadata descriptor may be defined by including AS_Minor_ID as the following table, unlike the 4-1 exemplary embodiment. Here, each field that is defined in PB(X+0)~PB(X+2) may be used as the meanings of fields that are defined in audio infoframe of CEA-861-F standard.

TABLE 104

Audio Metadata Descriptor

| | 7 | 6 | 5 | 4 | 3 | 2 | 1 | 0 |
|---|---|---|---|---|---|---|---|---|
| PB(X + 0) | Rsvd (0) | Rsvd (0) | Rsvd (0) | Rsvd (0) | Rsvd (0) | Rsvd (0) | AS_Minor_ID | |
| PB(X + 1) | LFEPBL1 | LFEPBL0 | SF2 | SF1 | SF0 | CC2 | CC1 | CC0 |

TABLE 104-continued

| | | | Audio Metadata Descriptor | | | | | |
|---|---|---|---|---|---|---|---|---|
| PB(X + 2) | CA7 | CA6 | CA5 | CA4 | CA3 | CA2 | CA1 | CA0 |
| PB(X + 3) | Rsvd (0) | Rsvd (0) | Rsvd (0) | DM_INH | LSV3 | LSV2 | LSV1 | LSV0 |

The AS_Minor_ID field may be defined in the reserved area existing in the structure of the 4-1 embodiment without allocating separate Bytes.

In addition, there is a plan of defining the size of AS_Minor_ID field bigger than 2 bits or less. Here, it is needed to define as same as the bit size of other packets (e.g. Multi-Stream Audio Sample Packet, Audio Clock Regeneration Packet) that defines AS_Minor_ID field.

There is the following plan as an alternative of the fourth exemplary embodiment.

AS_Major_ID and AS_Minor_ID are added in reserved area of header of audio infoframe or payload byte. And audio infoframe should be transmitted in the number of audio stream. Fields that are defined in Audio Metadata Descriptor PB(X+1)~PB(X+3) are from fields existing in audio infoframe, and instead it is a method of transmitting a plurality of audio infoframe comprising AS_Major_ID and AS_Minor_ID to audio infoframe.

6-3 Signaling Data Modification Plan-2

An audio description packet includes information that describes a feature of the data (e.g. language type, title, supplement) that are included in each audio stream is defined.

The First Exemplary Embodiment

Information that describes the feature of the data (e.g. language type, title, supplement) that are comprised in each audio stream is included as the below table.

TABLE 105

| | | | Audio Description Packet Header | | | | | |
|---|---|---|---|---|---|---|---|---|
| Byte/bit # | 7 | 6 | 5 | 4 | 3 | 2 | 1 | 0 |
| HB0 | Packet Type = 0xXX (Newly defined packet type) | | | | | | | |
| HB1 | Rsvd(0) | Rsvd(0) | Rsvd(0) | Rsvd(0) | | Audio Stream ID | | |
| HB2 | EXD_Pressent | | Audio_Information_Descriptors_Present | | | | | |

Audio Stream ID is an identifier field to distinguish audio streams that are transmitted from each view, also this field is defined in Multi-Stream Audio Sample Packet and Audio Metadata Packet. Packets with the same value of this field are used in audio stream transmission.

Since EXD_Present (Extended Descriptors Present) is not defined in Audio_Information_Descriptors_Present so the field value is set to 1 when extension of descriptor is needed. Here, the first Byte of Audio Description Packet Payload is defined as Extended_Audio_Information_Descriptors_Present field.

Audio_Information_Descriptors_Present is a field which determines whether to include certain descriptors in accordance with the setting of each bit. The Sub-field as follows is included.

TABLE 106

| | | | Audio_Information_Descriptors_Present | | | | | |
|---|---|---|---|---|---|---|---|---|
| HB2 | EXD_Presen | Rsvd (0) | Rsvd (0) | Rsvd (0) | CAD | APD | PSD | MLD |

MLD, PSD, PD, and CAD each are fields indicating whether Multi-Lingual Descriptor, Primary/Supplementary Descriptor, Audible Position Descriptor, and Content Advisory Descriptor are included or not.

A detailed structure of the descriptor is described in the following table. Reserved bits are space allocated to indicate whether the descriptor to be added in the future is included or not.

TABLE 107

| | |
|---|---|
| MLD(Multi-Lingual Descriptor) | |
| PB(X + 0) | ISO_639_Language_Code (3Bytes) |
| PB(X + 1) | |
| PB(X + 2) | |

The type of language that is used in the audio stream may be described through language code that is defined in the ISO 639 standard. However, it does not exclude a language code in other standards.

TABLE 108

| | | |
|---|---|---|
| PSD(Primary-Supplementary Descriptor) | | |
| PB(X + 0) | PS | PS_Type |

If the PS field is 1, this indicates a primary audio, and if the PS field is 0, this indicates a supplementary audio.

If the value of the PS_Type field is 1, this indicates a primary audio, and if the value of the PS_Type field is 0, this indicates supplementary audio.

TABLE 109

| PS_Type field if PS is set to 1(primary audio) | |
|---|---|
| PS-Type | Description |
| 0x00~0x7E | Reserved (TBD) |
| 0x7F | Extends the PS_Type field |

If field value of PS_Type is 0x00~0x7E, each field value indicates the type of primary audio, and if the field value of PS_Type is 0x7F, PSD is extended to 2 Bytes as follows and the second Byte is used as Extended_PS_Type field.

TABLE 110

| | | |
|---|---|---|
| PSD(Primary-Supplementary Descriptor) is PS_Type is set to 0x7F | | |
| PB(X + 0) | PS | PS_Type = 0x7F |
| PX((X + 1) | | Extended_PS_Type |

If Extended_PS_Type needs extension of PS_Type, Extended_PS_Type field may be added when the value of PS_Type is set to 0x7F.

If the field value of PS is set to 0, PS_Type works as a field informing type of supplementary audio. The field value of PS_Type means as the below table.

TABLE 111

PS_Type field if PS is set to 0(supplementary audio)

| PS_Type | Description |
|---|---|
| 0x00 | Audio stream for Description Video (for visual impairment) |
| 0x01 | Audio stream shifted to High Freq (for hearing impairment) |
| 0x02 | Audio stream shifted to Low Freq (for hearingimpairment) |
| 0x03 | Audio stream amplified in High Freq (for hearing impairment) |
| 0x04 | Audio stream amplified in Low Freq (for hearing impairment) |
| 0x05~0x07E | Reserved (TBD) |
| 0x07F | Extends the PS_Type field |

If the value of PS_Type is 0x7F, Extended_PS_Type field is added and the specific method is the same as described in previous paragraph.

TABLE 112

APD (Audible Position Descriptor)

| PB(X + 0) | Audible_Location | Position |
|---|---|---|

TABLE 113

Audible_Location field

| Audible_Location | Description |
|---|---|
| 0x00 | Stadium |
| 0x01 | Indoor stadium |
| 0x02 | Concert Hall |
| 0x03~0x0F | Reserved (TBD) |

Position field is the value indication of the position of the audio source within the place designated as Audible_Location.

TABLE 114

Position field

| position | Description |
|---|---|
| 0x00 | 1 |
| 0x01 | 2 |
| 0x02 | 3 |
| ... | ... |
| 0x0F | 16(Farthest) |

There may be several ways of describing the position. How far the audio source is apart from a position printed from the video may be expressed in numbers (1, 2, 3 . . . ). In other way, it may be defined to express certain positions by displaying position value in accordance with Audible_Location. For example, if the Audible_Location is a stadium, it may be defined as a broadcasting booth if the position is 0x00, as infield bleacher if position is 0x01, and as outfield bleacher if position is 0x02.

Content Advisory Descriptor (CAD) is defined as descriptor displaying the listening rating of the audio stream as follows.

TABLE 115

CAD (Content Advisory Descriptor)

| PB(X + 0) | Rating_type (4 bits) | Rating_value (4bits) |
|---|---|---|

Rating_type is a field displaying the rating standard type by country and contents. Rating_value displays a type of each rating that is determined in accordance with the standard of Rating_type.

CAD may be used as the purpose for including rating information of the video stream as well as the audio stream. To do so, additional modification of packet transmitting CAD or new definition is needed. For example, there may be a way of including a descriptor holding information as CAD by newly defining the video description packet, separate from the audio description packet in which CAD is included. Another way to do this is to include description information on Audio/Video stream contents by redefining the audio description packet as AV description packet.

When newly defining the Video Description Packet, at least the following information should be included.

(1) ID information connecting the Video Description Packet and video stream (view) related to the video description packet.

(2) ID information that may connect the Video Description Packet and the audio stream related to the video description packet. The ID may have the same value as the ID defined in the first exemplary embodiment or may allocate separate ID value.

(3) The number of the descriptor, the type of the included descriptor, and the extension flag of the header or the payload are included to load more than one descriptor to the payload.

(4) Various information related to video contents such as the type of each video content, position information of views in multi-view, and information for immersive media, may be defined and included in various types of descriptors.

TABLE 116

Rating_type field

| Rating_type | Description |
|---|---|
| 0x00 | Film ratng (US) |
| 0x01 | TV rating (US) |
| 0x02 | Video Game rating (US) |
| 0x03 | Film ratin (EU) |
| 0x04 | TV rating (EU) |
| ... | ... |
| 0x0F | Reserved |

TABLE 117

Rating_value field

| Rating_type | 0x00 | 0x01 | 0x02 | ... |
|---|---|---|---|---|
| 0x00 | G | TV-Y | EC | ... |
| 0x01 | PG | TY-Y7 | E | ... |
| 0x02 | PG-13 | TV-Y7-FV | T | ... |
| 0x03 | R | TV-G | M | ... |
| 0x04 | NC-17 | TV-PG | AO | ... |
| ... | ... | | | |
| 0x0F | | | | |

Another alternative for describing CAD is as follows.

TABLE 118

| Country_Code, Rating_Type, Rating_Value | |
|---|---|
| PB(X + 0) | Country_Code |
| PB(X + 1) | Rating_Type |
| PB(X + 2) | Rating_Value |

It is a way of defining Country_Code by dividing it separately. There is a way of defining Country_Code field by allocating one bit or more. In addition, this field may be defined as the below table, or may be described as 3 bytes in accordance with ISO 3166 standard.

TABLE 119

| Country_Code field | |
|---|---|
| Rating-Type | Description |
| 0x00 | ABW (Aruba Island) |
| 0x01 | AFG (Afghanistan) |
| ... | ... |
| 0xXX | KOR(Republic of Korea) |
| ... | ... |
| 0xYY | USA(United States of America) |
| ... | ... |
| 0xFF | ZWE(Zimbabwe) |

TABLE 120

| Rating_Type field | |
|---|---|
| Rating_type | Description |
| 0x00 | Flim |
| 0x01 | TV |
| 0x02 | Video Game |
| ... | ... |
| 0xFF | Reserved (TBD) |

TABLE 121

| Rating_value field (if Country_Code is set to 0xYY(USA)) | | | | |
|---|---|---|---|---|
| Rating_type | 0x00 | 0x01 | 0x02 | ... |
| 0x00 | G | TV-Y | EC | ... |
| 0x01 | PG | TY-Y7 | E | ... |
| 0x02 | PG-13 | TV-Y7-FV | T | ... |
| 0x03 | R | TV-G | M | ... |
| 0x04 | NC-17 | TV-PG | AO | ... |
| ... | ... | | | |
| 0x0F | | Reserved (TBD) | | |

6-4. EDID Modification Plan

A flag that identifies whether multi-audio for a single view of a sink is supported or not is added in EDID. The flag may be included in HDMI Audio Data Block and VSIF (LLC or Forum), or may be included in a newly defined data block.

6-5. Definition of Multi View Field

A field is added to describe support information of Dual/Tri/Quad-View or additional Multi-view in Vendor-Specific InfoFrame and Vendor-Specific Data Block.

The First Exemplary Embodiment

The first exemplary embodiment adds a 3D_MultiView field to describe support information of Dual/Tri/Quad-View or additional Multi-View in PB5 area of Vendor-Specific InfoFrame.

TABLE 122

| Vendor-Specific InfoFrame Packet Contents | | | | | | | | |
|---|---|---|---|---|---|---|---|---|
| Packet Byte# | 7 | 6 | 5 | 4 | 3 | 2 | 1 | 0 |
| PB0 | Checksum | | | | | | | |
| PB1 | 24 bit IEEE Registration Identifier (0x000C03) | | | | | | | |
| PB2 | (least significant byte first) | | | | | | | |
| PB3 | | | | | | | | |
| PB4 | HDMI_Video_Format | | | Rsvd(0) | Rsvd(0) | Rsvd(0) | Rsvd(0) | Rsvd(0) |
| PB5 | | | | HDMI_VIC | | | | |
| (PB6) | 3D_Structure 3D_Ext_Data | | | | Rsvd(0) | 3D_MultiView | | Rsvd(0) |
| | | | | | | | Rsvd(0) | |
| ... PB(Nv) | Reserved (0) | | | | | | | |

The 3D_MultiView field indicates whether video data transmitted as 3D format is data of a normal 3D mode (transmission form before HDMI 1.4b) or data of a Multi-View (Dual/Tri/Quad). The meaning of the content in accordance with this field value is described in the table below.

TABLE 123

| 3D_MultiView field | | |
|---|---|---|
| 3D MultiView | | Description |
| 0 | 0 | Normal 3D Mode |
| 0 | 1 | Dual-View |
| 1 | 0 | Tri-View |
| 1 | 1 | Quad-View |

Meanwhile, it may be modified to express Multi-View over Quad-View by defining the size of this field as more than 3 bits. In this case, the above table may also be extended.

The Second Exemplary Embodiment

The second exemplary embodiment adds a 3D_MultiView field to describe support information of Dual/Tri/Quad-View or additional Multi-View in PB7 area of Vendor-Specific InfoFrame.

TABLE 124

| Packet Byte# | 7 | 6 | 5 | 4 | 3 | 2 | 1 | 0 |
|---|---|---|---|---|---|---|---|---|
| PB0 | Checksum ||||||||
| PB1 | 24 bit IEEE Registration Identifier (0x000C03) ||||||||
| PB2 | (least significant byte first) ||||||||
| PB3 | | | | | | | | |
| PB4 | HDMI_Video_Format | Rsvd(0) | Rsvd(0) | Rsvd(0) | Rsvd(0) | Rsvd(0) |||
| PB5 | HDMI_VIC ||||||||
| (PB6) | 3D_Structure || Rsvd(0) || 3D_MultiView || Rsvd(0) ||
| | 3D_Ext_Data || Rsvd(0) |||||| 
| (PB7) | 3D_AdditionalInfo ||||||||
| | Rsvd(0) | Rsvd(0) | 3D_MultiView || 3D_ViewDependency || 3D_Preferred2DView ||
| ... PB(Nv) | Reserved (0) ||||||||

The second exemplary embodiment adds 3D_MultiView similar to the first exemplary embodiment. However, there is a difference in position that 3D_MultiView is added to. 3D_MultiView is defined specifically in bit[5:4] within the structure of PB7.

In addition, 3D_MultiView may be defined in Vendor-Specific Data Block as the below table.

Multi-View field indicates Multi-View Capability of sink. Description for field values is as the following table.

In addition, it may be modified to define the size of the field as more than 3 bits, and to express Multi-View over Quad-View the size of the field. In this case, the below table should also be extended.

TABLE 125

| Byte# | 7 | 6 | 5 | 4 | 3 | 2 | 1 | 0 |
|---|---|---|---|---|---|---|---|---|
| 0 | Vendor-specific tag code(=8) ||| Length (=N) |||||
| 1 | 24-bit IEEE Registration Identifier (0x000C03) ||||||||
| 2 | (least significant byte first) ||||||||
| 3 | | | | | | | | |
| 4 | A |||| B ||||
| 5 | C |||| D ||||
| 6 | Supports_AI | DC_45bit | DC_36bit | DC_30bit | DC_Y444 | Rsvd(0) | Rsvd(0) | DVI_Dual |
| 7 | Max_TMDS_Clock ||||||||
| 8 | Latency_Fields_Present | I_Latency_Fields Present | HDMI_Video_presnt | Rsvd(0) | CNC3 | CNC2 | CNC1 | CNC0 |
| 9 | Video_Latency ||||||||
| 10 | Audio_Latency ||||||||
| 11 | Interlaced_Video_Latency ||||||||
| 12 | Interlaced_Audio_Latency ||||||||
| 13 | 3D_present | 3D_Multi_present ||| Image_site || MultiView | Rsvd(0) |
| 14 | HDMI_VIC_LEN |||| HDMI_3D_LEN ||||
| 15 | (if HDMI_VIC_LEN > 0) ||||||||
| | HDMI_VIC_1 ||||||||
| ... | ... ||||||||
| | HDMI_VIC_M ||||||||
| | (if 3D_Multi_present = 01 or 10) ||||||||
| | 3D_Structure_ALL_15 ... S ||||||||
| | 3D_Structure_ALL_7 ... 0 ||||||||

TABLE 126

| Multi View field | | |
|---|---|---|
| 3D_MultiView | | Description |
| 0 | 0 | Reserved |
| 0 | 1 | Dual_view |
| 1 | 0 | Tri-View |
| 1 | 1 | Quad-View |

The foregoing exemplary embodiments are merely exemplary and are not to be construed as limiting the application. The present teaching may be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A data transmitting apparatus comprising:
   a generator which generates display identification information including feature information, which is supported by a sink device, regarding audio data; and
   a transmitter which transmits the display identification information to a data receiving apparatus,
   wherein the display identification information comprises at least one of a first sub block representing three-dimensional (3D) audio characteristics of the audio data, and a second sub block representing a configuration of a 3D speaker, and
   wherein the second sub block comprises an HDMI 3D speaker allocation descriptor field indicating the configuration of the 3D speaker.

2. The data transmitting apparatus of claim 1, wherein the first sub block comprises at least one of a field representing information about a number of 3D audio descriptors and a 3D audio descriptor field representing information about 3D audio data which is supported by the data transmitting apparatus.

3. The data transmitting apparatus of claim 2, wherein the 3D audio descriptor field comprises at least one of a first sub field representing format information of the audio data, a second sub field representing a number of channels of the audio data, and a third sub field representing sampling frequency information of the audio data,
   wherein the second sub block comprises an HDMI 3D speaker allocation descriptor field indicating the configuration of the 3D speaker.

4. The data transmitting apparatus of claim 1, wherein the HDMI 3D speaker allocation descriptor field comprises at least one of a fourth sub field representing information about a channel allocation standard type of the audio data, and a fifth sub field representing information about speaker placement and arrangement of the audio data.

5. The data transmitting apparatus of claim 4, wherein the channel allocation standard type is a channel allocation standard type regarding at least one of 10.2 channels, 22.2 channels, 30.2 channels, multiple channels comprising more than 30.2 channels, and multiple channels comprising less than 10.2 channels.

6. A data receiving apparatus comprising:
   a receiver which receives display identification information including feature information which is supported by a sink device regarding audio data from a data transmitting apparatus; and
   an analyzer which analyzes the display identification information,
   wherein the display identification information comprises at least one of a first sub block representing three-dimensional (3D) audio characteristics of the audio data, and a second sub block representing a configuration of a 3D speaker, and
   wherein the second sub block comprises an HDMI 3D speaker allocation descriptor field indicating the configuration of the 3D speaker.

7. The data receiving apparatus of claim 6, wherein the first sub block comprises at least one of a field representing information about a number of 3D audio descriptors and a 3D audio descriptor field representing information about 3D audio data which is supported by the data transmitting apparatus.

8. The data receiving apparatus of claim 7, wherein the 3D audio descriptor field comprises at least one of a first sub field representing format information of the audio data, a second sub field representing a number of channels of the audio data, and a third sub field representing sampling frequency information of the audio data.

9. The data receiving apparatus of claim 6, wherein the 3D speaker placement descriptor field comprises at least one of a fourth sub field representing information about a channel allocation standard type of the audio data, and a fifth sub field representing information about speaker placement and arrangement of the audio data.

10. The data receiving apparatus of claim 9, wherein the channel allocation standard type is a channel allocation standard type regarding at least one of 10.2 channels, 22.2 channels, 30.2 channels, multiple channels comprising more than 30.2 channels, and multiple channels comprising less than 10.2 channels.

11. A data transceiving system comprising:
    a data transmitting apparatus which generates display identification information including feature information which is supported by a sink device regarding audio data, and transmits the display identification information to a data receiving apparatus; and
    a data receiving apparatus which receives and analyzes the display identification information,
    wherein the display identification information comprises at least one of a first sub block representing three-dimensional (3D) audio characteristics of the audio data, and a second sub block representing a configuration of a 3D speaker, and
    wherein the second sub block comprises an HDMI 3D speaker allocation descriptor field indicating the configuration of the 3D speaker.

12. A data transmitting method comprising:
    generating display identification information including feature information which is supported by a sink device regarding audio data; and
    transmitting the display identification information to a data receiving apparatus,
    wherein the display identification information comprises at least one of a first sub block representing three-dimensional (3D) audio characteristics of the audio data, and a second sub block representing a configuration of a 3D speaker, and
    wherein the second sub block comprises an HDMI 3D speaker allocation descriptor field indicating the configuration of the 3D speaker.

13. The data transmitting method of claim 12, wherein the first sub block comprises at least one of a field representing information about a number of 3D audio descriptors and a 3D audio descriptor field representing information about 3D audio data which is supported by a data transmitting apparatus.

14. The data transmitting method of claim 13, wherein the 3D audio descriptor field comprises at least one of a first sub field representing format information of the audio data, a second sub field representing a number of channels of the audio data, and a third sub field representing sampling frequency information of the audio data.

15. A data receiving method comprising:
receiving display identification information including feature information which is supported by a sink device regarding audio data from a data transmitting apparatus; and
analyzing the display identification information,
wherein the display identification information comprises at least one of a first sub block representing three-dimensional (3D) audio characteristics of the audio data, and a second sub block representing a configuration of a 3D speaker, and
wherein the second sub block comprises an HDMI 3D speaker allocation descriptor field indicating the configuration of the 3D speaker.

16. The data receiving method of claim 15, wherein the first sub block comprises at least one of a field representing information about a number of 3D audio descriptors and a 3D audio descriptor field representing information about 3D audio data which is supported by the data transmitting apparatus.

17. The data transmitting apparatus of claim 1, wherein the display identification information further comprises a third sub block representing multi-stream audio characteristics of the audio data.

18. The data transmitting apparatus of claim 17, wherein the third sub block comprises at least one of a field representing a number of streams of multi-stream audio which is supported by the data transmitting apparatus, and a shortened audio descriptor field representing characteristics of audio corresponding to individual streams of the multi-stream audio.

19. The data receiving apparatus of claim 6, wherein the display identification information further comprises a third sub block representing multi-stream audio characteristics of the audio data.

20. The data receiving apparatus of claim 18, wherein the third sub block comprises at least one of a field representing a number of streams of multi-stream audio which is supported by the data transmitting apparatus, and a shortened audio descriptor field representing characteristics of audio corresponding to the individual streams of the multi-stream audio.

21. The data transmitting apparatus of claim 1, wherein the display identification information comprises at least one of EDID (Extended Display Identification Information) and E-EDID (Enhanced Extended Display Identification Data).

22. The data receiving apparatus of claim 6, wherein the display identification information comprises at least one of EDID (Extended Display Identification Data) and E-EDID (Enhanced Extended Display Identification Data).

23. The data transmitting apparatus of claim 1, wherein the display identification information comprises a HDMI (High Definition Multimedia Interface) Audio Data Block.

24. The data transmitting apparatus of claim 1, wherein the data transmitting apparatus supports multi-stream audio transmission, and the display identification information comprises at least one CEA short audio descriptor.

25. The data transmitting apparatus of claim 2, wherein the 3D audio descriptor field indicates a support for audio encoding that is defined in CEA-861-F.

26. The data receiving apparatus of claim 6, wherein the display identification information comprises a HDMI (High Definition Multimedia Interface) Audio Data Block.

27. The data receiving apparatus of claim 6, wherein the data transmitting apparatus supports multi-stream audio transmission, and the display identification information comprises at least one CEA short audio descriptor.

28. The data receiving apparatus of claim 7, wherein the 3D audio descriptor field indicates a support for audio encoding that is defined in CEA-861-F.

29. The data transmitting apparatus of claim 1, wherein the audio data comprises multi-channel audio data.

30. The data receiving apparatus of claim 6, wherein the audio data comprises multi-channel audio data.

31. The data transmitting apparatus of claim 1, wherein the transmission of the packet complies with a wire Interface standards.

32. The data receiving apparatus of claim 6, wherein the reception of the packet complies with a wire Interface standards.

33. The data transmitting apparatus of claim 31, wherein the wire Interface standards comprises at least one of High Definition Multimedia Interface (HDMI) standards and Mobile High-Definition Link (MHL) standards.

34. The data receiving apparatus of claim 32, wherein the wire Interface standards comprises at least one of High Definition Multimedia Interface (HDMI) standards and Mobile High-Definition Link (MHL) standards.

* * * * *